United States Patent
Uehara

(10) Patent No.: US 12,422,654 B2
(45) Date of Patent: Sep. 23, 2025

(54) ZOOM OPTICAL SYSTEM, OPTICAL DEVICE, AND METHOD FOR MANUFACTURING ZOOM OPTICAL SYSTEM

(71) Applicant: Nikon Corporation, Tokyo (JP)

(72) Inventor: Takeru Uehara, Ageo (JP)

(73) Assignee: Nikon Corporation, Tokyo (JP)

( * ) Notice: Subject to any disclaimer, the term of this patent is extended or adjusted under 35 U.S.C. 154(b) by 798 days.

(21) Appl. No.: 17/283,409

(22) PCT Filed: Nov. 20, 2018

(86) PCT No.: PCT/JP2018/042762
§ 371 (c)(1),
(2) Date: Apr. 7, 2021

(87) PCT Pub. No.: WO2020/105103
PCT Pub. Date: May 28, 2020

(65) Prior Publication Data
US 2021/0341716 A1 Nov. 4, 2021

(51) Int. Cl.
*G02B 15/14* (2006.01)
*G02B 15/20* (2006.01)
*G02B 15/22* (2006.01)

(52) U.S. Cl.
CPC ..... *G02B 15/1441* (2019.08); *G02B 15/1461* (2019.08); *G02B 15/20* (2013.01); *G02B 15/22* (2013.01)

(58) Field of Classification Search
CPC ...... G02B 15/00; G02B 15/14; G02B 15/144; G02B 15/1441; G02B 15/144105;
(Continued)

(56) References Cited

U.S. PATENT DOCUMENTS 8,824,057 B2 * 9/2014 Ryu ............... G02B 15/144109
359/676
8,867,143 B2 * 10/2014 Taki ................... G02B 15/1421
348/340
(Continued)

FOREIGN PATENT DOCUMENTS

JP 2009-282214 A 12/2009
JP 2012-141330 A 7/2012
(Continued)

OTHER PUBLICATIONS

Office Action issued Dec. 27, 2022, in Japanese Patent Application No. 2022-080811.
(Continued)

*Primary Examiner* — Thong Q Nguyen
(74) *Attorney, Agent, or Firm* — Potomac Law Group, PLLC

(57) ABSTRACT

A zoom optical system comprises a first lens group having a positive refractive power, a second lens group having a negative refractive power, a third lens group having a positive refractive power, and a succeeding lens group, which are arranged in order from an object side. During zooming, distances between adjacent lens groups change, and the first lens group is fixed with respect to an image surface. During zooming from a wide angle end state to a telephoto end state, the third lens group moves toward an image surface. The succeeding lens group includes a last lens group arranged to be nearest to the image surface. Further, the following conditional expression is satisfied.

$-10.00 < f3/(-fE) < 3.50$, where f3 represents a focal length of the third lens group, and
fE represents a focal length of the last lens group.

16 Claims, 30 Drawing Sheets

(58) Field of Classification Search
CPC .......... G02B 15/144113; G02B 15/145; G02B 15/1451; G02B 15/145105; G02B 15/145113; G02B 15/145121; G02B 15/145129; G02B 15/146; G02B 15/1461; G02B 15/15; G02B 15/20; G02B 15/24; G02B 15/28
USPC ................................................. 359/676–688
See application file for complete search history.

(56) References Cited

U.S. PATENT DOCUMENTS

| | | | |
|---|---|---|---|
| 8,941,926 B2 * | 1/2015 | Mihara ................ | G02B 15/173 |
| | | | 359/713 |
| 10,955,644 B2 * | 3/2021 | Kawamura .... | G02B 15/145121 |
| 11,668,914 B2 * | 6/2023 | Nishioka .................. | G02B 7/14 |
| | | | 359/683 |
| 2009/0122418 A1 | 5/2009 | Atsuumi et al. | |
| 2010/0321791 A1 | 12/2010 | Hayakawa | |
| 2013/0057732 A1 | 3/2013 | Uemura | |
| 2013/0258495 A1 | 10/2013 | Ito | |
| 2015/0226945 A1 | 8/2015 | Matsui et al. | |
| 2016/0209632 A1 | 7/2016 | Imaoka | |
| 2018/0095242 A1 | 4/2018 | Iwamoto et al. | |
| 2018/0172964 A1 | 6/2018 | Kobayashi | |
| 2019/0018229 A1 | 1/2019 | Miyagawa et al. | |
| 2019/0113708 A1 | 4/2019 | Kobayashi | |
| 2021/0113063 A1 * | 4/2021 | Obikane ........ | G02B 15/145113 |

FOREIGN PATENT DOCUMENTS

| | | | |
|---|---|---|---|
| JP | 2013-057738 | A | 3/2013 |
| JP | 2013-190827 | A | 9/2013 |
| JP | 2015-014678 | A | 1/2015 |
| JP | 2015-152665 | A | 8/2015 |
| JP | 2016-126278 | A | 7/2016 |
| JP | 2016-139125 | A | 8/2016 |
| JP | 2017-219660 | A | 12/2017 |
| JP | 2018-054989 | A | 4/2018 |
| JP | 2018-097240 | A | 6/2018 |
| JP | 2019-074671 | A | 5/2019 |
| WO | WO 2017/134929 | A1 | 8/2017 |

OTHER PUBLICATIONS

International Preliminary Report on Patentability issued Jun. 3, 2021, in International Patent Application No. PCT/JP2018/042762.
International Search Report from International Patent Application No. PCT/JP2018/042762, Feb. 26, 2019.
Office Action issued Dec. 7, 2021, in Japanese Patent Application No. 2020-557052.
Office Action issued Mar. 30, 2022, in Chinese Patent Application No. 201880098731.0.
Office Action issued Dec. 26, 2023, in Japanese Patent Application No. 2023-041869.
Office Action issued Jan. 14, 2025, in Japanese Patent Application No. 2024-042144.

* cited by examiner

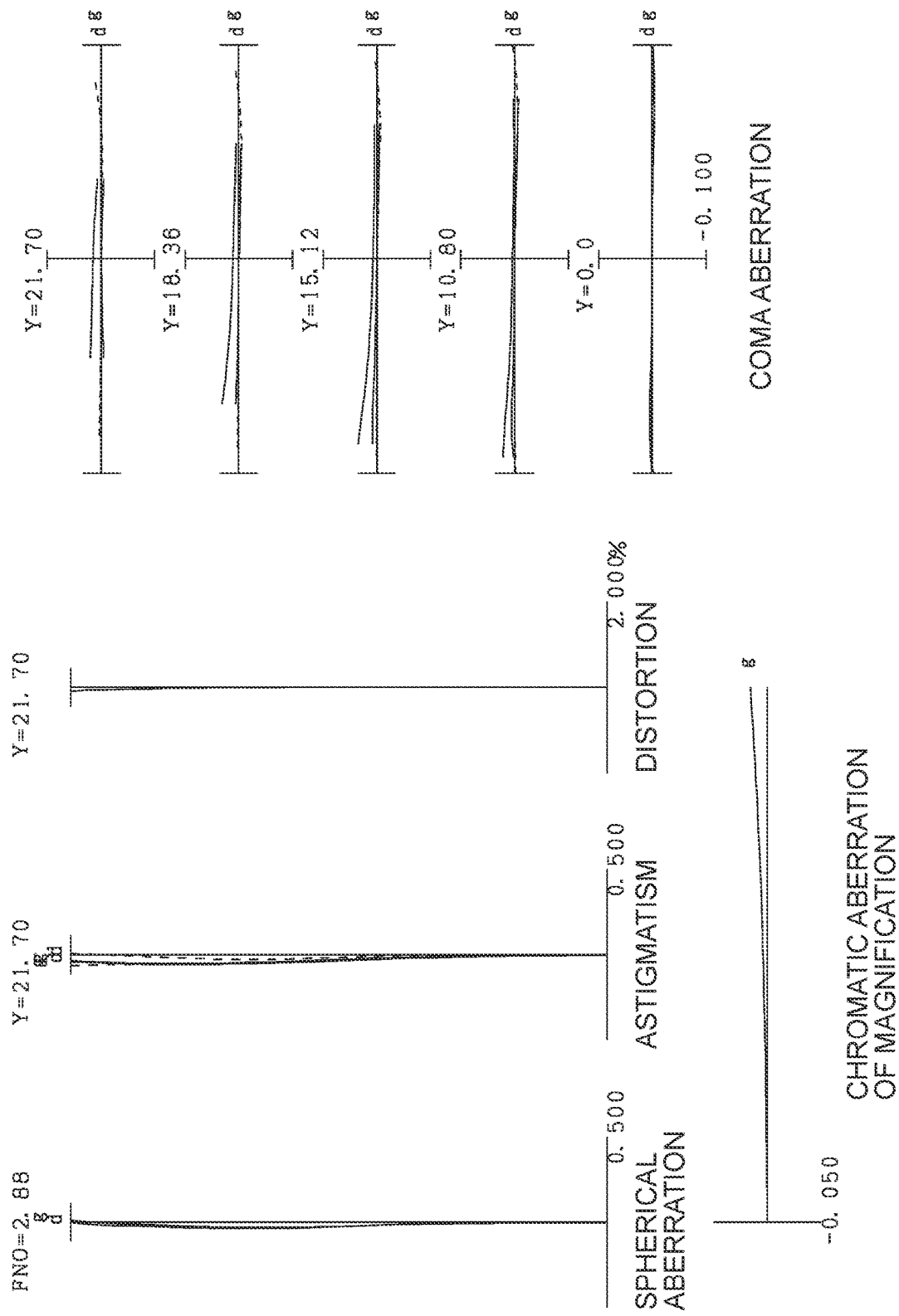

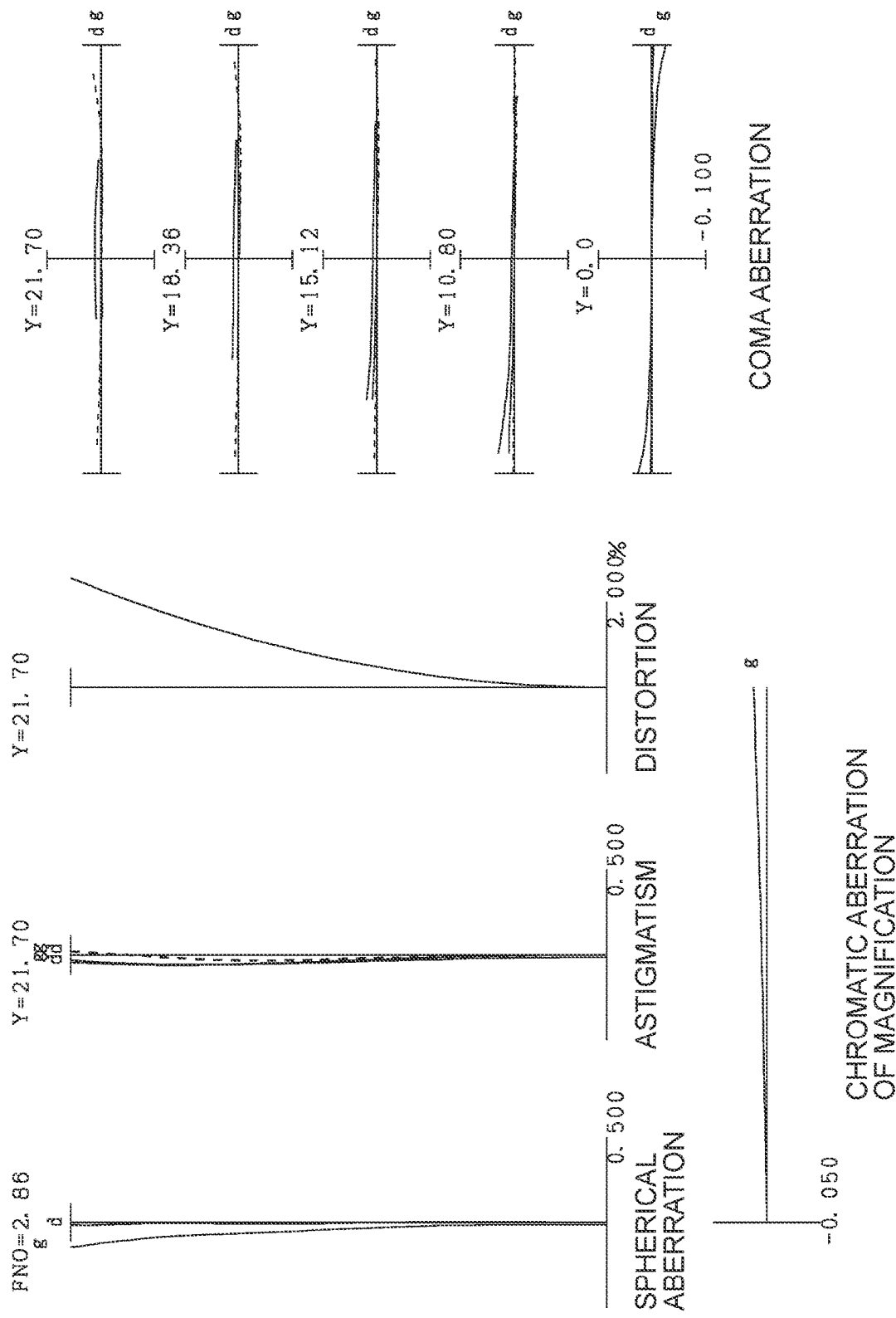

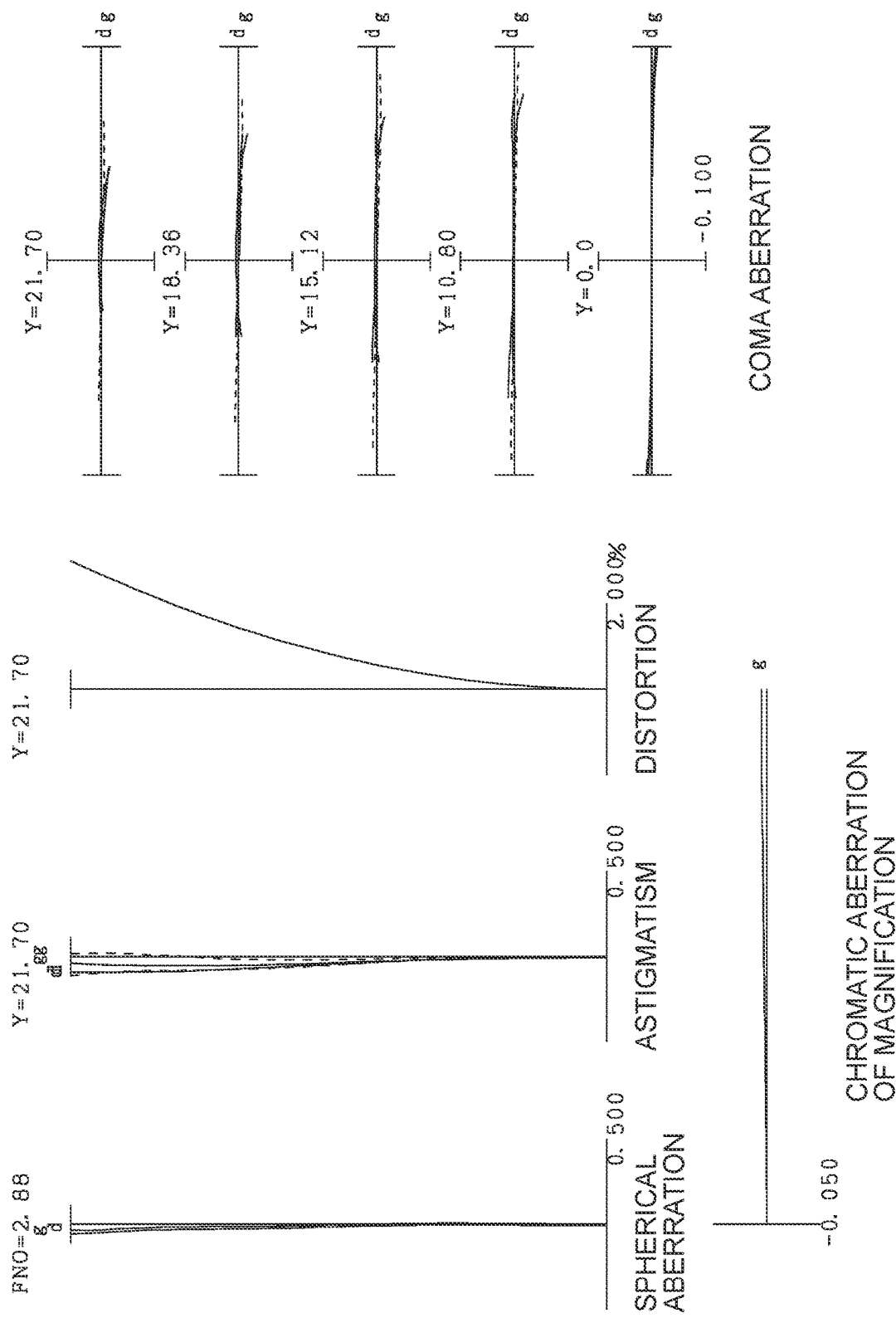

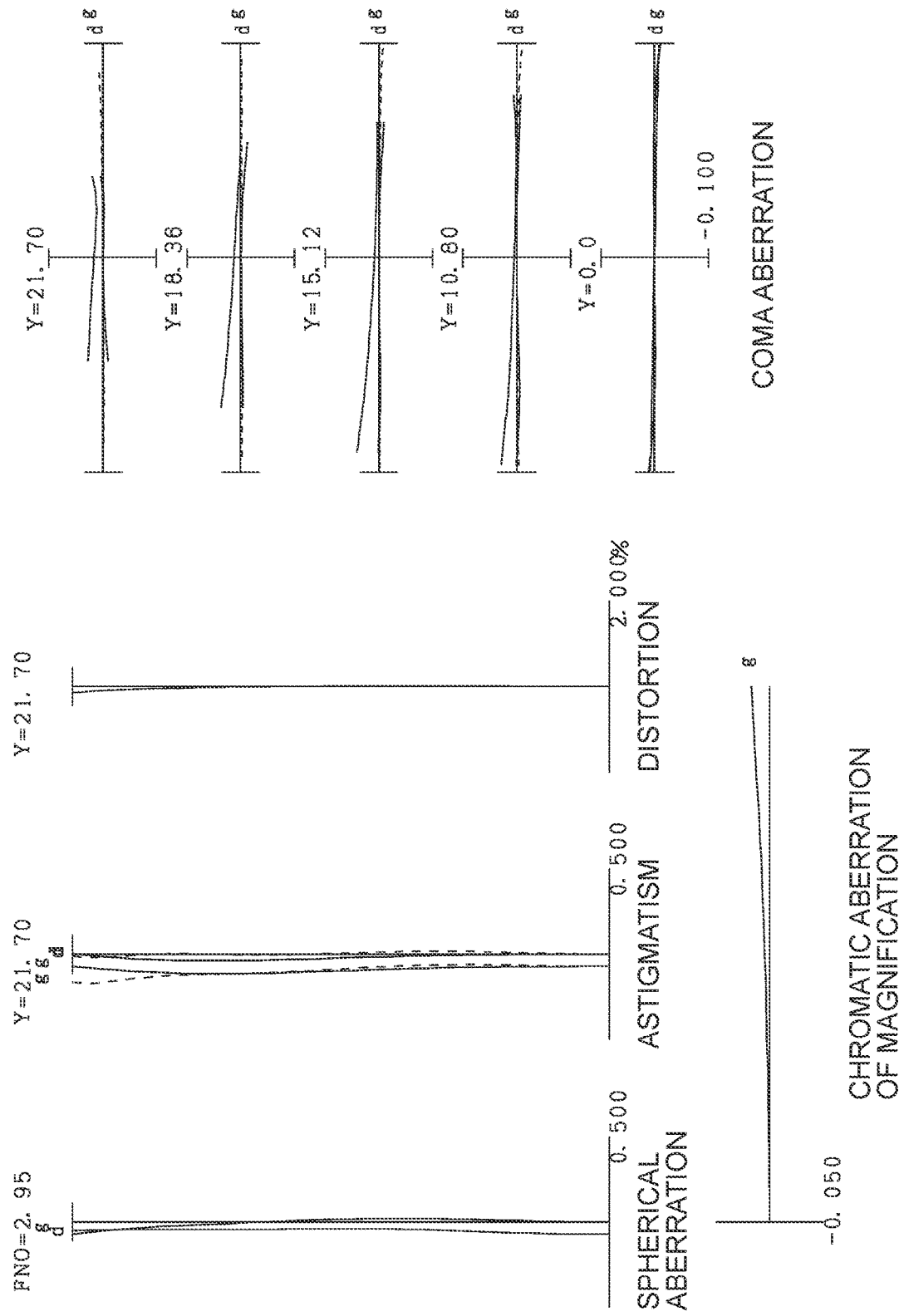

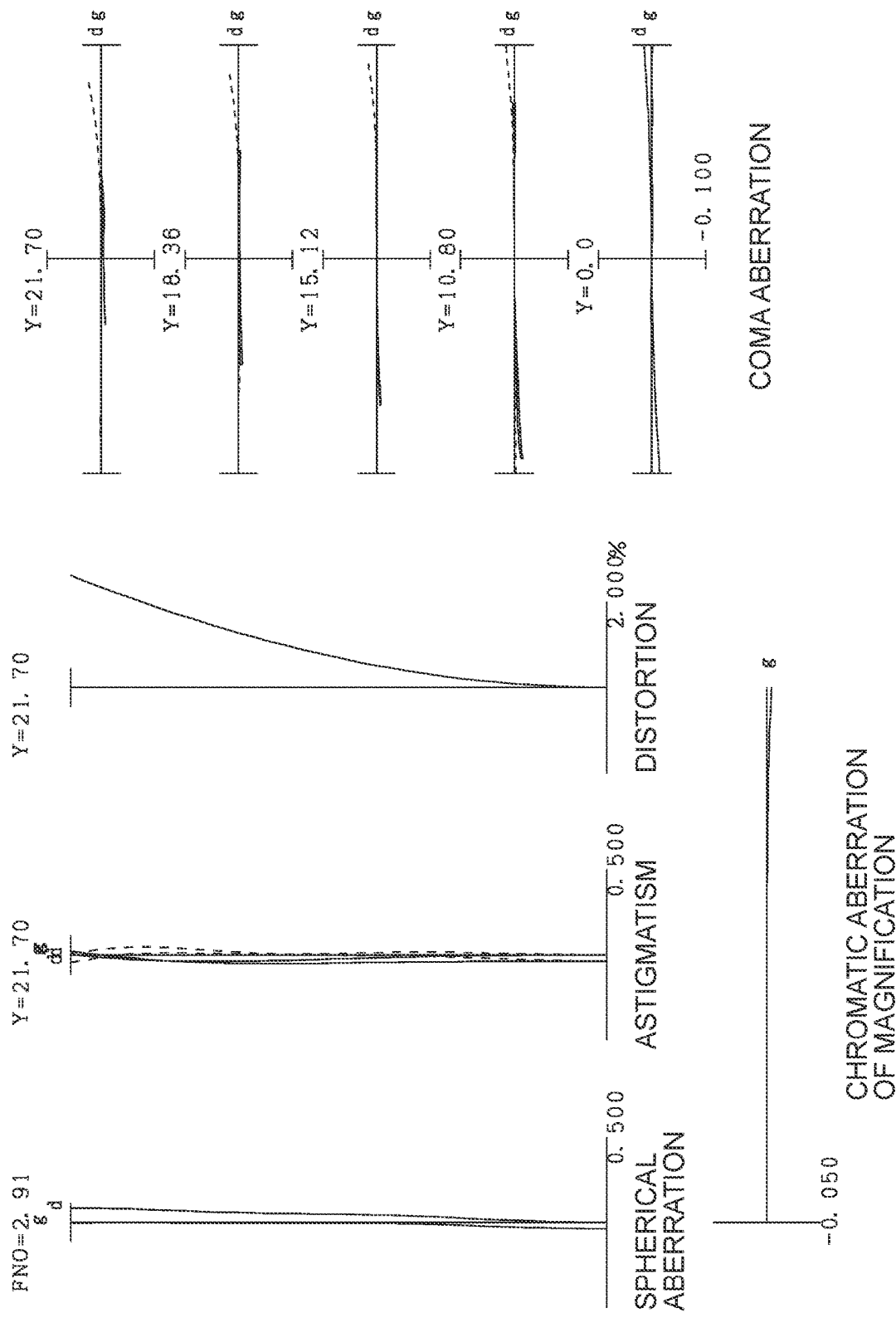

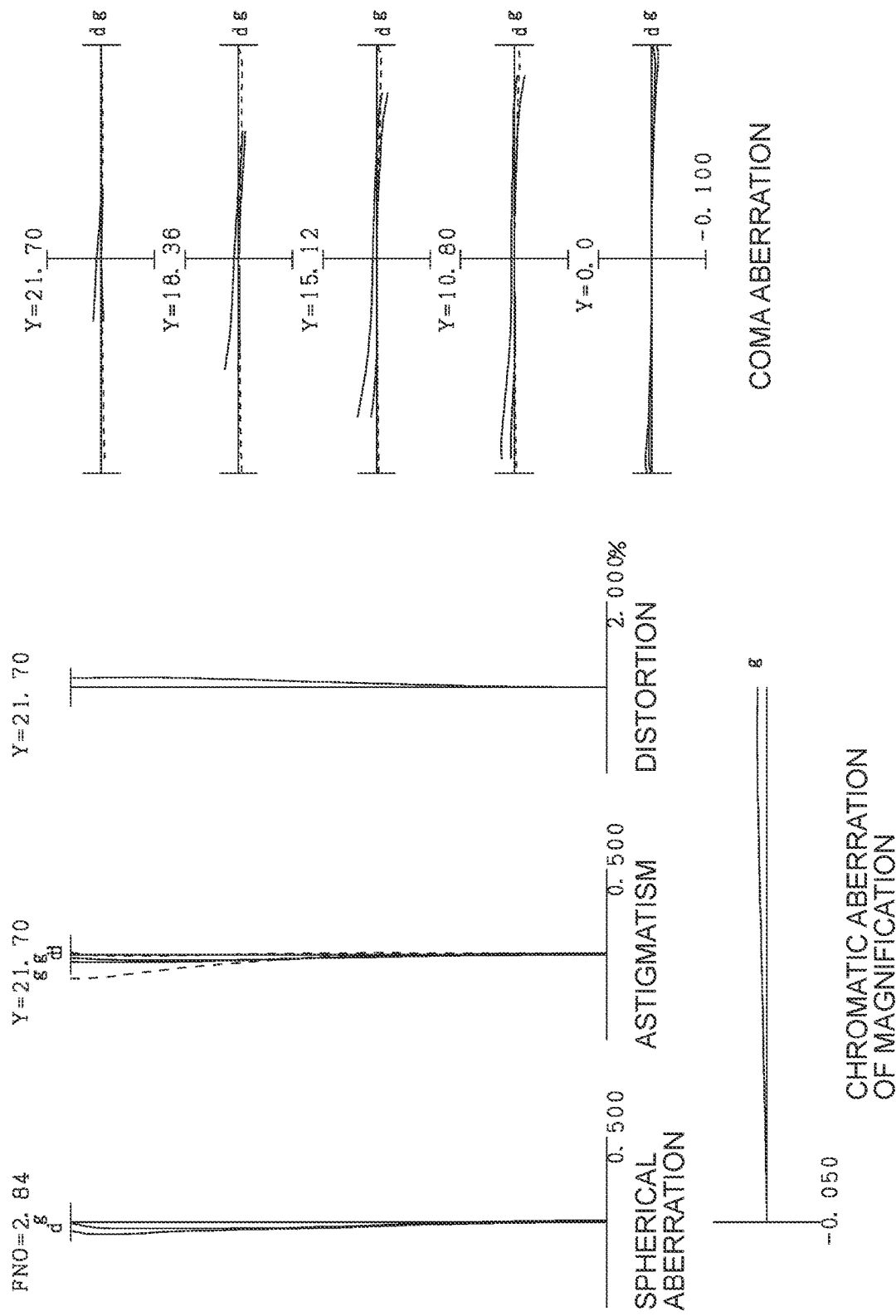

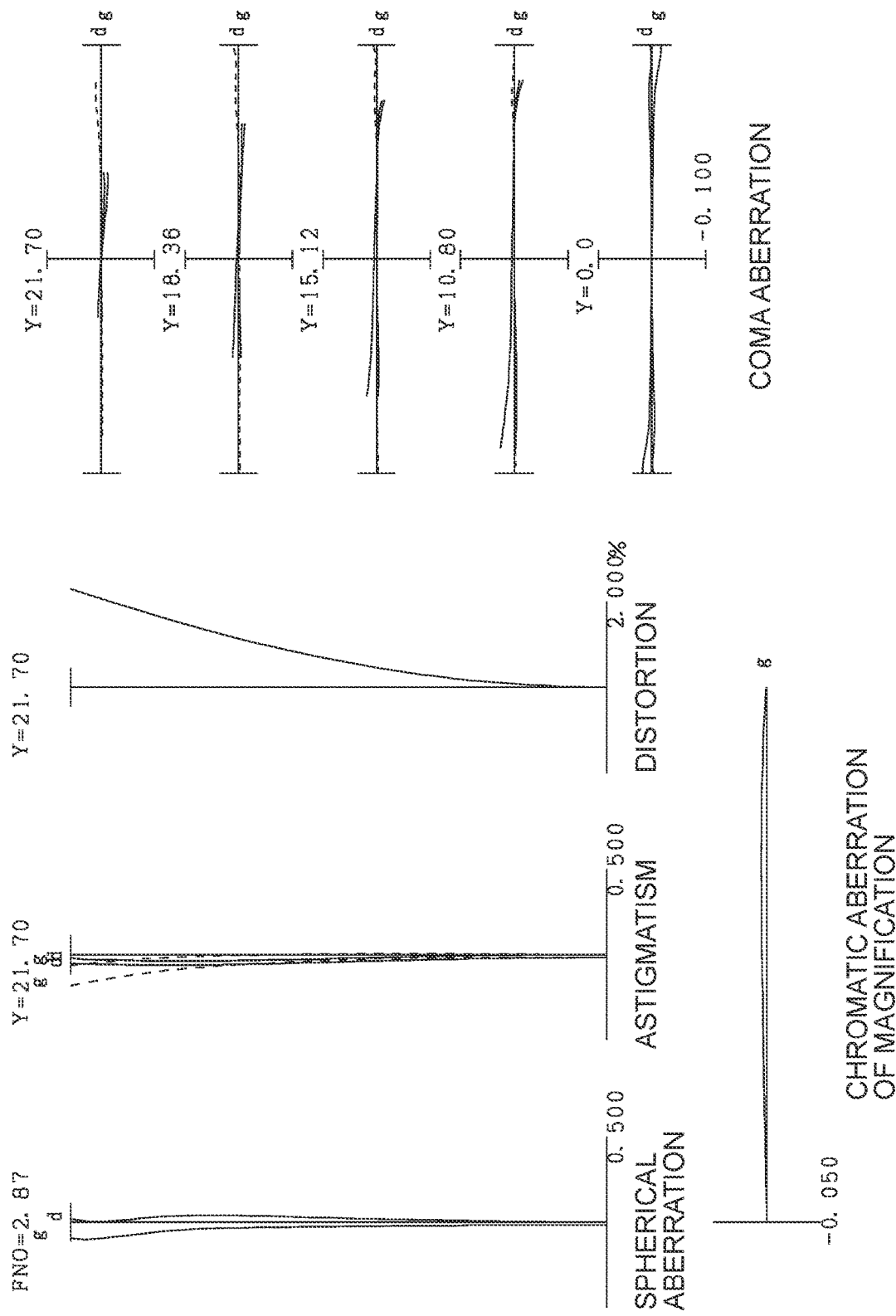

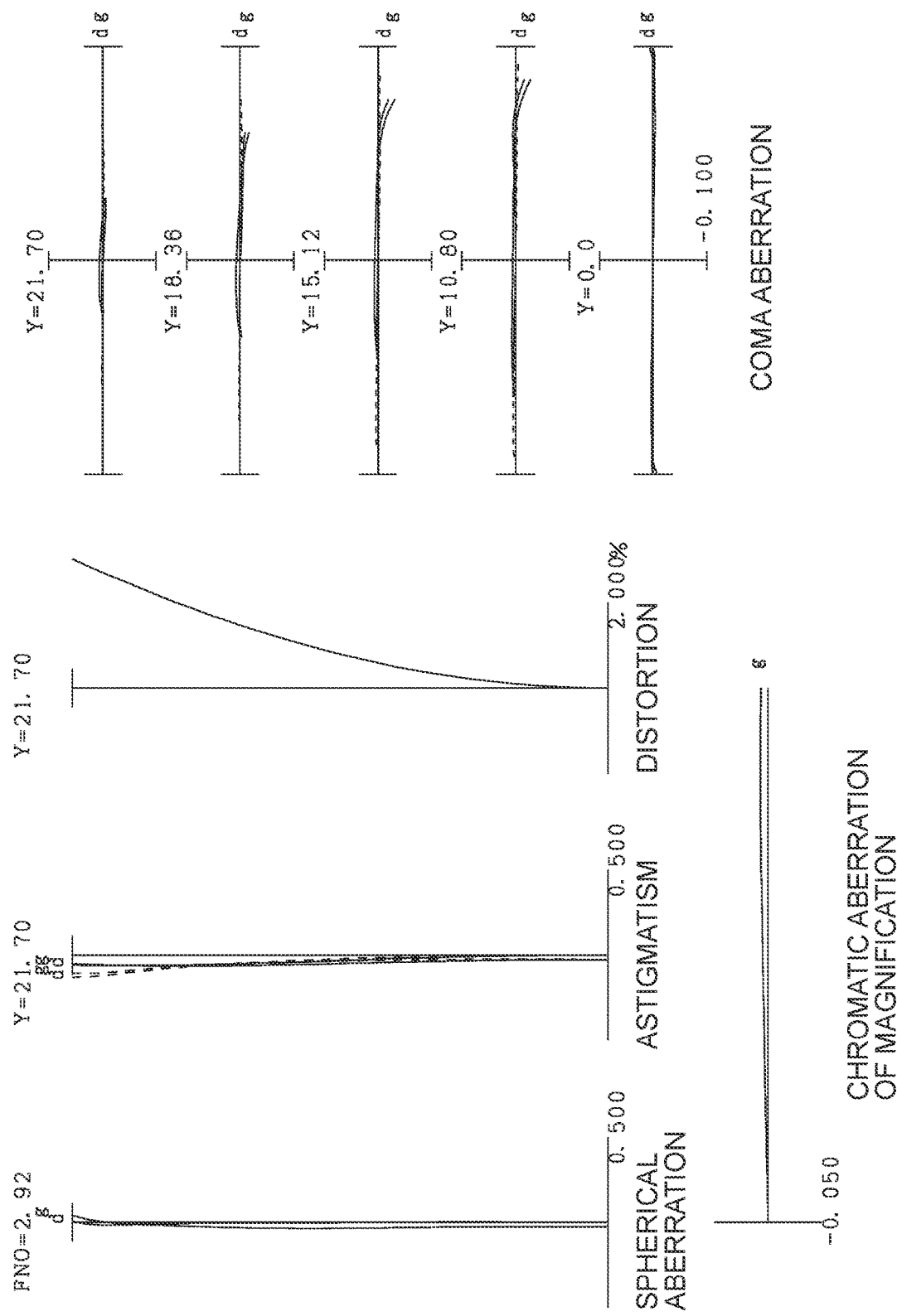

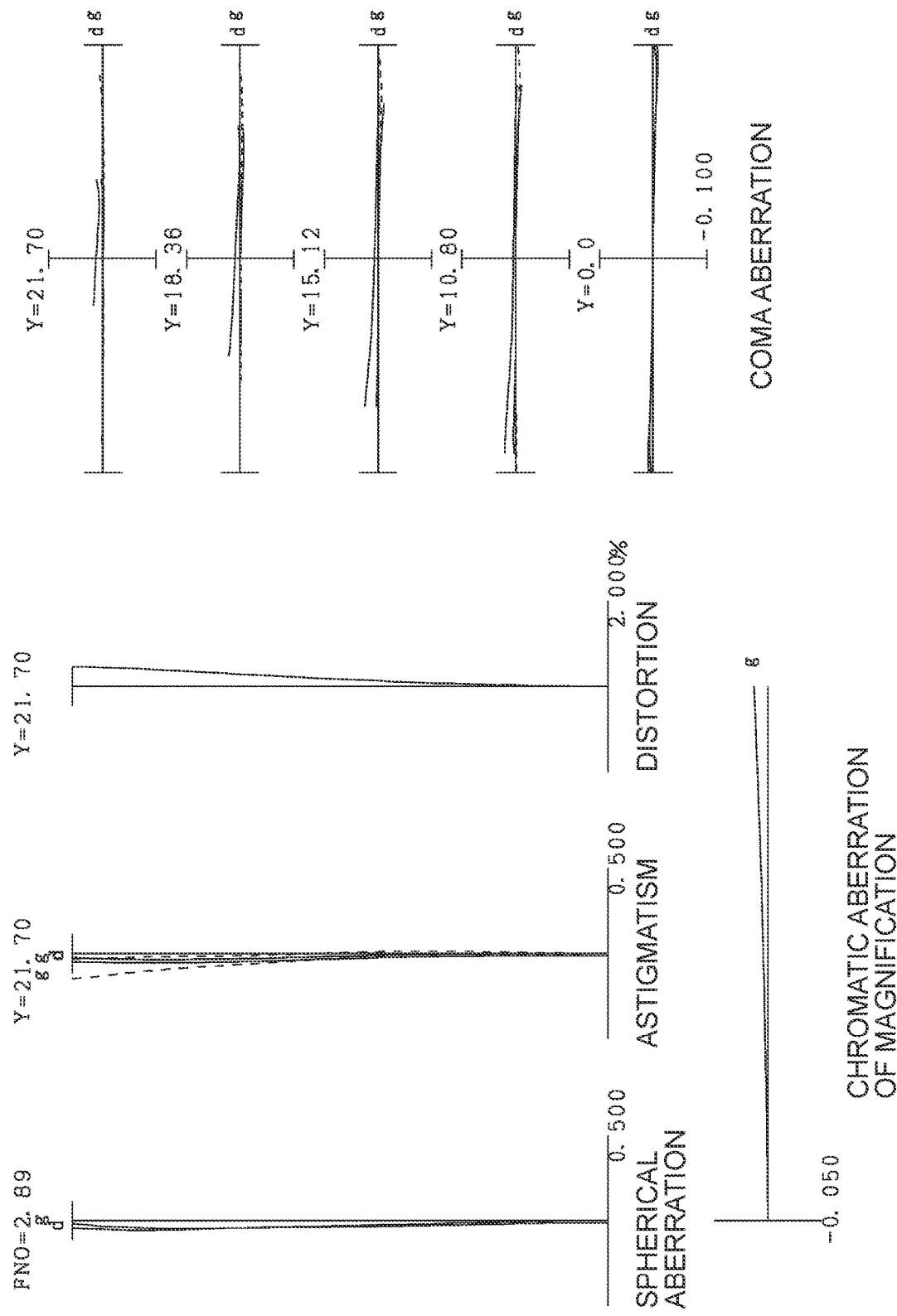

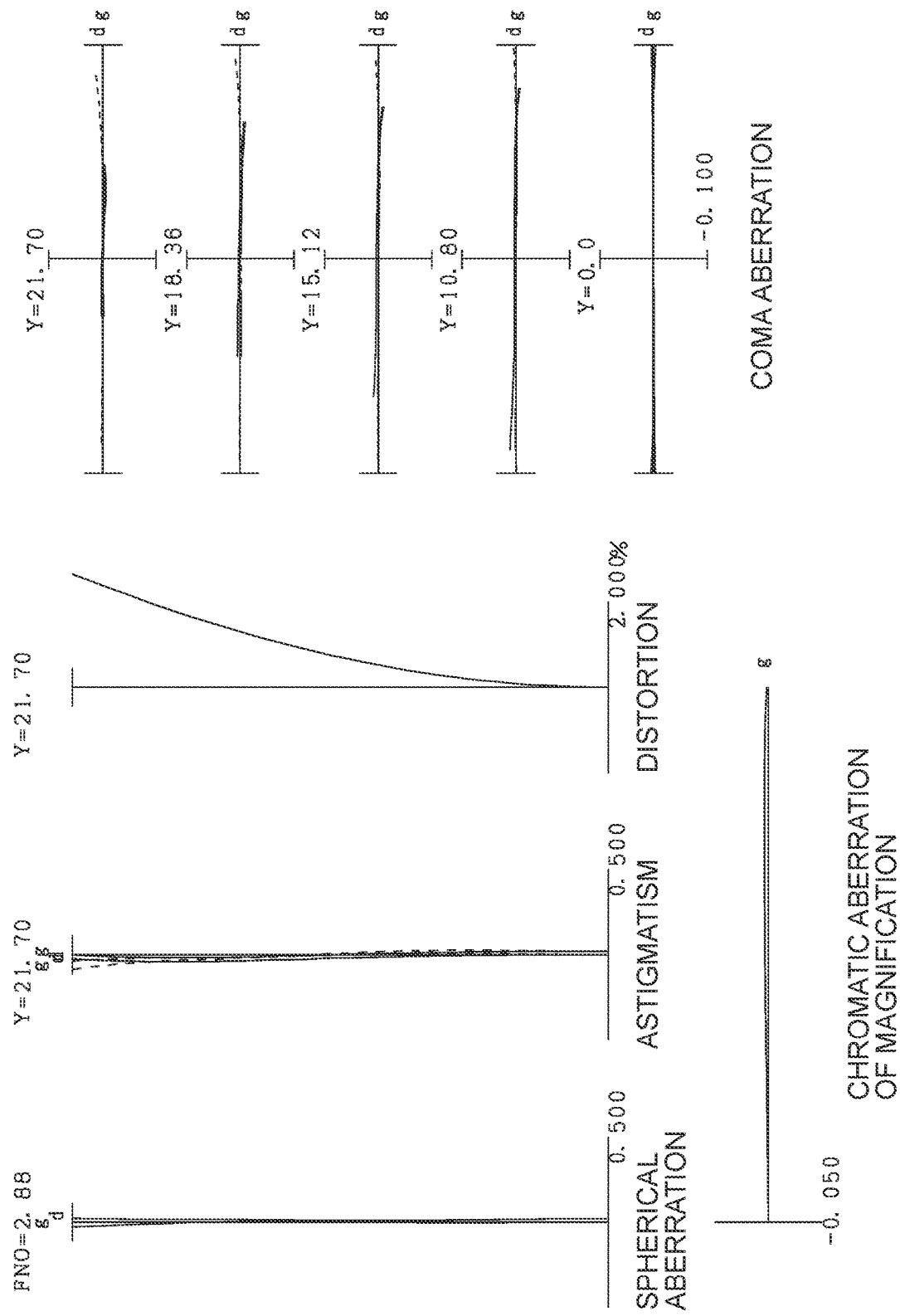

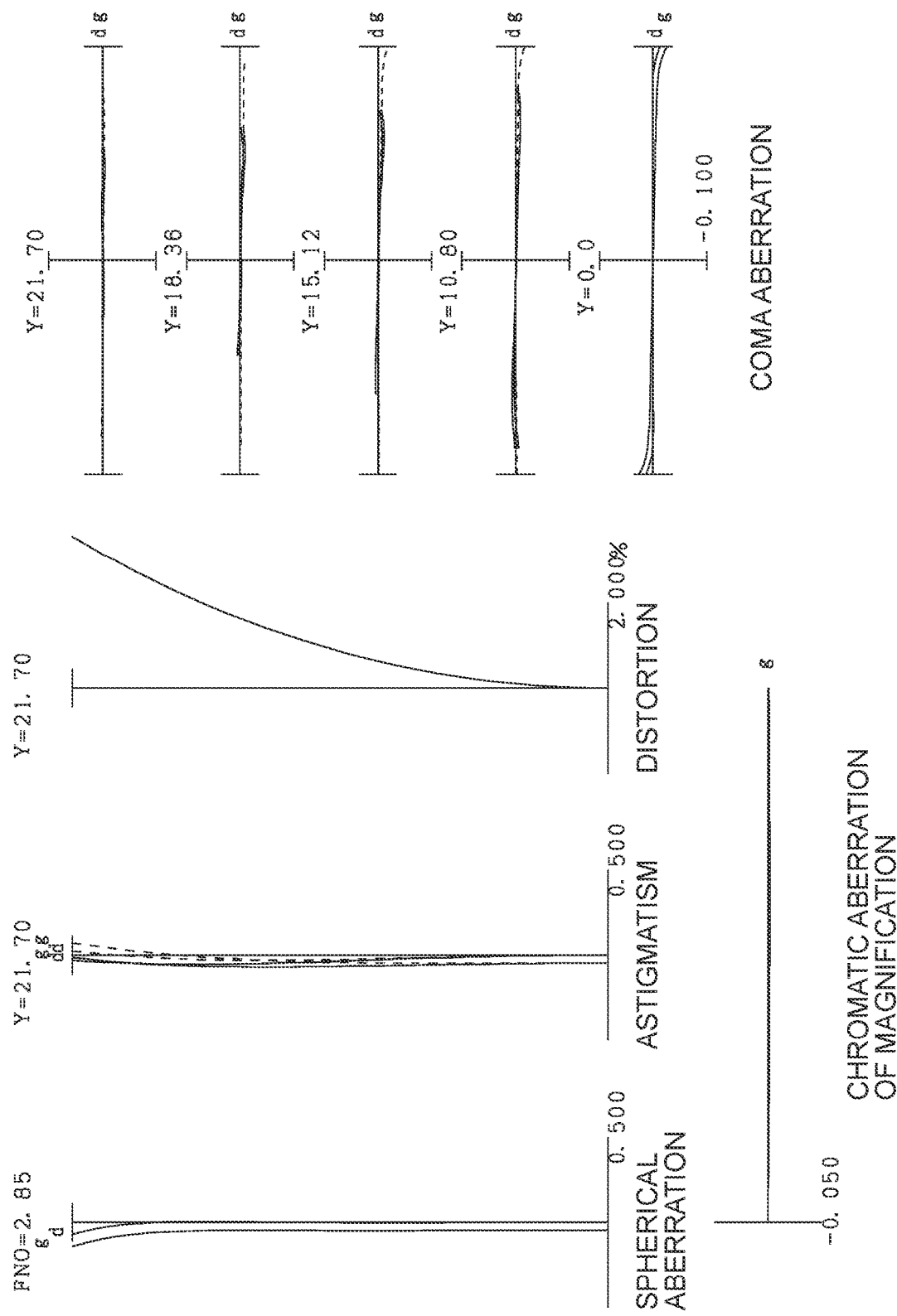

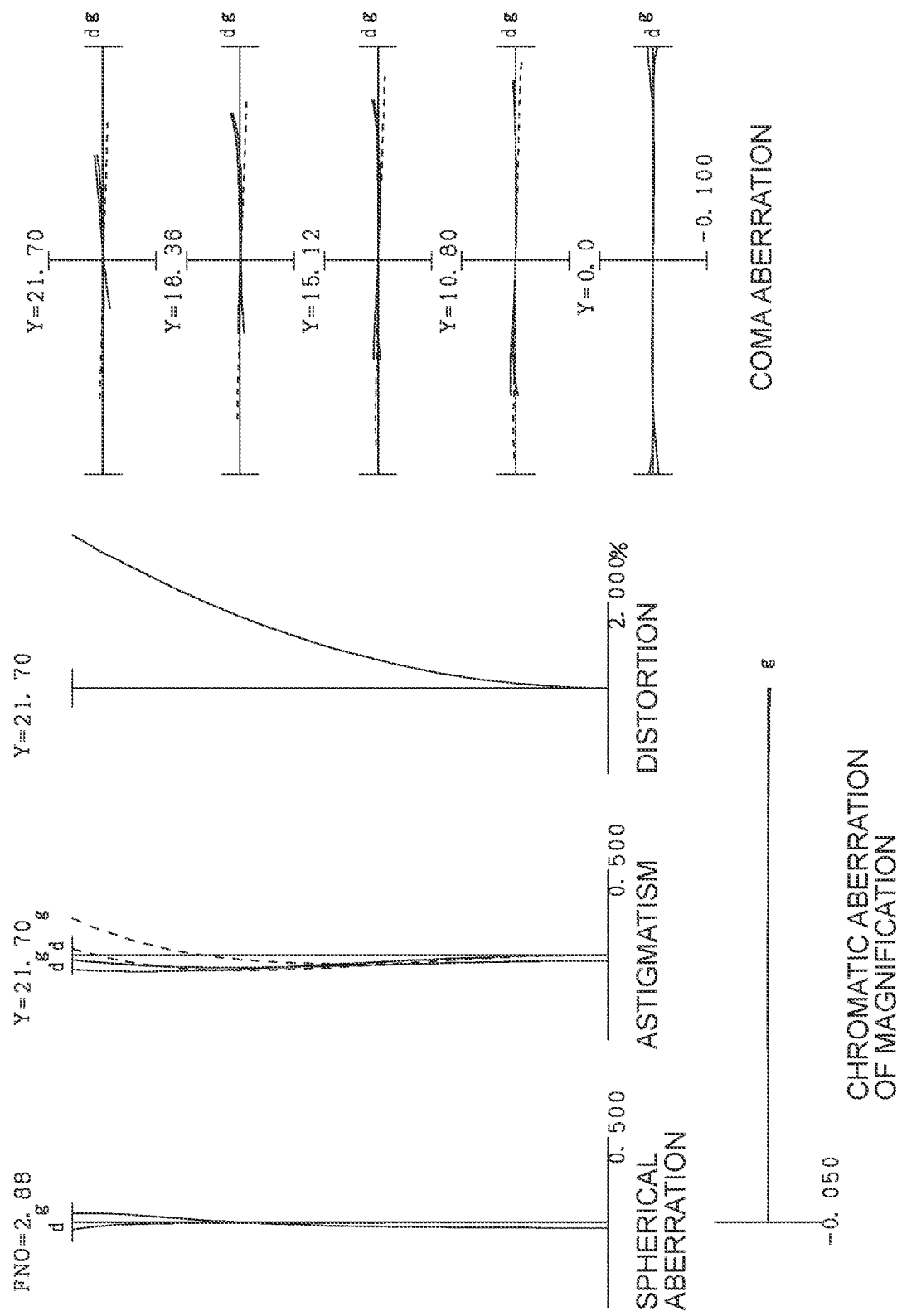

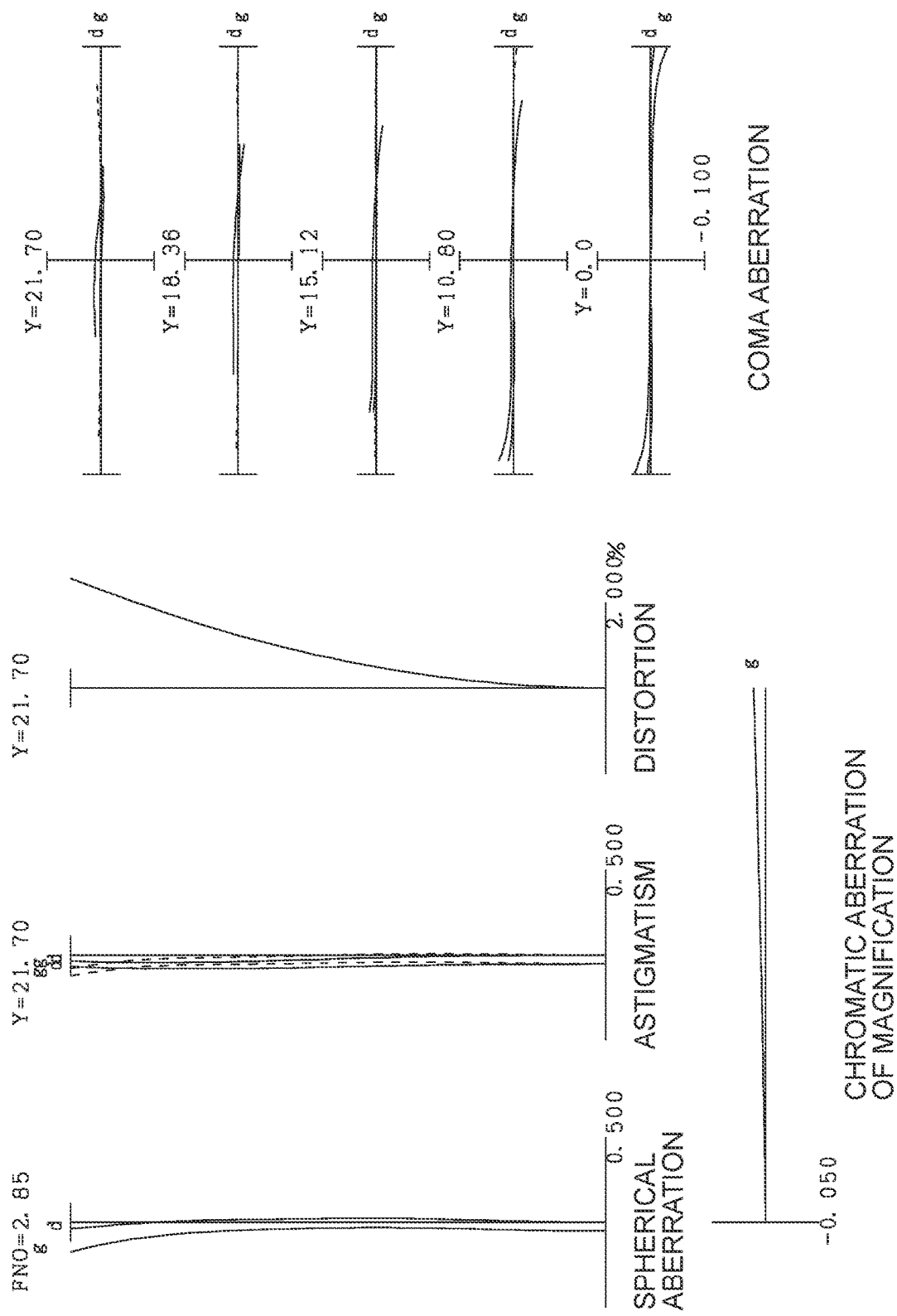

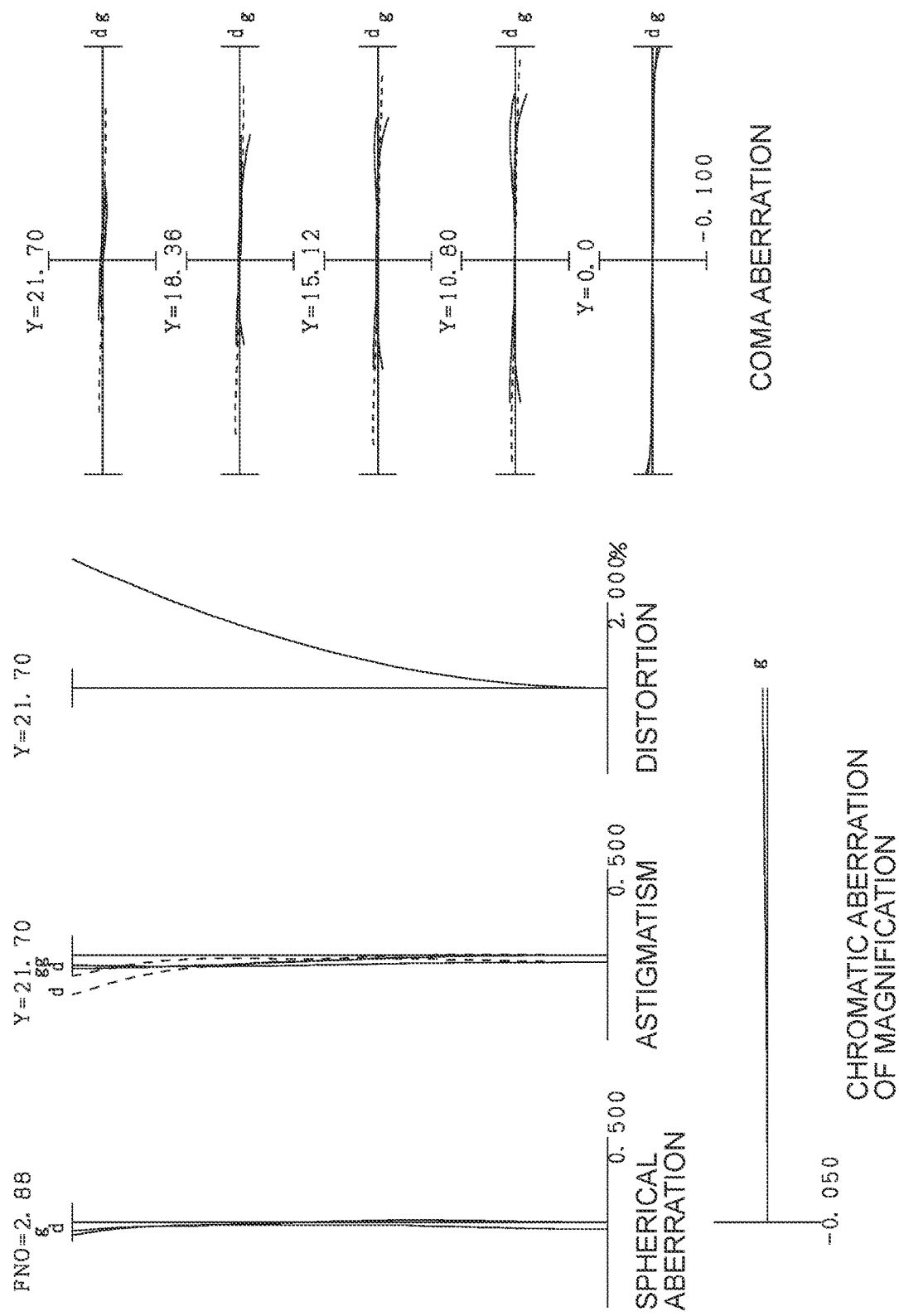

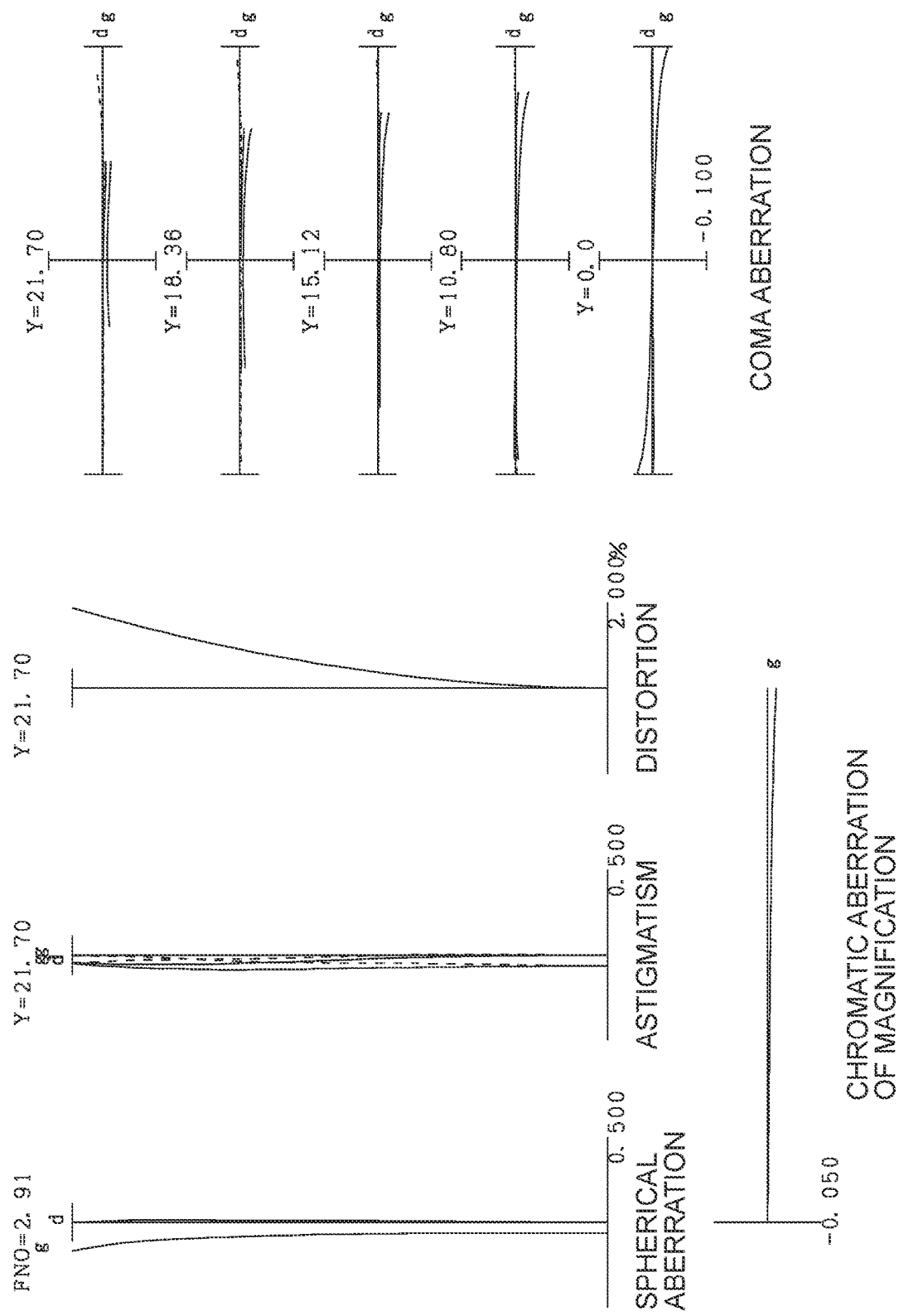

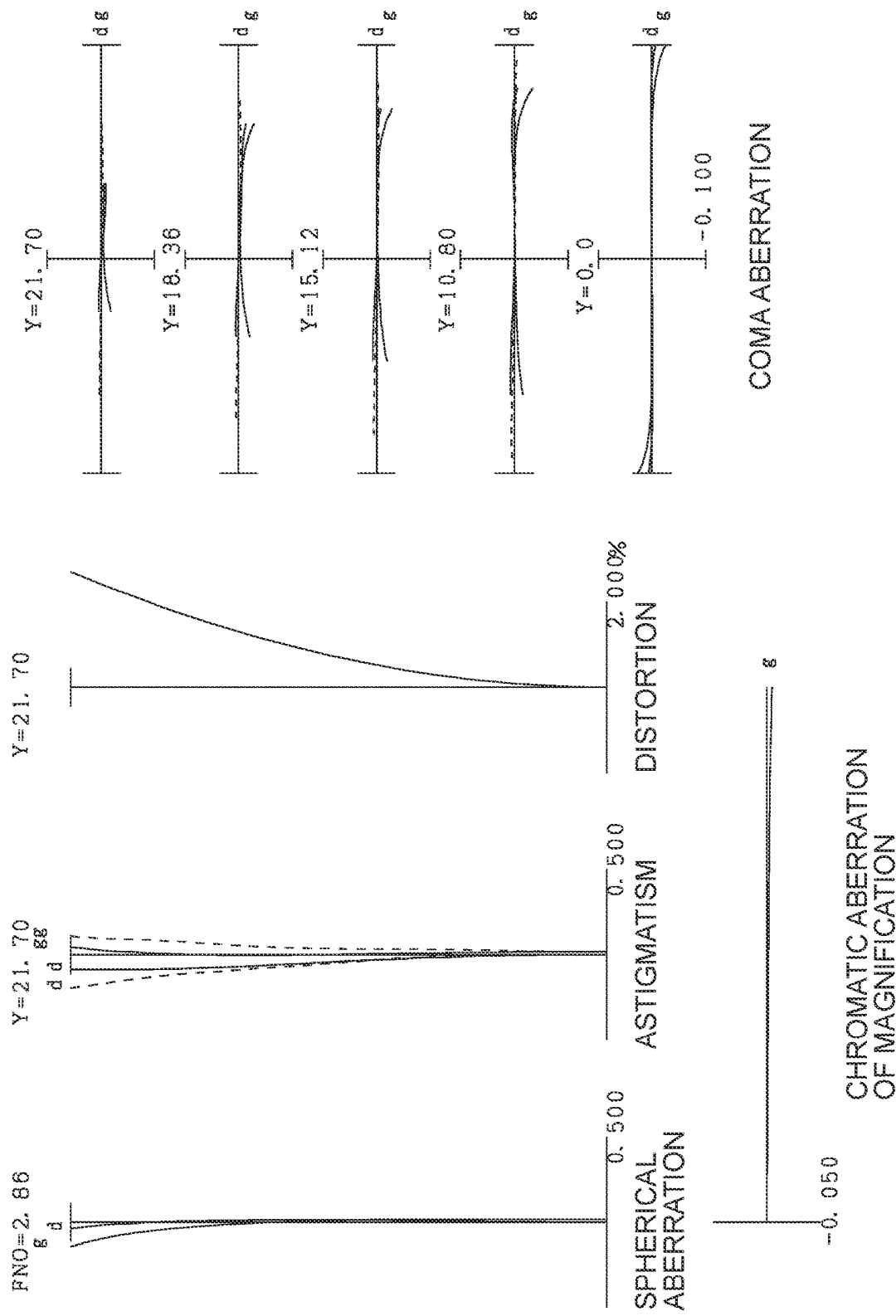

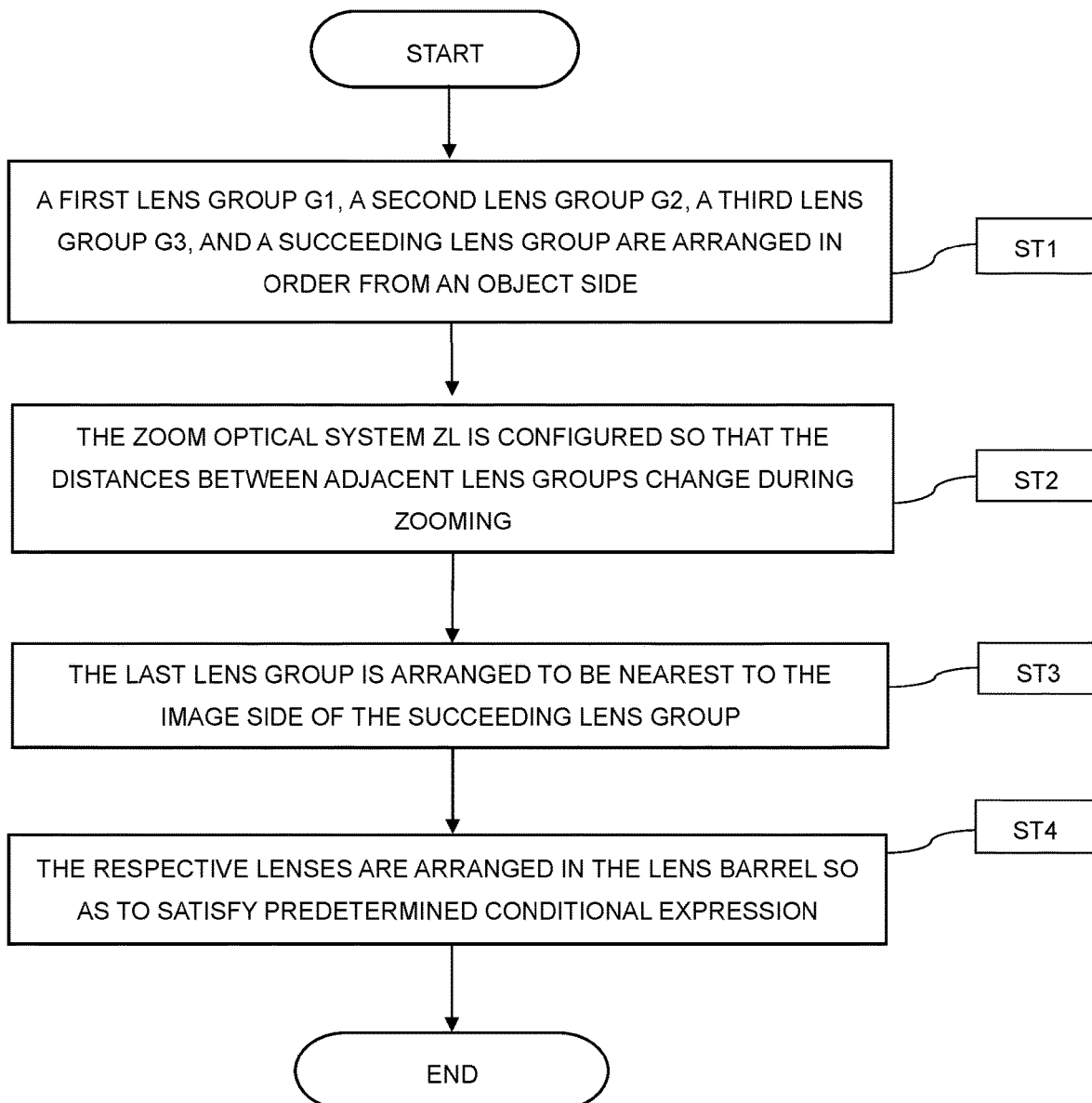

ZOOM OPTICAL SYSTEM, OPTICAL DEVICE, AND METHOD FOR MANUFACTURING ZOOM OPTICAL SYSTEM

TECHNICAL FIELD

The present invention relates to a zoom optical system, an optical device using the same, and a method for manufacturing the zoom optical system.

TECHNICAL BACKGROUND

Zoom optical systems suitable for photographic cameras, electronic still cameras, video cameras and the like have been proposed in the past (for example, see Patent Literature 1). It has been required to excellently correct the aberration in the zoom optical systems.

PRIOR ARTS LIST

Patent Document
Patent Literature 1: Japanese Laid-Open Patent Publication No. 2016-139125

SUMMARY OF THE INVENTION

A zoom optical system according to a first aspect comprises a first lens group having a positive refractive power, a second lens group having a negative refractive power, a third lens group having a positive refractive power, and a succeeding lens group, which are arranged in order from an object side, wherein during zooming, distances between adjacent lens groups change, and the first lens group is fixed with respect to an image surface; during zooming from a wide angle end state to a telephoto end state, the third lens group moves toward an image surface; and the succeeding lens group includes a last lens group arranged to be nearest to the image side, and satisfies the following conditional expression:

$$-10.00 < f3/(-fE) < 3.50$$

where f3 represents a focal length of the third lens group, and
fE represents a focal length of the last lens group.

An optical device according to a second aspect is configured with the above-mentioned zoom optical system being installed therein.

A method for manufacturing a zoom optical system according to a third aspect is a method of manufacturing a zoom optical system comprising a first lens group having a positive refractive power, a second lens group having a negative refractive power, a third lens group having a positive refractive power, and a succeeding lens group, which are arranged in order from an object side, wherein during zooming, distances between adjacent lens groups change, and the first lens group is fixed with respect to an image surface; during zooming from a wide angle end state to a telephoto end state, the third lens group moves toward an image surface; the succeeding lens group includes a last lens group arranged to be nearest to the image surface; and the respective lenses are arranged in a barrel lens so as to satisfy the following conditional expression:

$$-10.00 < f3/(-fE) < 3.50$$

where f3 represents a focal length of the third lens group, and
fE represents a focal length of the last lens group.

BRIEF DESCRIPTION OF THE DRAWINGS

FIGS. 2A, 2B, and 2C are various aberration graphs in a wide angle end state, an intermediate focal length state, and a telephoto end state of the zoom optical system according to the first example respectively;
FIGS. 4A, 4B, and 4C are various aberration graphs in a wide angle end state, an intermediate focal length state, and a telephoto end state of the zoom optical system according to the second example respectively;
FIGS. 6A, 6B, and 6C are various aberration graphs in a wide angle end state, an intermediate focal length state, and a telephoto end state of the zoom optical system according to the third example respectively;
FIGS. 8A, 8B, and 8C are various aberration graphs in a wide angle end state, an intermediate focal length state, and a telephoto end state of the zoom optical system according to the fourth example respectively;
FIGS. 10A, 10B, and 10C are various aberration graphs in a wide angle end state, an intermediate focal length state, and a telephoto end state of the zoom optical system according to the fifth example respectively;
FIGS. 12A, 12B, and 12C are various aberration graphs in a wide angle end state, an intermediate focal length state, and a telephoto end state of the zoom optical system according to the sixth example respectively;
FIGS. 14A, 14B, and 14C are various aberration graphs in a wide angle end state, an intermediate focal length state, and a telephoto end state of the zoom optical system according to the seventh example respectively;
FIG. 16 is a flowchart showing a method for manufacturing the zoom optical system according to the present embodiment.

DESCRIPTION OF THE EMBODIMENTS

Figure 15:
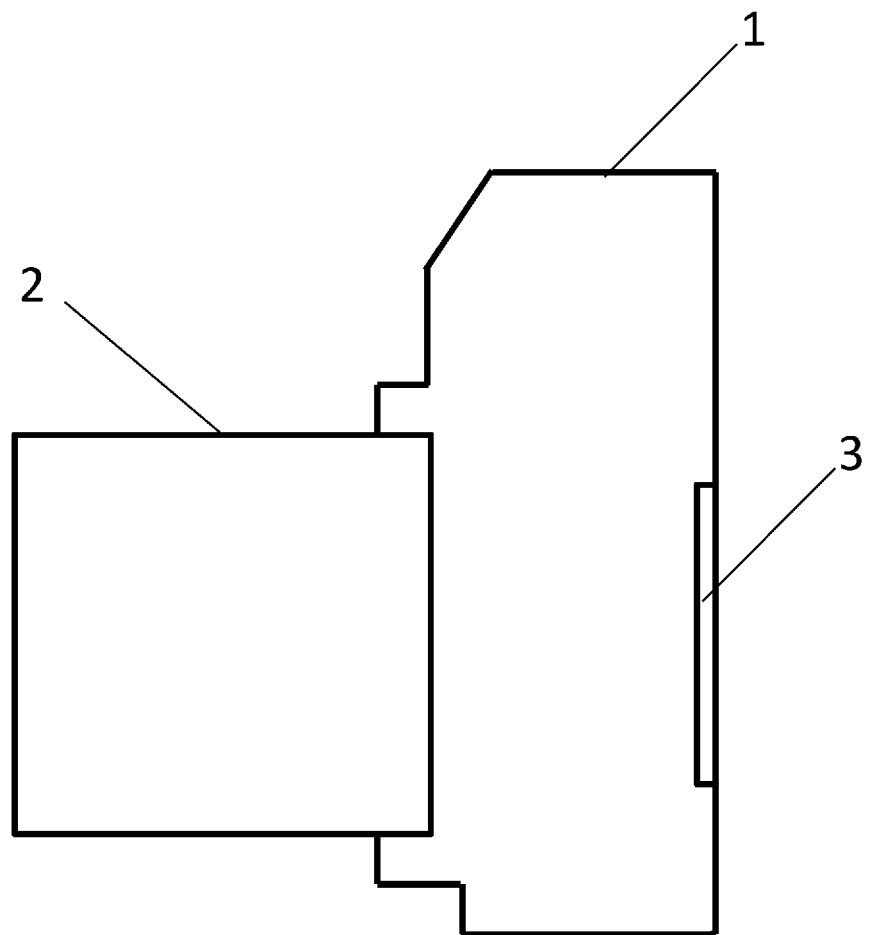
FIG. 15 is a diagram showing a configuration of a camera comprising a zoom optical system according to the present embodiment.

A zoom optical system and an optical device according to an embodiment will be hereinafter described with reference to the drawings. First, a camera (optical device) comprising a zoom optical system according to the present embodiment will be described with reference to FIG. 15. As shown in FIG. 15, the camera 1 is a digital camera comprising a zoom optical system according to the present embodiment as a photographing lens 2. In the camera 1, light from an object (subject) (not shown) is collected by the photographing lens 2 and reaches an imaging element 3. As a result, an image of the light from the subject is captured by the imaging element 3 and recorded as a subject image in a memory (not shown). In this way, a photographer can photograph the subject with the camera 1. Note that this camera may be a mirrorless camera or a single-lens reflex type camera comprising a quick return mirror.

Figure 1:
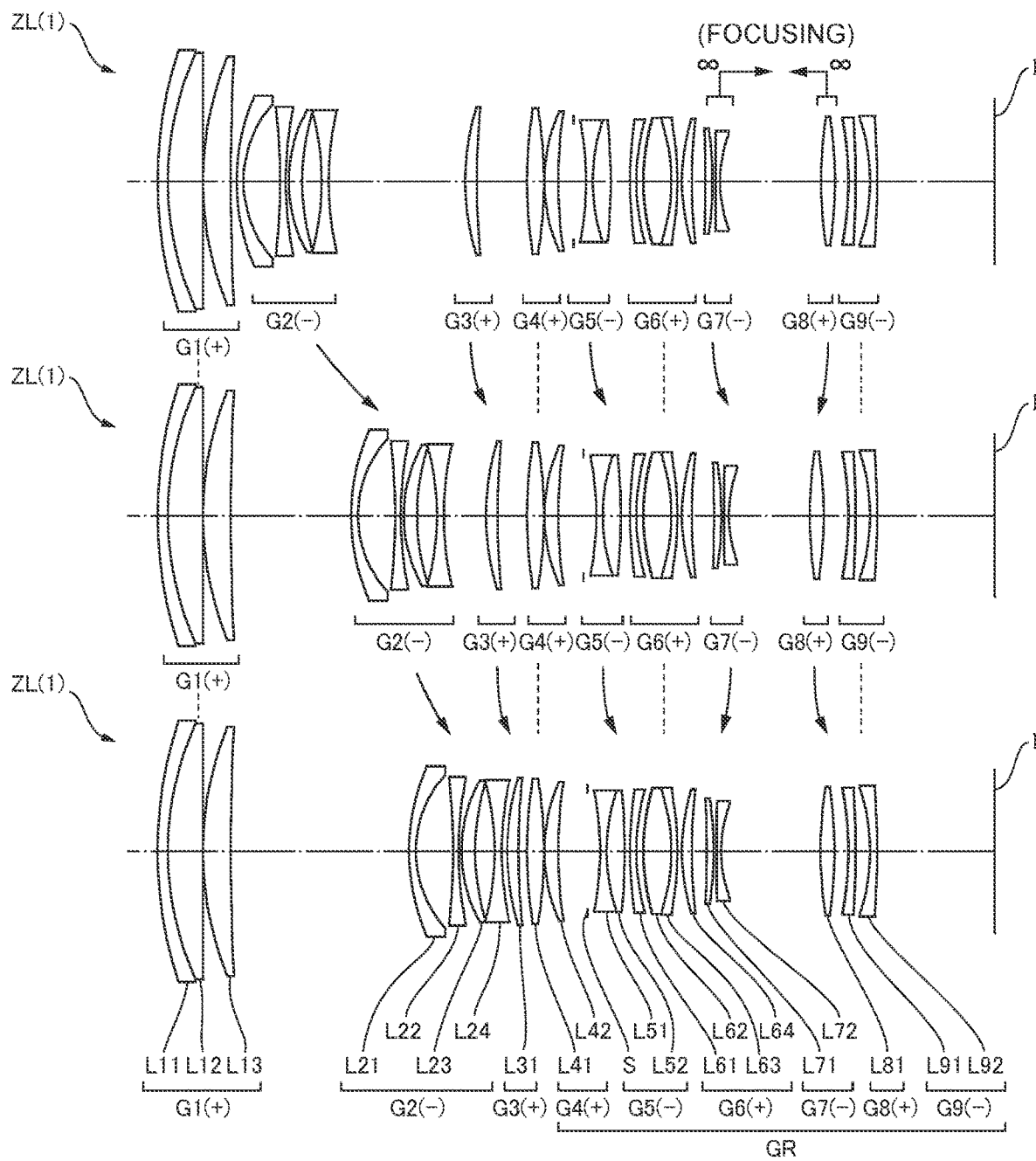
FIG. 1 is a diagram showing the movement of lenses when a zoom optical system according to a first example changes from a wide angle end state to a telephoto end state.

Next, the zoom optical system (photographing lens) according to the present embodiment will be described. A zoom optical system ZL(1) as an example of the zoom optical system (zoom lens) ZL according to the present embodiment comprises a first lens group G1 having a positive refractive power, a second lens group G2 having a negative refractive power, a third lens group G3 having a positive refractive power, and a succeeding lens group GR which are arranged in order from an object side as shown in FIG. 1. During zooming, the distances between adjacent lens groups change. Note that the first lens group G1 is fixed with respect to an image surface during zooming. During zooming from a wide angle end state to a telephoto end state, the third lens group G3 moves toward an image surface along an optical axis. The succeeding lens group GR comprises a last lens group arranged to be nearest to the image surface.

Under the above-mentioned configuration, the zoom optical system ZL according to the present embodiment satisfies the following conditional expression (1).

$$-10.00 < f3/(-fE) < 3.50 \quad (1)$$

where f3 represents a focal length of the third lens group G3, and fE represents a focal length of the last lens group.

According to the present embodiment, it is possible to obtain a zoom optical system in which various aberrations including a spherical aberration and the like are excellently corrected, and an optical device comprising this zoom optical system. The zoom optical system ZL according to the present embodiment may be a zoom optical system ZL(2) shown in FIG. 3, a zoom optical system ZL(3) shown in FIG. 5, or a zoom optical system ZL(4) shown in FIG. 7. Further, the zoom optical system ZL according to the present embodiment may be a zoom optical system ZL(5) shown in FIG. 9, a zoom optical system ZL(6) shown in FIG. 11, or a zoom optical system ZL(7) shown in FIG. 13.

The conditional expression (1) defines the ratio between the focal length of the third lens group G3 and the focal length of the last lens group. By satisfying the conditional expression (1), a spherical aberration, a coma aberration, and curvature of field can be excellently corrected.

When the corresponding value of the conditional expression (1) exceeds an upper limit value, the refractive power of the third lens group G3 becomes weak, so that it becomes difficult to excellently correct the spherical aberration and the coma aberration. Further, the negative refractive power of the last lens group becomes strong, so that it becomes difficult to excellently correct the coma aberration and the curvature of field. By setting the upper limit value of the conditional expression (1) to 3.40, the effect of the present embodiment can be made more reliable. In order to further ensure the effect of the present embodiment, the upper limit value of the conditional expression (1) may be set to 3.30, 3.20, 3.10, 3.00, 2.90, 2.85, 2.75, 2.70, and further 2.65.

When the corresponding value of the conditional expression (1) falls below a lower limit value, the refractive force of the third lens group G3 becomes stronger, so that it becomes difficult to excellently correct the spherical aberration and the coma aberration. Further, the refractive force of the last lens group becomes weak, so that it becomes difficult to excellently correct the coma aberration and the curvature of field. By setting the lower limit value of the conditional expression (1) to −8.00, the effect of the present embodiment can be made more reliable. In order to further ensure the effect of the present embodiment, the lower limit value of the conditional expression (1) may be set to −5.00, −3.00, −1.00, −0.50, 0.30, 0.40, and further 0.45.

It is desirable that the zoom optical system ZL according to the present embodiment satisfies the following conditional expression (2).

$$-10.00 < f1/(-fE) < 3.50 \quad (2)$$

where f1 represents the focal length of the first lens group G1.

The conditional expression (2) defines the ratio between the focal length of the first lens group G1 and the focal length of the last lens group. By satisfying the conditional expression (2), the spherical aberration, the curvature of field, and the coma aberration can be excellently corrected.

When the corresponding value of the conditional expression (2) exceeds an upper limit value, the refractive power of the first lens group G1 becomes weak, so that it becomes difficult to excellently correct the spherical aberration on the side near to the telephoto end state and the curvature of field on the side near to the wide angle end state. Further, the negative refractive power of the last lens group becomes strong, so that it becomes difficult to excellently correct the coma aberration and the curvature of field. By setting the upper limit value of the conditional expression (2) to 3.40, the effect of the present embodiment can be made more reliable. In order to further ensure the effect of the present embodiment, the upper limit value of the conditional expression (2) may be set to 3.30, 3.20, 3.10, 3.00, 2.95, 2.90, 2.85, 2.80, and further 2.75.

When the corresponding value of the conditional expression (2) falls below a lower limit value, the refractive power of the first lens group G1 becomes stronger, so that it becomes difficult to excellently correct the spherical aberration on the side near to the telephoto end state and the curvature of field on the side near to the wide-angle end state. Further, the refractive power of the last lens group becomes weak, so that it becomes difficult to excellently correct the coma aberration and the curvature of field. Note that by setting the lower limit value of the conditional expression (2) to −8.00, the effect of the present embodiment can be made more reliable. In order to further ensure the effect of the present embodiment, the lower limit value of the conditional expression (2) may be set to −5.00, −3.00, −1.00, −0.50, 0.30, 0.50, 0.75, 0.90, and further 1.00.

It is desirable that the zoom optical system ZL according to the present embodiment satisfies the following conditional expression (3).

$$-10.00 < f2/fE < 1.50 \quad (3)$$

where f2 represents a focal length of the second lens group G2.

The conditional expression (3) defines the ratio between the focal length of the second lens group G2 and the focal length of the last lens group. By satisfying the conditional expression (3), the spherical aberration and the coma aberration can be excellently corrected.

When the corresponding value of the conditional expression (3) exceeds an upper limit value, the refractive power of the second lens group G2 becomes weak, so that it becomes difficult to excellently correct the spherical aberration and the coma aberration. Further, the negative refractive power of the last lens group becomes strong, so that it becomes difficult to excellently correct the coma aberration and the curvature of field. By setting the upper limit value of the conditional expression (3) to 1.40, the effect of the present embodiment can be made more reliable. In order to further ensure the effect of the present embodiment, the upper limit value of the conditional expression (3) may be set to 1.30, 1.20, 1.10, 1.00, 0.90, and further 0.80.

When the corresponding value of the conditional expression (3) falls below a lower limit value, the refractive power of the second lens group G2 becomes strong, so that it becomes difficult to excellently correct the spherical aberration and the coma aberration. Further, the refractive power of the last lens group becomes weak, so that it becomes difficult to excellently correct the coma aberration and the curvature of field. By setting the lower limit value of the conditional expression (3) to −8.00, the effect of the present embodiment can be made more reliable. In order to further ensure the effect of the present embodiment, the lower limit value of the conditional expression (3) may be set to −5.00, −3.00, −1.00, −0.50, 0.10, 0. 20, 0.30, and further 0.35.

It is desirable that the zoom optical system ZL according to the present embodiment satisfies the following conditional expression (4).

$$1.50 < f1/(-f2) < 5.00 \quad (4)$$

where f1 represents a focal length of the first lens group G1, and f2 represents a focal length of the second lens group G2.

The conditional expression (4) defines the ratio between the focal length of the first lens group G1 and the focal length of the second lens group G2. By satisfying the conditional expression (4), the coma aberration and the spherical aberration can be excellently corrected, and a zooming ratio satisfying the present embodiment can be secured.

When the corresponding value of the conditional expression (4) exceeds an upper limit value, the refractive power of the second lens group G2 becomes strong, so that it becomes difficult to correct the coma aberration and the spherical aberration. By setting the upper limit value of the conditional expression (4) to 4.80, the effect of the present embodiment can be made more reliable. In order to further ensure the effect of the present embodiment, the upper limit value of the conditional expression (4) may be set to 4.50, 4.30, 4.00, 3.90, 3.80, and further 3.75.

When the corresponding value of the conditional expression (4) falls below a lower limit value, the refractive power of the first lens group G1 becomes strong, so that it becomes difficult to correct the coma aberration and the spherical aberration. By setting the lower limit value of the conditional expression (4) to 1.75, the effect of the present embodiment can be made more reliable. In order to further ensure the effect of the present embodiment, the lower limit value of the conditional expression (4) may be set to 1.90, 2.00, 2.25, 2.40, 2.50, 2.70, 2.80, 2.90, and further 3.00.

It is desirable that the zoom optical system ZL according to the present embodiment satisfies the following conditional expression (5).

$$0.80 < f1/f3 < 2.50 \quad (5)$$

where f1 represents a focal length of the first lens group G1.

The conditional expression (5) defines the ratio between the focal length of the first lens group G1 and the focal length of the third lens group G3. By satisfying the conditional expression (5), the spherical aberration and the coma aberration can be excellently corrected.

When the corresponding value of the conditional expression (5) exceeds an upper limit value, the refractive power of the third lens group G3 becomes strong, so that it becomes difficult to correct the spherical aberration and the coma aberration. By setting the upper limit value of the conditional expression (5) to 2.45, the effect of the present embodiment can be made more reliable. In order to further ensure the effect of the present embodiment, the upper limit value of the conditional expression (5) may be set to 2.40, 2.20, 2.00, 1.90, 1.80, 1.70, 1.60 and further 1.50.

When the corresponding value of the conditional expression (5) falls below a lower limit value, the refractive power of the first lens group G1 becomes strong, so that it becomes difficult to correct the spherical aberration and the coma aberration. By setting the lower limit value of the conditional expression (5) to 0.82, the effect of the present embodiment can be made more reliable. In order to further ensure the effect of the present embodiment, the lower limit value of the conditional expression (5) may be set to 0.85, 0.87, 0.90, 0.92, 0.95, 0.98, and further 1.00.

In the zoom optical system ZL according to the present embodiment, it is desirable that the succeeding lens group GR comprises a fourth lens group G4 and satisfies the following conditional expression (6).

$$-2.00 < f1/f4 < 4.00 \quad (6)$$

where f1 represents a focal length of the first lens group G1, and f4 represents the focal length of the fourth lens group G4.

The conditional expression (6) defines the ratio between the focal length of the first lens group G1 and the focal length of the fourth lens group G4. By satisfying the conditional expression (6), the spherical aberration and the coma aberration can be excellently corrected.

When the corresponding value of the conditional expression (6) exceeds an upper limit value, the refractive power of the fourth lens group G4 becomes strong, so that it becomes difficult to correct the spherical aberration and the coma aberration. By setting the upper limit value of the conditional expression (6) to 3.80, the effect of the present embodiment can be made more reliable. In order to further ensure the effect of the present embodiment, the upper limit value of the conditional expression (6) may be set to 3.60, 3.50, 3.20, 3.00, 2.80, 2.60, 2.50, 2.40, and further 2.30.

When the corresponding value of the conditional expression (6) falls below a lower limit value, the refractive power of the first lens group G1 becomes strong, so that it becomes difficult to correct the spherical aberration and the coma aberration. By setting the lower limit value of the conditional expression (6) to −1.50, the effect of the present embodiment can be made more reliable. In order to further ensure the effect of the present embodiment, the lower limit value of the conditional expression (6) may be set to 0.50, 0.80, 1.00, 1.20, 1.40, 1.50, and further 1.55.

In the zoom optical system ZL according to the present embodiment, it is desirable that the last lens group is fixed with respect to the image surface during zooming. As a result, a drive mechanism for the lens groups of the present embodiment can be simplified and a lens barrel can be miniaturized.

In the zoom optical system ZL according to the present embodiment, it is desirable that during zooming, at least one lens group out of the lens groups arranged to be nearer to the image surface than the third lens group G3 is fixed with respect to the image surface. This is preferable because the drive mechanism for the lens groups of the present embodiment can be simplified, the lens barrel can be miniaturized, and the aberration fluctuation during zooming can be reduced.

In the zoom optical system ZL according to the present embodiment, it is desirable that the succeeding lens group GR comprises a first focusing lens group and a second focusing lens group arranged in order from the object side, the first focusing lens group moving during focusing and having a negative refractive power, and the second focusing lens group moving during focusing and having a positive refractive power, and the succeeding lens group GR satisfies the following conditional expression (7).

$$0.80 < (-fF1)/fF2 < 5.00 \tag{7}$$

where fF1 represents a focal length of the first focusing lens group, and fF2 represents a focal length of the second focusing lens group.

The conditional expression (7) defines the ratio between the focal length of the first focusing lens group and the focal length of the second focusing lens group. By satisfying the conditional expression (7), it is possible to suppress fluctuations in various aberrations including the spherical aberration and the like during focusing from an infinite distant object to a short-distance object.

When the corresponding value of the conditional expression (7) exceeds an upper limit value, the refractive power of the second focusing lens group becomes strong, so that it becomes difficult to suppress fluctuations of various aberrations including the spherical aberration and the like during focusing. By setting the upper limit value of the conditional expression (7) to 4.75, the effect of the present embodiment can be made more reliable. In order to further ensure the effect of the present embodiment, the upper limit value of the conditional expression (7) may be set to 4.50, 4.25, 4.00, 3.75, 3.50, 3.25, 3.00, 2.75, 2.50, 2.25, and further 2.00.

When the corresponding value of the conditional expression (7) falls below a lower limit value, the negative aberration power of the first focusing lens group becomes stronger, so that it becomes difficult to suppress fluctuations in various aberrations including the spherical aberration and the like during focusing. By setting the lower limit value of the conditional expression (7) to 0.85, the effect of the present embodiment can be made more reliable. In order to further ensure the effect of the present embodiment, the lower limit value of the conditional expression (7) may be set to 0.90, 1.00, 1.10, 1.20, 1. 25, 1.28, and further 1.30.

In the zoom optical system ZL according to the present embodiment, it is desirable that the second lens group G2 has a positive lens satisfying the following conditional expressions (8) to (10).

$$18.0 < vdP < 35.0 \tag{8}$$

$$1.83 < ndP + (0.01425 \times vdP) < 2.12 \tag{9}$$

$$0.702 < \theta gFP + (0.00316 \times vdP) \tag{10}$$

where vdP represents Abbe number based on d-line of the positive lens, ndP represents a refractive index of the positive lens for the d line, and θgFP represents a partial dispersion ratio of the positive lens which is defined by the following expression, $$\theta gFP = (ngP - nFP)/(nFP - nCP)$$

where the refractive index of the positive lens for g-line is represented by ngP, the refractive index of the positive lens for F-line is represented by nFP, and the refractive index of the positive lens for C-line is represented by nCP.

Note that the Abbe number vdP based on the d-line of the positive lens is defined by the following expression.

$$vdP = (ndP - 1)/(nFP - nCP)$$

The conditional expression (8) defines an appropriate range of the Abbe number based on the d-line of the positive lens in the second lens group G2. By satisfying the conditional expression (8), it is possible to excellently correct reference aberrations such as the spherical aberration and the coma aberration and excellently correct a primary chromatic aberration (achromatism).

When the corresponding value of the conditional expression (8) exceeds an upper limit value, this is not preferable because this makes it difficult to correct a longitudinal chromatic aberration. By setting the upper limit value of the conditional expression (8) to 32.5, the effect of the present embodiment can be made more reliable. In order to further ensure the effect of the present embodiment, it is preferable to set the upper limit value of the conditional expression (8) to 31.5.

When the corresponding value of the conditional expression (8) falls below a lower limit value, this is not preferable because this makes it difficult to correct the longitudinal chromatic aberration. By setting the lower limit value of the conditional expression (8) to 20.00, the effect of the present embodiment can be made more reliable. In order to further ensure the effect of the present embodiment, it is preferable to set the lower limit value of the conditional expression (8) to 22.00, 23.00, 23.50, 24.00, 25.00, and further 26.00.

The conditional expression (9) defines an appropriate relationship between the refractive index based on the d-line of the positive lens in the second lens group G2 and the Abbe number based on the d-line. By satisfying the conditional expression (9), it is possible to excellently correct the reference aberrations such as the spherical aberration and the coma aberration and excellently correct the primary chromatic aberration (achromatism).

When the corresponding value of the conditional expression (9) deviates from the above range, this is not preferable because it becomes difficult to correct the curvature of field due to Petzval sum being small, for example. By setting an upper limit value of the conditional expression (9) to 2.10, the effect of the present embodiment can be made more reliable. In order to further ensure the effect of the present embodiment, it is preferable to set the upper limit value of the conditional expression (9) to 2.08 and further 2.06. Further, by setting a lower limit value of the conditional expression (9) to 1.84, the effect of the present embodiment can be made more reliable. In order to further ensure the effect of the present embodiment, it is preferable to set the lower limit value of the conditional expression (9) to 1.85.

The conditional expression (10) appropriately defines the anomalous dispersion characteristics of the positive lens in the second lens group G2. By satisfying the conditional expression (10), it is possible to excellently correct a secondary spectrum in addition to the primary achromatism in the correction of the chromatic aberration.

When the corresponding value of the conditional expression (10) falls below a lower limit value, the anomalous dispersion characteristics of the positive lens becomes small, so that it becomes difficult to correct the chromatic aberration. By setting the lower limit value of the conditional expression (10) to 0.704, the effect of the present embodiment can be made more reliable. In order to further ensure the effect of the present embodiment, it is preferable to set the lower limit value of the conditional expression (10) to 0.708, 0.710, and further 0.715.

It is desirable that the zoom optical system ZL according to the present embodiment satisfies the following conditional expression (11).

$$25.00°<2\omega w<50.00° \quad (11)$$

where $2\omega w$ represents a full angle of view of the zoom optical system ZL in the wide angle end state.

The conditional expression (11) defines the full angle of view of the zoom optical system ZL in the wide angle end state. By satisfying the conditional expression (11), it is possible to excellently correct various aberrations including the coma aberration, distortion, the curvature of field and the like while holding a wide angle of view that satisfies the present embodiment. By setting a lower limit value of the conditional expression (11) to 27.00°, the effect of the present embodiment can be made more reliable. In order to further ensure the effect of the present embodiment, the lower limit value of the conditional expression (11) may be set to 29.00°, 30.00°, 32.00°, and further 33.00°. Further, by setting an upper limit value of the conditional expression (11) to 48.00°, the effect of the present embodiment can be made more reliable. In order to further ensure the effect of the present embodiment, the upper limit value of the conditional expression (11) may be set to 45.00°, 42.00°, 40.00°, 38.00°, 36.00°, and further 35.00°.

It is desirable that the zoom optical system ZL according to the present embodiment satisfies the following conditional expression (12).

$$5.00°<2\omega t<20.00° \quad (12)$$

where $2\omega t$ represents a full angle of view of the zoom optical system ZL in the telephoto end state.

The conditional expression (12) defines the full angle of view of the zoom optical system ZL in the telephoto end state. By satisfying the conditional expression (12), it is possible to excellently correct various aberrations including the coma aberration, distortion, the curvature of field and the like. By setting an upper limit value of the conditional expression (12) to 18.00°, the effect of the present embodiment can be made more reliable. In order to further ensure the effect of the present embodiment, the upper limit value of the conditional expression (12) may be set to 16.00°, 15.00°, 14.00°, and further 13.00°. Further, by setting a lower limit value of the conditional expression (12) to 7.00°, the effect of the present embodiment can be made more reliable. In order to further ensure the effect of the present embodiment, the lower limit value of the conditional expression (12) may be set to 8.00°, 10.00°, 11.00°, and further 12.00°.

It is desirable that the zoom optical system ZL according to the present embodiment satisfies the following conditional expression (13).

$$0.20<BFw/fw<0.85 \quad (13)$$

where BFw represents a back focus of the zoom optical system ZL in the wide angle end state, and fw represents the focal length of the zoom optical system ZL in the wide angle end state.

The conditional expression (13) defines the ratio between the back focus of the zoom optical system ZL in the wide angle end state and the focal length of the zoom optical system ZL in the wide angle end state. By satisfying the conditional expression (13), it is possible to excellently correct various aberrations including the coma aberration and the like in the wide angle end state.

When the corresponding value of the conditional expression (13) exceeds an upper limit value, the back focus becomes excessively large with respect to the focal length of the zoom optical system ZL in the wide angle end state, so that it becomes difficult to correct various aberrations including the coma aberration and the like in the wide angle end state. By setting the upper limit value of the conditional expression (13) to 0.80, the effect of the present embodiment can be made more reliable. In order to further ensure the effect of the present embodiment, the upper limit value of the conditional expression (13) may be set to 0.75, 0.70, 0.65, 0.60, and further 0.55.

When the corresponding value of the conditional expression (13) falls below a lower limit value, the back focus becomes excessively small with respect to the focal length of the zoom optical system ZL in the wide angle end state, so that it becomes difficult to correct various aberrations including the coma aberration and the like in the wide angle end state. In addition, it becomes difficult to arrange mechanical members of the lens barrel. By setting the lower limit value of the conditional expression (13) to 0.25, the effect of the present embodiment can be made more reliable. In order to further ensure the effect of the present embodiment, the lower limit value of the conditional expression (13) may be set to 0.30, 0.35, 0.40, and further 0.42.

Subsequently, a method for manufacturing the zoom optical system ZL according to the present embodiment will be outlined with reference to FIG. 16. First, a first lens group G1 having a positive refractive power, a second lens group G2 having a negative refractive power, a third lens group G3 having a positive refractive power, and a succeeding lens group GR are arranged in order from an object side (step ST1). The zoom optical system ZL is configured so that the distances between adjacent lens groups change during zooming (step ST2). The first lens group G1 is fixed with respect to the image surface during zooming. The third lens group G3 moves toward an image surface along an optical axis during zooming from the wide angle end state to the telephoto end state. Further, the last lens group is arranged to be nearest to the image surface of the succeeding lens group GR (step ST3). Further, the respective lenses are arranged in the lens barrel so as to satisfy at least the above conditional expression (1) (step ST4). According to the manufacturing method as described above, it is possible to manufacture a zoom optical system in which various aberrations such as the spherical aberration are excellently corrected.

EXAMPLES

A zoom optical system ZL according to an example of the present embodiment will be hereinafter described with reference to the drawings. FIG. 1, FIG. 3, FIG. 5, FIG. 7, FIG. 9, FIG. 11, and FIG. 13 are diagrams showing the movement of lenses when zoom optical systems ZL {ZL(1) to ZL(7)} according to first to seventh examples change from the wide angle end state to the telephoto end state. In each figure, moving directions along the optical axis of the lens groups which move during zooming from the wide angle end state to the telephoto end state are indicated by arrows. Further, moving directions when the focusing lens groups focus on a short-distance object from infinity are indicated by arrows together with the word "focusing".

In these figures (FIG. 1, FIG. 3, FIG. 5, FIG. 7, FIG. 9, FIG. 11, FIG. 13), each lens group is represented by a combination of character G and a numeral, and each lens is represented by a combination of character L and a numeral. In this case, in order to prevent the types and numbers of the characters and the numerals from becoming large and complicated, the lens groups and the like are represented by independently using combinations of characters and numerals for each example. Therefore, even if the combination of the same character and the same numeral is used between the examples, it does not mean that they have the same configuration.

Tables 1 to 7 are shown below. Among these Tables, Table 1, Table 2, Table 3, Table 4, Table 5, Table 6 and Table 7 are tables showing various data in a first example, a second example, a third example, a fourth example, a fifth example, a sixth example and a seventh example, respectively. In each example, the d-line (wavelength λ=587.6 nm) and the g-line (wavelength λ=435.8 nm) are selected as calculation targets of the aberration characteristics.

In a "General Data" table, FNO represents F number, 2ω represents an angle of view (unit is ° (degrees), and ω is a half angle of view), and Y represents an image height. TL represents a distance obtained by adding BF to the distance from a lens forefront surface to a lens last surface on the optical axis upon focusing on infinity, and BF represents an air equivalent distance (back focus) from the lens last surface to the image surface I on the optical axis upon focusing on infinity. Note that these values indicate respective values for each zooming state of a wide angle end (W), an intermediate focal length (M), and a telephoto end (T). Further, in the [General Data] table, θgFP represents a partial dispersion ratio of the positive lens in the second lens group.

In a [Lens Data] table, a surface number indicate the order of an optical surface counted from the object side along a direction in which a light beam travels, R represents the radius of curvature of each optical surface (a surface whose center of curvature is located on the image side is defined as a positive value), D represents the distance to the next lens surface which is the distance on the optical axis from each optical surface to the next optical surface (or image surface), nd represents the refractive index of the material of the optical member for the d-line, vd represents the Abbe number based on the d-line of the material of the optical member, θgF represents the partial dispersion ratio of the material of the optical member, "∞" of the radius of curvature represents a plane or an aperture, and (aperture S) represents an aperture stop. The description of the refractive index nd of air=1.00000 is omitted. When the lens surface is an aspherical surface, the surface number is marked with * and the paraxial radius of curvature is indicated in the column of the radius of curvature R.

The refractive index of the material of the optical member for the g-line (wavelength λ=435.8 nm) is represented by ng, the refractive index of the material of the optical member for the F-line (wavelength λ=486.1 nm) is represented by nF, and the refractive index of the material of the optical member for the C-line (wavelength λ=656.3 nm) is represented by nC. At this time, the partial dispersion ratio θgF of the material of the optical member is defined by the following expression (A).

$$\theta gF=(ng-nF)/(nF-nC) \quad (A)$$

In an [Aspherical Surface Data] table, the shape of the aspherical surface shown in [Lens Data] is represented by the following expression (B). X(y) represents the distance (zag amount) along the optical axis direction from a tangent plane at a vertex of the aspherical surface to a position on the aspherical surface at a height y, R represents the radius of curvature (paraxial radius of curvature) of a reference sphere, κ represents a conical coefficient, and Ai represents an i-th order aspherical coefficient. "E-n" represents "×10⁻ⁿ". For example, 1.234E-05=1.234×10⁻⁵. Note that a second-order aspherical coefficient A2 is 0, and the description thereof is omitted.

$$X(y)=(y^2/R)/\{1+(1-\kappa xy^2/R^2)^{1/2}\}+A4xy^4+A6xy^6+ A8xy^8+A10xy^{10}+A12xy^{12} \quad (B)$$

A [Lens Group Data] table shows a first surface (the surface nearest to an object) and the focal length of each lens group.

A [Variable Distance Data] table shows the distance to the next lens surface at a surface number in which the distance to the next lens surface is "variable" in the table showing [Lens Data]. In this case, the distance to the next lens surface in each zoom state of the wide angle end (W), the intermediate focal length (M), and the telephoto end (T) is shown with respect to each of a focusing-on-infinity state and a focusing-on-short-distance state. In [Variable Distance Data], f represents the focal length of the whole lens system, and β represents the photographing magnification.

A [Conditional Expression Corresponding Value] table shows the values corresponding to the respective conditional expressions.

Hereinafter, in all the data values, "mm" is generally used for the focal length f, the radius of curvature R, the distance D to the next lens surface, other lengths and the like which are described unless otherwise specified, but they are not limited to this manner because the equivalent optical performance can be obtained even when the optical system is proportionally scaled up or proportionally scaled down.

The foregoing descriptions on the tables are common to all the examples, and duplicate descriptions are omitted below.

First Example

A first example will be described with reference to FIGS. 1 to 2 and Table 1. FIG. 1 is a diagram showing the movement of lenses when a zoom optical system according to the first example changes from a wide angle end state to a telephoto end state. The zoom optical system ZL(1) according to the first example comprises a first lens group G1 having a positive refractive power, a second lens group G2 having a negative refractive power, a third lens group G3 having a positive refractive power, a fourth lens group G4 having a positive refractive power, a fifth lens group G5 having a negative refractive power, a sixth lens group G6 having a positive refractive power, a seventh lens group G7 having a negative refractive power, an eighth lens group G8 having a positive refractive power, and a ninth lens group G9 having a negative refractive power, which are arranged in order from an object side. During zooming from the wide angle end state to the telephoto end state, the second lens group G2, the third lens group G3, the fifth lens group G5, the seventh lens group G7, and the eighth lens group G8 move separately from one another in directions indicated by arrows of FIG. 1, and the distances between adjacent lens groups change. Note that the first lens group G1, the fourth lens group G4, the sixth lens group G6, and the ninth lens group G9 are fixed with respect to an image surface I during zooming. A lens group consisting of the fourth lens group G4, the fifth lens group G5, the sixth lens group G6, the seventh lens group G7, the eighth lens group G8, and the ninth lens group G9 corresponds to a succeeding lens group GR. Sign (+) or (−) attached to each lens group symbol indicates the refractive power of each lens group, and this also applies to all the following examples.

The first lens group G1 comprises a cemented lens including a negative meniscus lens L11 having a convex surface facing the object and a plano-convex positive lens L12 having a convex surface facing the object, and a positive meniscus lens L13 having a convex surface facing the object, which are arranged in order from the object side.

The second lens group G2 comprises a negative meniscus lens L21 having a convex surface facing the object, a negative lens L22 having a biconcave shape, a positive meniscus lens L23 having a convex surface facing the object, and a negative lens L24 having a biconcave shape, which are arranged in order from the object side.

The third lens group G3 comprises a positive meniscus lens L31 having a convex surface facing the object.

The fourth lens group G4 comprises a positive lens L41 having a biconvex shape, and a negative meniscus lens L42 having a convex surface facing the object, which are arranged in order from the object side.

The fifth lens group G5 comprises a cemented lens including a negative lens L51 having a biconcave shape and a positive lens L52 having a biconvex shape. An aperture stop S is arranged to be nearest to the object in the fifth lens group G5, and it moves together with the fifth lens group G5 during zooming.

The sixth lens group G6 comprises a cemented lens including a negative meniscus lens L61 having a convex surface facing the object, a positive lens L62 having a biconvex shape and a negative meniscus lens L63 having a concave surface facing the object, and a positive meniscus lens L64 having a convex surface facing the object, which are arranged in order from the object side. The positive lens L62 has an aspherical lens surface on the object side.

The seventh lens group G7 comprises a positive meniscus lens L71 having a concave surface facing the object and a negative meniscus lens L72 having a convex surface facing the object, which are arranged in order from the object side.

The eighth lens group G8 comprises a positive lens L81 having a biconvex shape.

The ninth lens group G9 comprises a negative meniscus lens L91 having a concave surface facing the object and a negative meniscus lens L92 having a concave surface facing the object which are arranged in order from the object side. The negative meniscus lens L91 has an aspherical lens surface on the object side. The image surface I is arranged on the image side of the ninth lens group G9. In other words, the ninth lens group G9 corresponds to the last lens group.

In the present example, the seventh lens group G7 is moved toward the image surface I, and the eighth lens group G8 is moved toward the object side, thereby performing focusing from a long-distance object to a short-distance object (from an infinite distant object to a finite distant object). In other words, the seventh lens group G7 corresponds to the first focusing lens group, and the eighth lens group G8 corresponds to the second focusing lens group.

Table 1 below lists data values of the zoom optical system according to the first example.

TABLE 1

[General Data]

Zooming ratio 2.74
θgFP = 0.6319

|  | W | M | T |
|---|---|---|---|
| FNO | 2.88277 | 2.8637 | 2.87906 |
| 2ω | 33.79332 | 17.81742 | 12.27158 |
| Y | 21.70 | 21.70 | 21.70 |
| TL | 199.88619 | 199.88619 | 199.88619 |
| BF | 32.5469 | 32.5469 | 32.5469 |

[Lens Data]

| Surface Number | R | D | nd | νd | θgF |
|---|---|---|---|---|---|
| 1 | 116.34563 | 2.80 | 2.00100 | 29.12 | |
| 2 | 85.133 | 9.70 | 1.49782 | 82.57 | |
| 3 | ∞ | 0.10 | | | |
| 4 | 92.01324 | 7.70 | 1.43385 | 95.25 | |
| 5 | 696.98757 | D5(Variable) | | | |
| 6 | 58.77 | 1.90 | 1.60300 | 65.44 | |
| 7 | 31.87745 | 10.30 | | | |
| 8 | −186.53352 | 1.60 | 1.49782 | 82.57 | |
| 9 | 105.34866 | 0.80 | | | |
| 10 | 41.08366 | 3.70 | 1.66382 | 27.35 | 0.6319 |
| 11 | 64.00891 | 5.50 | | | |
| 12 | −71.62319 | 1.90 | 1.49782 | 82.57 | |
| 13 | 88.67881 | D13(Variable) | | | |
| 14 | 69.46271 | 3.20 | 1.94595 | 17.98 | |
| 15 | 201.8299 | D15(Variable) | | | |
| 16 | 126.26563 | 4.70 | 1.49782 | 82.57 | |
| 17 | −126.26563 | 0.10 | | | |
| 18 | 47.66354 | 3.85 | 1.49782 | 82.57 | |
| 19 | 122.86616 | D19(Variable) | | | |
| 20 | ∞ | 3.50 | | | (Aperture Stop S) |
| 21 | −84.82141 | 1.80 | 1.92286 | 20.88 | |

TABLE 1-continued

| | | | | |
|---|---|---|---|---|
| 22 | 52.171 | 5.00 | 1.49782 | 82.57 |
| 23 | −170.93248 | D23(Variable) | | |
| 24 | 111.64091 | 1.70 | 1.85026 | 32.35 |
| 25 | 60.55636 | 2.00 | | |
| 26* | 58.68256 | 7.70 | 1.59306 | 66.97 |
| 27 | −55.839 | 1.70 | 1.62004 | 36.4 |
| 28 | −95.85894 | 1.30 | | |
| 29 | 58.0393 | 2.70 | 1.80100 | 34.92 |
| 30 | 135.30037 | D30(Variable) | | |
| 31 | −369.28597 | 2.00 | 1.94595 | 17.98 |
| 32 | −98.65201 | 0.80 | | |
| 33 | 1344.92022 | 1.25 | 1.71300 | 53.96 |
| 34 | 37.13115 | D34(Variable) | | |
| 35 | 119.39985 | 3.85 | 1.90265 | 35.77 |
| 36 | −119.39985 | D36(Variable) | | |
| 37* | −83.23047 | 1.90 | 1.51696 | 64.14 |
| 38 | −335.27926 | 4.10 | | |
| 39 | −54.71091 | 1.90 | 1.56384 | 60.71 |
| 40 | −276.64763 | BF | | |

[Aspherical Surface Data]

Twenty-sixth Surface $x = 0.00, A4 = -2.00E-06, A6 = 8.31E-10$
$A8 = -6.83E-12, A10 = 2.63E-14, A12 = -3.55E-17$ Thirty-seventh Surface $x = 0.00, A4 = 1.18E-06, A6 = 1.63E-09$
$A8 = -7.32E-12, A10 = 2.41E-14, A12 = -2.65E-17$

[Lens Group Data]

| Group | First surface | Focal length |
|---|---|---|
| G1 | 1 | 147.97696 |
| G2 | 6 | −40.5909 |
| G3 | 14 | 110.66613 |
| G4 | 16 | 69.76371 |
| G5 | 20 | −62.56946 |
| G6 | 24 | 56.88582 |
| G7 | 31 | −87.28124 |
| G8 | 35 | 66.64828 |
| G9 | 37 | −76.28082 |

[Variable Distance Data]

| | W Infinity | M Infinity | T Infinity | W Short-distance | M Short-distance | T Short-distance |
|---|---|---|---|---|---|---|
| f | 71.50119 | 135 | 196 | — | — | — |
| β | — | — | — | −0.08318 | −0.14416 | −0.19832 |
| D5 | 1.59716 | 33.49859 | 49.53103 | 1.59716 | 33.49859 | 49.53103 |
| D13 | 37.80333 | 11.65214 | 1.60516 | 37.80333 | 11.65214 | 1.60516 |
| D15 | 14.09965 | 8.34942 | 2.36395 | 14.09965 | 8.34942 | 2.36395 |
| D19 | 4.24982 | 7.0795 | 8.12305 | 4.24982 | 7.0795 | 8.12305 |
| D23 | 5.35666 | 2.52698 | 1.48342 | 5.35666 | 2.52698 | 1.48342 |
| D30 | 3.81632 | 6.22894 | 4.10722 | 5.10137 | 11.89468 | 15.63265 |
| D34 | 28.12371 | 22.59291 | 27.70989 | 24.58984 | 10.97816 | 4.65903 |
| D36 | 3.7896 | 6.90778 | 3.91252 | 6.03843 | 12.8568 | 15.43795 |

[Conditional expression corresponding value]

Conditional Expression(1) f3/(−fE) = 1.45
Conditional Expression(2) f1/(−fE) = 1.94
Conditional Expression(3) f2/fE = 0.53
Conditional Expression(4) f1/(−f2) = 3.65
Conditional Expression(5) f1/f3 = 1.34
Conditional Expression(6) f1/f4 = 2.12
Conditional Expression(7) (−fF1)/fF2 = 1.31
Conditional Expression(8) υdP = 27.35
Conditional Expression(9) ndP + (0.01425 × υdP) = 2.0536
Conditional Expression(10) θgFP + (0.00316 × υdP) = 0.7183
Conditional Expression(11) 2ωw = 33.79°
Conditional Expression(12) 2ωt = 12.27°
Conditional Expression(13) BFw/fw = 0.46

FIGS. 2A, 2B, and 2C are various aberration graphs of the zoom optical system according to the first example in a wide angle end state, an intermediate focal length state, and a telephoto end state, respectively. In each aberration graph, FNO indicates F number, and Y indicates an image height. A spherical aberration graph shows the value of the F number corresponding to a maximum aperture, an astigmatism graph and a distortion graph show the maximum values of the image height, and a lateral aberration graph shows the value of each image height. d represents the d-line (wavelength λ=587.6 nm), and g represents the g-line (wavelength λ=435.8 nm). In the astigmatism graph, a solid line represents a sagittal image surface, and a broken line represents a meridional image surface. Note that the same signs as those of the present example are used in the aberration graphs of the respective examples shown below, and duplicate description is omitted.

From each of the various aberration graphs, it can be seen that the zoom optical system according to the first example excellently corrects various aberrations and has excellent image-forming performance.

Second Example

Figure 3:
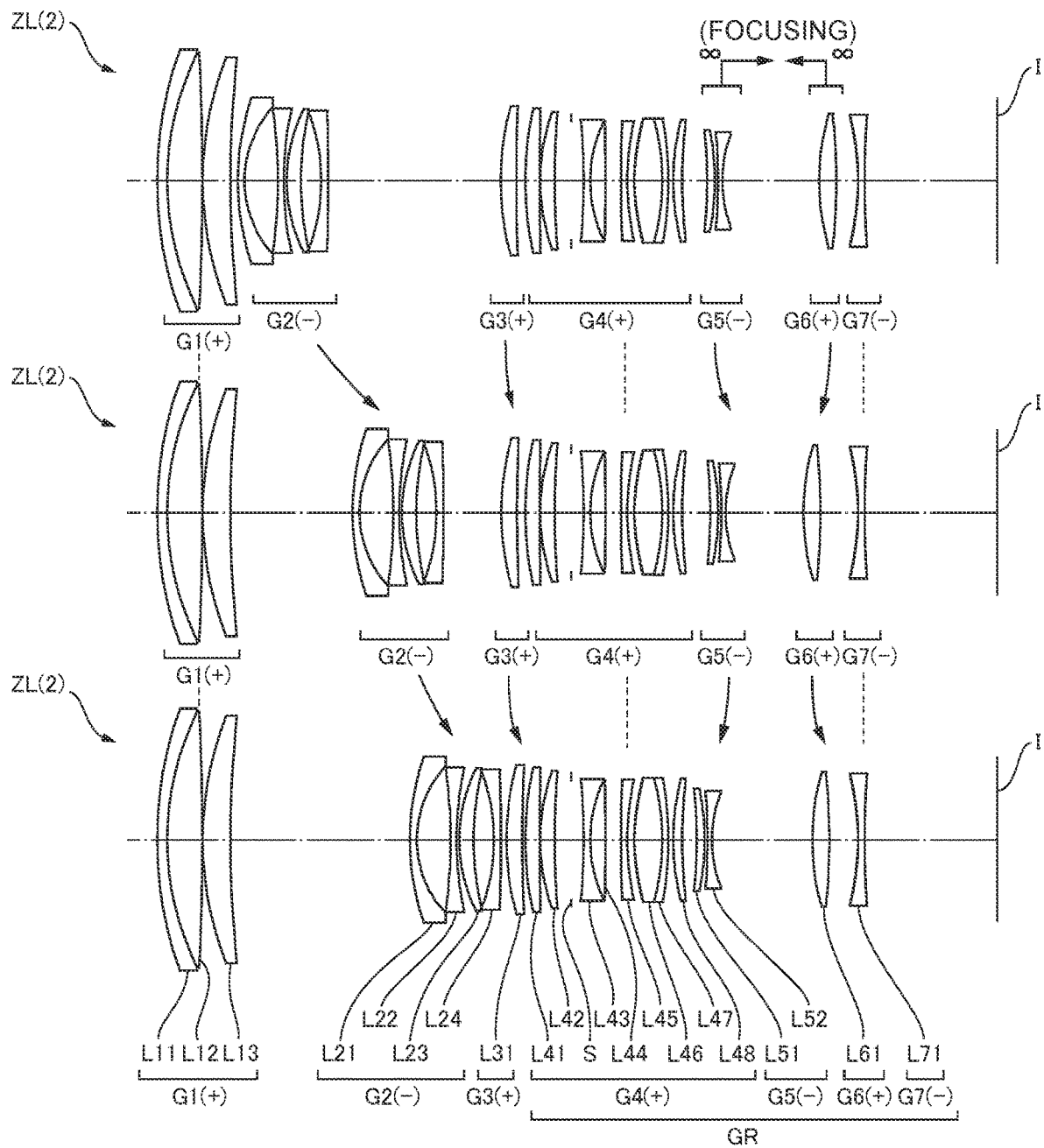
FIG. 3 is a diagram showing the movement of lenses when a zoom optical system according to a second example changes from a wide angle end state to a telephoto end state.

A second example will be described with reference to FIGS. 3 to 4 and Table 2. FIG. 3 is a diagram showing the movement of the lenses when the zoom optical system according to the second example changes from the wide angle end state to the telephoto end state. The zoom optical system ZL(2) according to the second embodiment comprises a first lens group G1 having a positive refractive power, a second lens group G2 having a negative refractive power, a third lens group G3 having a positive refractive power, a fourth lens group G4 having a positive refractive power, a fifth lens group G5 having a negative refractive power, a sixth lens group G6 having a positive refractive power, and a seventh lens group G7 having a negative refractive power, which are arranged in order from the object side. During zooming from the wide angle end state to the telephoto end state, the second lens group G2, the third lens group G3, the fifth lens group G5, and the sixth lens group G6 move separately from one another in directions indicated by arrows in FIG. 3, so that the distances between adjacent lens groups change. Note that the first lens group G1, the fourth lens group G4, and the seventh lens group G7 are fixed with respect to the image surface I during zooming. A lens group consisting of the fourth lens group G4, the fifth lens group G5, the sixth lens group G6, and the seventh lens group G7 corresponds to the succeeding lens group GR.

The first lens group G1 comprises a cemented lens including a negative meniscus lens L11 having a convex surface facing the object and a positive lens L12 having a biconvex shape, and a positive meniscus lens L13 having a convex surface facing the object, which are arranged in order from the object side.

The second lens group G2 comprises a negative meniscus lens L21 having a convex surface facing the object, a negative lens L22 having a biconcave shape, a positive meniscus lens L23 having a convex surface facing the object, and a negative meniscus lens L24 having a concave surface facing the object, which are arranged in order from the object side.

The third lens group G3 comprises a positive meniscus lens L31 having a convex surface facing the object.

The fourth lens group G4 comprises a positive meniscus lens L41 having a convex surface facing the object, a positive meniscus lens L42 having a convex surface facing the object, a cemented lens including a negative lens L43 having a biconcave shape and a positive lens L44 having a biconvex shape, a negative meniscus lens L45 having a convex surface facing the object, a cemented lens including a positive lens L46 having a biconvex shape and a negative meniscus lens L47 having a concave surface facing the object, and a positive meniscus lens L48 having a convex surface facing the object, which are arranged in order from the object side. An aperture stop S is arranged between the positive meniscus lens L42 and the negative lens L43 in the fourth lens group G4, and moves together with the fourth lens group G4 during zooming. The positive lens L46 has an aspherical lens surface on the object side.

The fifth lens group G5 comprises a positive meniscus lens L51 having a concave surface facing the object, and a negative lens L52 having a biconcave shape, which are arranged in order from the object side.

The sixth lens group G6 comprises a positive lens L61 having a biconvex shape.

The seventh lens group G7 comprises a negative lens L71 having a biconcave shape. The negative lens L71 has an aspherical lens surface on the object side. The image surface I is arranged on the image side of the seventh lens group G7. In other words, the seventh lens group G7 corresponds to the last lens group.

In the present example, the fifth lens group G5 is moved toward the image surface I, and the sixth lens group G6 is moved toward the object side, thereby performing focusing from a long-distance object to a short-distance object (from an infinite distant object to a finite distant object). In other words, the fifth lens group G5 corresponds to the first focusing lens group, and the sixth lens group G6 corresponds to the second focusing lens group.

Table 2 below lists data values of the zoom optical system according to the second example.

TABLE 2

| [General Data] | | | |
| --- | --- | --- | --- |
| Zooming ratio 2.74 θgFP = 0.6319 | | | |
|  | W | M | T |
| FNO | 2.87938 | 2.83556 | 2.81768 |
| 2ω | 33.81302 | 17.80714 | 12.26884 |
| Y | 21.70 | 21.70 | 21.70 |
| TL | 196.12284 | 196.12284 | 196.12284 |
| BF | 36.61267 | 36.61267 | 36.61267 |

TABLE 2-continued

[Lens Data]

| Surface Number | R | D | nd | υd | θgF |
|---|---|---|---|---|---|
| 1 | 108.74314 | 2.8 | 1.95000 | 31.13 | |
| 2 | 80.29769 | 9.7 | 1.49782 | 82.57 | |
| 3 | 691.77549 | 0.1 | | | |
| 4 | 93.78423 | 7.7 | 1.43385 | 95.23 | |
| 5 | 338.64045 | D5(Variable) | | | |
| 6 | 71.48912 | 1.9 | 1.59349 | 67.89 | |
| 7 | 30.17301 | 9.4 | | | |
| 8 | 137.03151 | 1.6 | 1.49782 | 82.57 | |
| 9 | 93.66474 | 0.8 | | | |
| 10 | 44.41047 | 3.94815 | 1.66382 | 27.35 | 0.6319 |
| 11 | 87.61105 | 5.59008 | | | |
| 12 | −54.89519 | 1.9 | 1.49782 | 82.57 | |
| 13 | 689.02421 | D13(Variable) | | | |
| 14 | 75.42635 | 4.5 | 1.94595 | 30.42 | |
| 15 | 490.04562 | D15(Variable) | | | |
| 16 | 94.04866 | 4 | 1.49782 | 59.34 | |
| 17 | 1181.8169 | 0.1 | | | |
| 18 | 56.70631 | 4 | 1.49782 | 69.79 | |
| 19 | 243.15543 | 4.5 | | | |
| 20 | ∞ | 3.5 | | | (Aperture Stop S) |
| 21 | 180.79776 | 1.8 | 1.92286 | 29.82 | |
| 22 | 38.61345 | 4.2 | 1.49782 | 67.44 | |
| 23 | 792.77195 | 4.35979 | | | |
| 24 | 479.73489 | 1.7 | 1.80518 | 22.51 | |
| 25 | 75.80342 | 2 | | | |
| 26* | 58.49695 | 7.7 | 1.59306 | 67 | |
| 27 | −63.34766 | 1.7 | 1.60342 | 46.96 | |
| 28 | −90.09789 | 1.3 | | | |
| 29 | 66.31481 | 2.5 | 1.80400 | 44.63 | |
| 30 | 153.3585 | D30(Variable) | | | |
| 31 | 130.80634 | 2.2 | 1.94594 | 17.98 | |
| 32 | −67.89935 | 0.8 | | | |
| 33 | 163.52036 | 1.25 | 1.56883 | 31.71 | |
| 34 | 37.07534 | D34(Variable) | | | |
| 35 | 66.52215 | 4.75 | 1.80100 | 48.75 | |
| 36 | −175.782 | D36(Variable) | | | |
| 37* | −73.66538 | 1.9 | 1.71999 | 82.57 | |
| 38 | 282.5465 | BF | | | |

[Aspherical Surface Data]

Twenty-sixth Surface $x = 0.00$, $A4 = -2.17\text{E}-06$, $A6 = 1.23\text{E}-09$
$A8 = -8.20\text{E}-12$, $A10 = 2.53\text{E}-14$, $A12 = -2.96\text{E}-17$ Thirty-seventh Surface $x = 0.00$, $A4 = 9.91\text{E}-08$, $A6 = 2.50\text{E}-09$
$A8 = -1.38\text{E}-11$, $A10 = 4.59\text{E}-14$, $A12 = -5.72\text{E}-17$

[Lens Group Data]

| Group | First surface | Focal length |
|---|---|---|
| G1 | 1 | 139.63445 |
| G2 | 6 | −43.68068 |
| G3 | 14 | 93.7469 |
| G4 | 16 | 86.63044 |
| G5 | 31 | −83.20858 |
| G6 | 35 | 60.77856 |
| G7 | 37 | −80.9748 |

TABLE 2-continued

[Variable Distance Data]

|  | W Infinity | M Infinity | T Infinity | W Short-distance | M Short-distance | T Short-distance |
|---|---|---|---|---|---|---|
| f | 71.49616 | 135 | 196.00002 | — | — | — |
| β | — | — | — | −0.08386 | −0.14611 | −0.20261 |
| D5 | 1.98083 | 33.88478 | 49.73838 | 1.98083 | 33.88478 | 49.73838 |
| D13 | 47.67943 | 16.00066 | 1.60866 | 47.67943 | 16.00066 | 1.60866 |
| D15 | 2.53884 | 2.31366 | 0.85206 | 2.53884 | 2.31366 | 0.85206 |
| D30 | 6.84927 | 7.75031 | 3.99572 | 8.37353 | 13.43196 | 15.53626 |
| D34 | 26.8749 | 21.64199 | 27.84545 | 23.36912 | 9.9946 | 4.76438 |
| D36 | 6.00155 | 10.33343 | 7.88455 | 7.98308 | 16.29916 | 19.42509 |

[Conditional expression corresponding value]

Conditional Expression(1) f3/(−fE) = 1.16
Conditional Expression(2) f1/(−fE) = 1.72
Conditional Expression(3) f2/fE = 0.54
Conditional Expression(4) f1/(−f2) = 3.20
Conditional Expression(5) f1/f3 = 1.49
Conditional Expression(6) f1/f4 = 1.61
Conditional Expression(7) (−fF1)/fF2 = 1.37
Conditional Expression(8) υdP = 27.35
Conditional Expression(9) ndP + (0.01425 × υdP) = 2.0536
Conditional Expression(10) θgFP + (0.00316 × υdP) = 0.7183
Conditional Expression(11) 2ωw = 33.81°
Conditional Expression(12) 2ωt = 12.27°
Conditional Expression(13) BFw/fw = 0.51

Figure 4C:
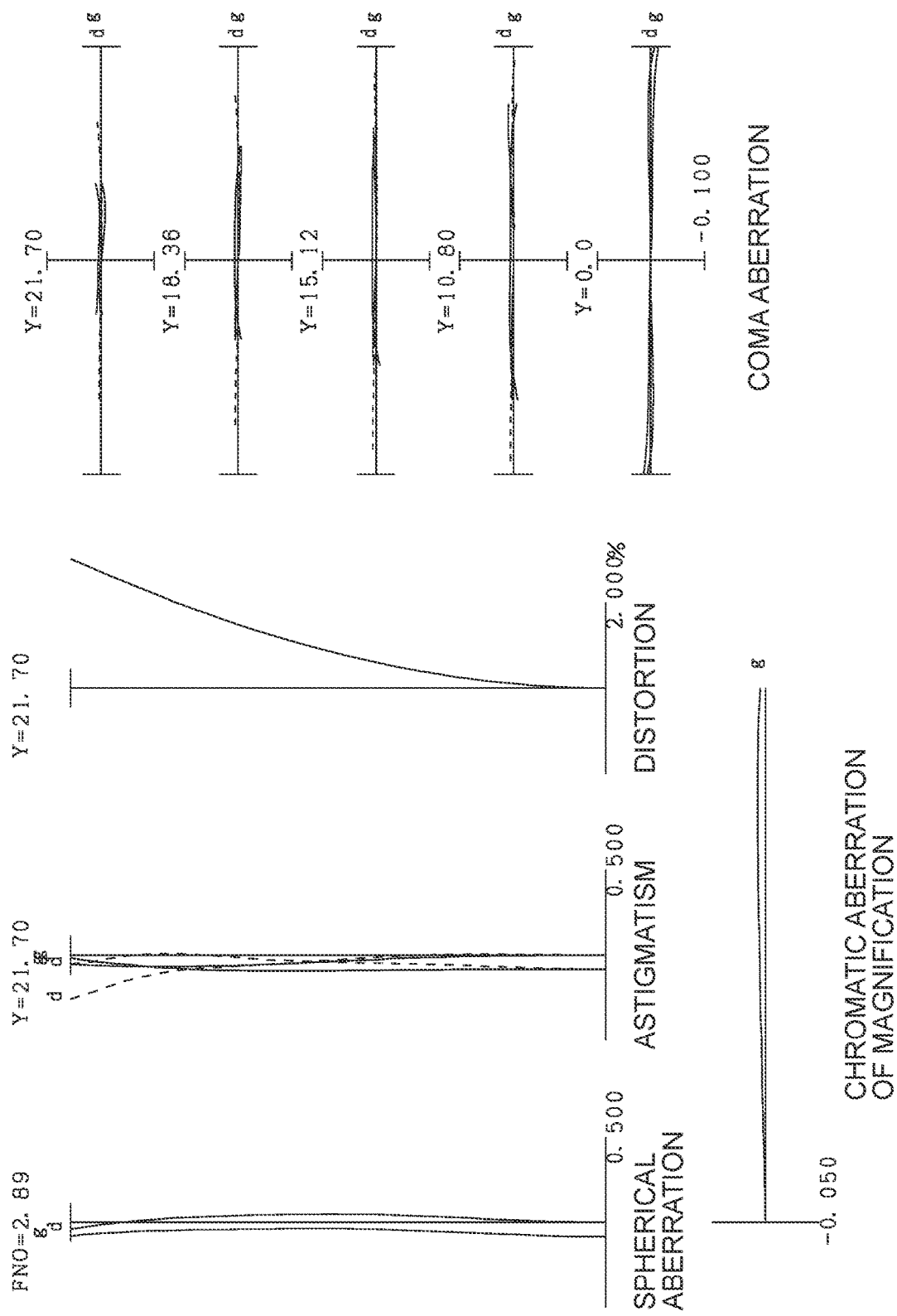

FIGS. 4A, 4B, and 4C are various aberration graphs of the zoom optical system according to the second example in the wide angle end state, the intermediate focal length state, and the telephoto end state, respectively. From each of the various aberration graphs, it can be seen that the zoom optical system according to the second example excellently corrects various aberrations and has excellent image-forming performance.

Third Example

Figure 5:
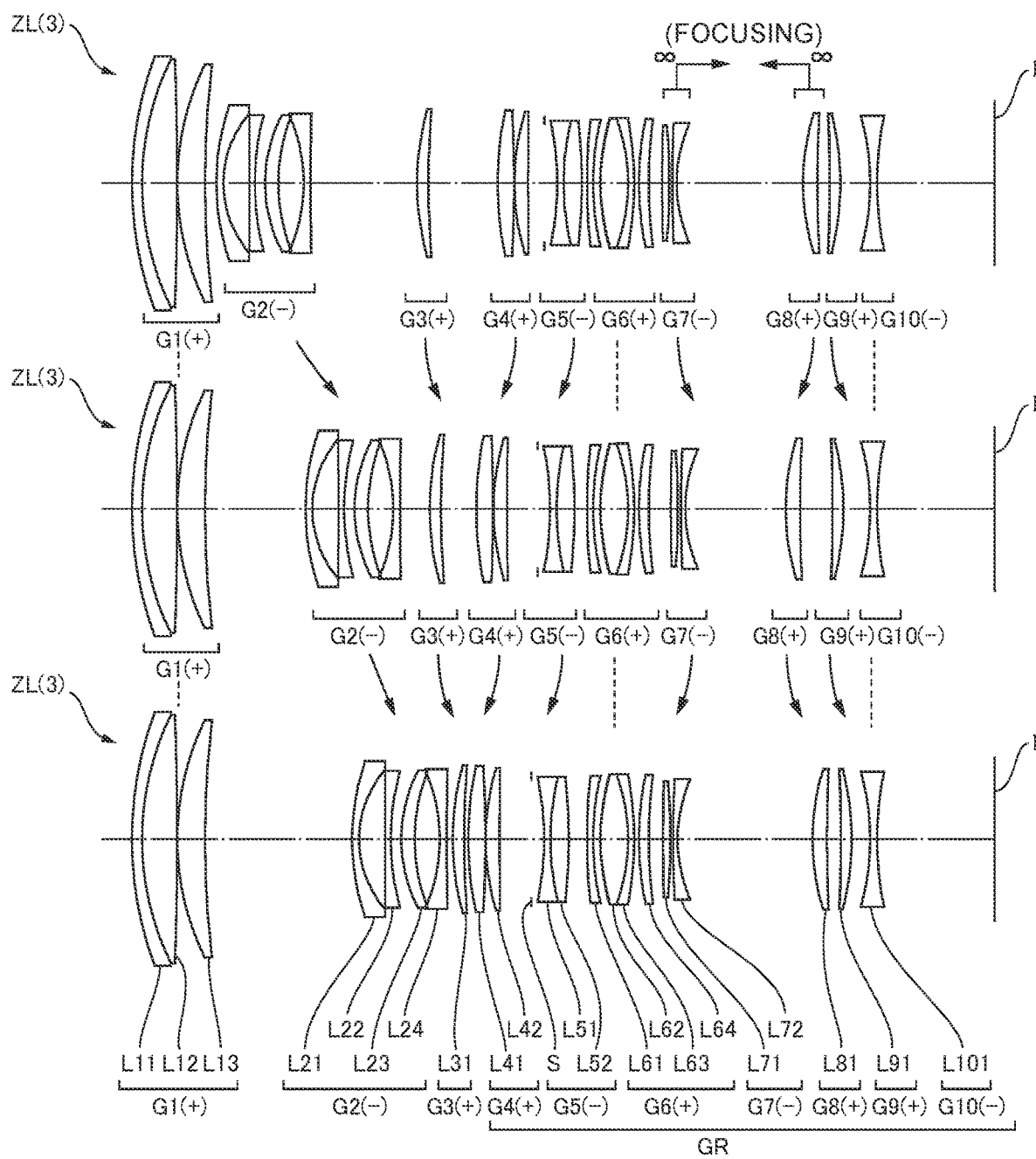
FIG. 5 is a diagram showing the movement of lenses when a zoom optical system according to a third example changes from a wide angle end state to a telephoto end state.

A third example will be described with reference to FIGS. 5 to 6 and Table 3. FIG. 5 is a diagram showing the movement of lenses when a zoom optical system according to the third example changes from the wide angle end state to the telephoto end state. The zoom optical system ZL(3) according to the third example comprises a first lens group G1 having a positive refractive power, a second lens group G2 having a negative refractive power, a third lens group G3 having a positive refractive power, a fourth lens group G4 having a positive refractive power, a fifth lens group G5 having a negative refractive power, a sixth lens group G6 having a positive refractive power, a seventh lens group G7 having a negative refractive power, an eighth lens group G8 having a positive refractive power, a ninth lens group G9 having a positive refractive power, and a tenth lens group G10 having a negative refractive power, which are arranged in order from the object side. During zooming from the wide angle end state to the telephoto end state, the second lens group G2, the third lens group G3, the fourth lens group G4, the fifth lens group G5, the seventh lens group G7, the eighth lens group G8 and the ninth lens group G9 move separately from one another in directions indicated by arrows of FIG. 5, and the distances between adjacent lens groups change. Note that the first lens group G1, the sixth lens group G6, and the tenth lens group G10 are fixed with respect to the image surface I during zooming. A lens group consisting of the fourth lens group G4, the fifth lens group G5, the sixth lens group G6, the seventh lens group G7, the eighth lens group G8, the ninth lens group G9 and the tenth lens group G10 corresponds to the succeeding lens group GR.

The first lens group G1 comprises a cemented lens including a negative meniscus lens L11 having a convex surface facing the object and a positive lens L12 having a biconvex-convex shape, and a positive meniscus lens L13 having a convex surface facing the object, which are arranged in order from the object side.

The second lens group G2 comprises a negative meniscus lens L21 having a convex surface facing the object, a negative lens L22 having a biconcave shape, a positive meniscus lens L23 having a convex surface facing the object, and a negative lens L24 having a biconcave shape, which are arranged in order from the object side.

The third lens group G3 comprises a positive meniscus lens L31 having a convex surface facing the object.

The fourth lens group G4 comprises a positive lens L41 having a biconvex shape, and a positive meniscus lens L42 having a convex surface facing the object, which are arranged in order from the object side.

The fifth lens group G5 comprises a cemented lens including a negative lens L51 having a biconcave shape and a positive lens L52 having a biconvex shape. An aperture stop S is arranged to be nearest to the object in the fifth lens group G5, and it moves together with the fifth lens group G5 during zooming.

The sixth lens group G6 comprises a negative meniscus lens L61 having a convex surface facing the object, a cemented lens including a positive lens L62 having a biconvex shape and a negative meniscus lens L63 having a concave surface facing the object, and a positive meniscus lens L64 having a convex surface facing the object, which are arranged in order from the object side. The positive lens L62 has an aspherical lens surface on the object side.

The seventh lens group G7 comprises a positive lens L71 having a biconvex shape and a negative meniscus lens L72 having a convex surface facing the object, which are arranged in order from the object side.

The eighth lens group G8 comprises a positive meniscus lens L81 having a convex surface facing the object.

The ninth lens group G9 comprises a positive meniscus lens L91 having a concave surface facing the object. The positive meniscus lens L91 has an aspherical lens surface on the object side.

The tenth lens group G10 comprises a negative lens L101 having a biconcave shape. The image surface I is arranged on the image side of the tenth lens group G10. In other words, the tenth lens group G10 corresponds to the last lens group.

In the present example, the seventh lens group G7 is moved toward the image surface I, and the eighth lens group G8 is moved toward the object side, thereby performing focusing from a long-distance object to a short-distance object (from an infinite distant object to a finite distant object). In other words, the seventh lens group G7 corresponds to the first focusing lens group, and the eighth lens group G8 corresponds to the second focusing lens group.

Table 3 below lists data values of the zoom optical system according to the third example.

TABLE 3

[General Data]

Zooming ratio 2.74
θgFP = 0.6319

|  | W | M | T |
|---|---|---|---|
| FNO | 2.8471 | 2.86934 | 2.91965 |
| 2ω | 33.70556 | 17.86124 | 12.26972 |
| Y | 21.70 | 21.70 | 21.70 |
| TL | 207.00792 | 207.00792 | 207.00792 |
| Bf | 32.57205 | 32.57205 | 32.57205 |

[Lens Data]

| Surface Number | R | D | nd | νd | θgF |
|---|---|---|---|---|---|
| 1 | 101.99194 | 2.80 | 2.00100 | 29.12 |  |
| 2 | 78.37407 | 9.70 | 1.49782 | 82.57 |  |
| 3 | — | 0.10 |  |  |  |
|  | 1022.4124 |  |  |  |  |
| 4 | 75.80458 | 7.70 | 1.43385 | 95.23 |  |
| 5 | 278.09823 | D5(Variable) |  |  |  |
| 6 | 67.03073 | 1.90 | 1.60300 | 65.44 |  |
| 7 | 29.65154 | 7.20 |  |  |  |
| 8 | — | 1.60 | 1.49782 | 82.57 |  |
|  | 4189.1769 |  |  |  |  |
| 9 | 72.21235 | 2.92 |  |  |  |
| 10 | 41.05723 | 3.70 | 1.66382 | 27.35 | 0.6319 |
| 11 | 51.79281 | 6.99 |  |  |  |
| 12 | −47.57525 | 1.90 | 1.49782 | 82.57 |  |
| 13 | 876.17776 | D13(Variable) |  |  |  |
| 14 | 75.45331 | 3.20 | 1.94594 | 17.98 |  |
| 15 | 263.87074 | D15(Variable) |  |  |  |
| 16 | 99.38463 | 4.70 | 1.49782 | 82.57 |  |
| 17 | — | 0.10 |  |  |  |
|  | 385.66566 |  |  |  |  |
| 18 | 69.30883 | 3.85 | 1.49782 | 82.57 |  |
| 19 | 1544.1877 | D19(Variable) |  |  |  |
| 20 | ∞ | 3.50 |  |  | (Aperture Stop S) |
| 21 | −84.39308 | 1.80 | 1.92286 | 20.88 |  |
| 22 | 76.70869 | 5.00 | 1.49782 | 82.57 |  |
| 23 | — | D23(Variable) |  |  |  |
|  | 157.06149 |  |  |  |  |
| 24 | 168.47838 | 1.70 | 1.85026 | 32.35 |  |
| 25 | 77.42169 | 2.00 |  |  |  |
| 26* | 59.12213 | 7.70 | 1.59349 | 67 |  |
| 27 | −51.6115 | 1.70 | 1.62004 | 36.4 |  |
| 28 | −89.79626 | 1.30 |  |  |  |
| 29 | 87.29534 | 2.70 | 1.80100 | 34.92 |  |
| 30 | 136.2385 | D30(Variable) |  |  |  |
| 31 | 627.77024 | 2.00 | 1.94594 | 17.98 |  |
| 32 | — | 0.80 |  |  |  |
|  | 206.69697 |  |  |  |  |
| 33 | 386.92798 | 1.25 | 1.71300 | 53.96 |  |
| 34 | 42.23229 | D34(Variable) |  |  |  |
| 35 | 66.92449 | 4.00 | 1.90265 | 35.77 |  |
| 36 | 418.69787 | D36(Variable) |  |  |  |

TABLE 3-continued

| | | | | |
|---|---|---|---|---|
| 37* | — | 3.00 | 1.55518 | 71.49 |
| | 553.02647 | | | |
| 38 | −77.65664 | D38(Variable) | | |
| 39 | −70.45081 | 1.90 | 1.56384 | 60.71 |
| 40 | 88.47517 | BF | | |

[Aspherical Surface Data]

Twenty-sixth Surface x = 0.00, A4 = −2.06E−06, A6 = 3.72E−10
A8 = −2.74E−12, A10 = 1.30E−14, A12 = −1.97E−17

Thirty-seventh Surface x = 0.00, A4 = −5.43E−07, A6 = 5.65E−10
A8 = −1.54E−12, A10 = 4.63E−15, A12 = −5.42E−18

[Lens Group Data]

| Group | First surface | Focal length |
|---|---|---|
| G1 | 1 | 124.35572 |
| G2 | 6 | −34.94136 |
| G3 | 14 | 110.79292 |
| G4 | 16 | 76.69466 |
| G5 | 20 | −76.01113 |
| G6 | 24 | 72.09875 |
| G7 | 31 | −114.02434 |
| G8 | 35 | 87.7742 |
| G9 | 37 | 162.36222 |
| G10 | 39 | −69.26098 |

[Variable Distance Data]

| | W Infinity | M Infinity | T Infinity | W Short-distance | M Short-distance | T Short-distance |
|---|---|---|---|---|---|---|
| f | 71.48828 | 135 | 196 | — | — | — |
| β | — | — | — | −0.08481 | −0.15088 | −0.20696 |
| D5 | 3.14675 | 27.96403 | 40.90704 | 3.14675 | 27.96403 | 40.90704 |
| D13 | 29.53764 | 8.15958 | 1.60832 | 29.53764 | 8.15958 | 1.60832 |
| D15 | 19.15996 | 9.78302 | 1.19195 | 19.15996 | 9.78302 | 1.19195 |
| D19 | 4.5 | 8.45422 | 8.9974 | 4.5 | 8.45422 | 8.9974 |
| D23 | 1.47462 | 3.45814 | 5.11428 | 1.47462 | 3.45814 | 5.11428 |
| D30 | 3.7091 | 6.11122 | 3.97416 | 5.8438 | 13.08039 | 18.03258 |
| D34 | 35.19368 | 27.95231 | 37.56575 | 29.85694 | 10.52937 | 3.82554 |
| D36 | 3.33819 | 8.98173 | 3.81873 | 6.54023 | 19.4355 | 23.50052 |
| D38 | 8.23679 | 7.4325 | 5.11912 | 8.23679 | 7.4325 | 5.11912 |

[Conditional expression corresponding value]

Conditional Expression(1) f3/(−fE) = 1.60
Conditional Expression(2) f1/(−fE) = 1.80
Conditional Expression(3) f2/fE = 0.50
Conditional Expression(4) f1/(−f2) = 3.56
Conditional Expression(5) f1/f3 = 1.12
Conditional Expression(6) f1/f4 = 1.62
Conditional Expression(7) (−fF1)/fF2 = 1.30
Conditional Expression(8) υdP = 27.35
Conditional Expression(9) ndP + (0.01425 × υdP) = 2.0536
Conditional Expression(10) θgFP + (0.00316 × υdP) = 0.7183
Conditional Expression(11) 2ωw = 33.71°
Conditional Expression(12) 2ωt = 12.27°
Conditional Expression(13) BFw/fw = 0.46

FIGS. 6A, 6B, and 6C are various aberration graphs of the zoom optical system according to the third example in the wide angle end state, the intermediate focal length state, and the telephoto end state, respectively. From each of the various aberration graphs, it can be seen that the zoom optical system according to the third example excellently corrects various aberrations and has excellent image-forming performance.

Fourth Example

Figure 7:
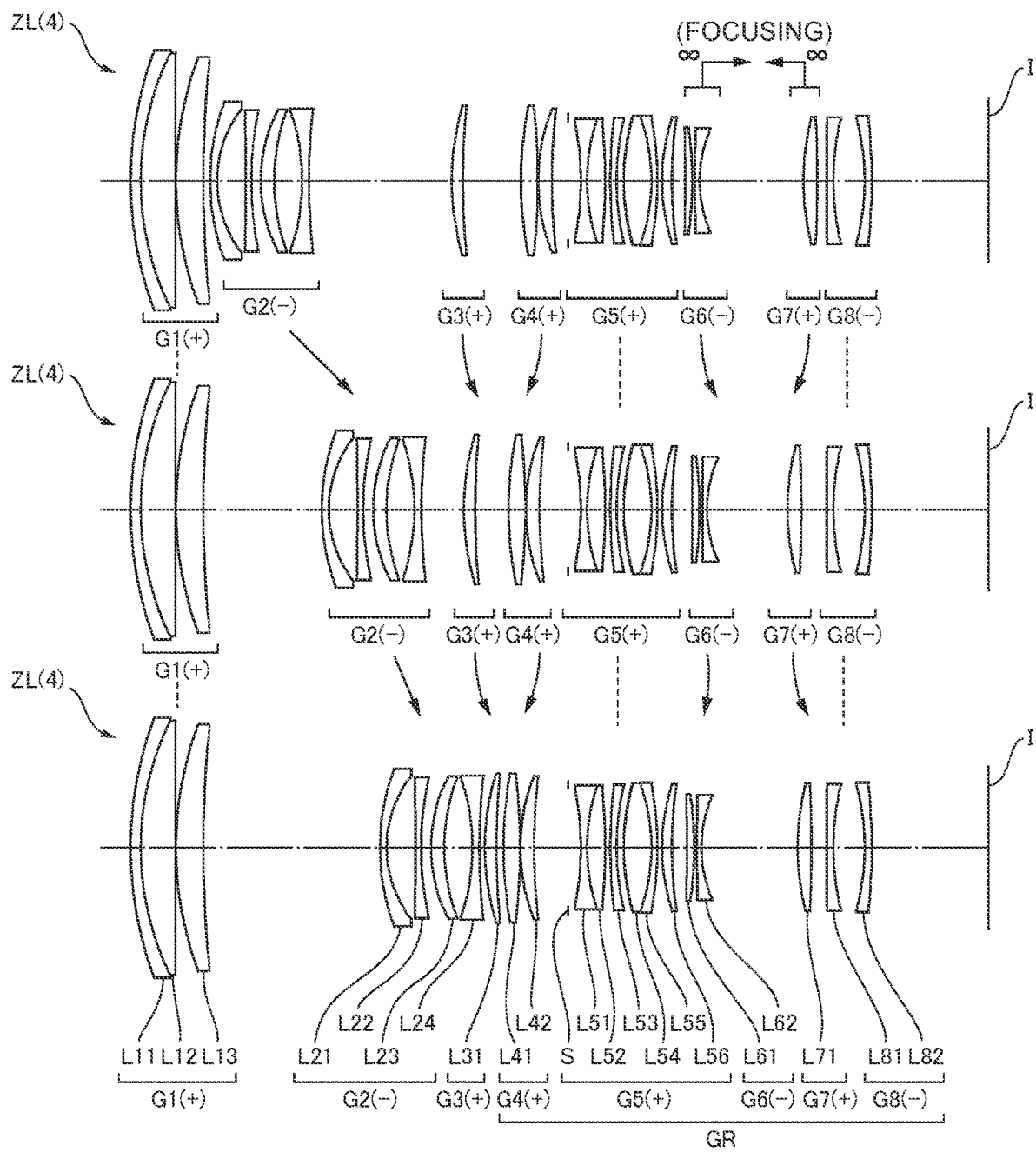
FIG. 7 is a diagram showing the movement of lenses when a zoom optical system according to a fourth example changes from a wide angle end state to a telephoto end state.

A fourth example will be described with reference to FIGS. 7 to 8 and Table 4. FIG. 7 is a diagram showing the movement of lenses when a zoom optical system according to the fourth example changes from the wide angle end state to the telephoto end state. The zoom optical system ZL(4) according to the fourth example comprises a first lens group G1 having a positive refractive power, a second lens group G2 having a negative refractive power, a third lens group G3 having a positive refractive power, a fourth lens group G4 having a positive refractive power, a fifth lens group G5 having a positive refractive power, a sixth lens group G6 having a negative refractive power, a seventh lens group G7 having a positive refractive power, and an eighth lens group G8 having a negative refractive power, which are arranged in order from the object side. During zooming from the wide angle end state to the telephoto end state, the second lens group G2, the third lens group G3, the fourth lens group G4, the sixth lens group G6 and the seventh lens group G7 move separately from one another in directions indicated by arrows of FIG. 7, and the distances between adjacent lens groups change. Note that the first lens group G1, the fifth lens group G5, and the eighth lens group G8 are fixed with respect to the image surface I during zooming. A lens group consisting of the fourth lens group G4, the fifth lens group G5, the sixth lens group G6, the seventh lens group G7, and the eighth lens group G8 corresponds to the succeeding lens group GR.

The first lens group G1 comprises a cemented lens including a negative meniscus lens L11 having a convex surface facing the object and a positive lens L12 having a biconvex shape, and a positive meniscus lens L13 having a convex surface facing the object, which are arranged in order from the object side.

The second lens group G2 comprises a negative meniscus lens L21 having a convex surface facing the object, a negative lens L22 having a biconcave shape, a positive meniscus lens L23 having a convex surface facing the object, and a negative lens L24 having a biconcave shape, which are arranged in order from the object side.

The third lens group G3 comprises a positive meniscus lens L31 having a convex surface facing the object.

The fourth lens group G4 comprises a positive lens L41 having a biconvex shape, and a positive meniscus lens L42 having a convex surface facing the object, which are arranged in order from the object side.

The fifth lens group G5 comprises a cemented lens including a negative lens L51 having a biconcave shape and a positive lens L52 having a biconvex shape, a negative meniscus lens L53 having a convex surface facing the object, a cemented lens including a positive lens L54 having a biconvex shape and a negative meniscus lens L55 having a concave surface facing the object, and a positive meniscus lens L56 having a convex surface facing the object, which are arranged in order from the object side. An aperture stop S is arranged to be nearest to the object in the fifth lens group G5, and fixed with respect to the image surface I together with the fifth lens group G5 during zooming. The positive lens L54 has an aspherical lens surface on the object side.

The sixth lens group G6 comprises a positive meniscus lens L61 having a concave surface facing the object, and a negative meniscus lens L62 having a convex surface facing the object.

The seventh lens group G7 comprises a positive lens L71 having a biconvex shape.

The eighth lens group G8 comprises a negative meniscus lens L81 having a convex surface facing the object, and a negative meniscus lens L82 having a concave surface facing the object, which are arranged in order from the object side. The negative meniscus lens L81 has an aspherical lens surface on the object side. The image surface I is arranged on the image side of the eighth lens group G8. In other words, the eighth lens group G8 corresponds to the last lens group.

In the present example, the sixth lens group G6 is moved toward the image surface I, and the seventh lens group G7 is moved toward the object side, thereby performing focusing from a long-distance object to a short-distance object (from an infinite distant object to a finite distant object). In other words, the sixth group G6 corresponds to the first focusing lens group, and the seventh lens group G7 corresponds to the second focusing lens group.

Table 4 below lists data values of the zoom optical system according to the fourth example.

TABLE 4

| [General Data] | | | |
|---|---|---|---|
| Zooming ratio 2.74 θgFP = 0.6319 | | | |
| | W | M | T |
| FNO | 2.88923 | 2.87811 | 2.87676 |
| 2ω | 33.62692 | 17.8017 | 12.26826 |
| Y | 21.70 | 21.70 | 21.70 |
| TL | 207.00795 | 207.00795 | 207.00795 |
| BF | 32.57205 | 32.57205 | 32.57205 |

| [Lens Data] | | | | | |
|---|---|---|---|---|---|
| Surface Number | R | D | nd | υd | θgF |
| 1 | 104.96946 | 2.80 | 2.00100 | 29.12 | |
| 2 | 81.23029 | 9.70 | 1.49782 | 82.57 | |

TABLE 4-continued

| | | | | |
|---|---|---|---|---|
| 3 | −5013.309 | 0.10 | | |
| 4 | 98.76892 | 7.70 | 1.43385 | 95.23 |
| 5 | 349.12389 | D5(Variable) | | |
| 6 | 62.87568 | 1.90 | 1.60300 | 65.44 |
| 7 | 32.61551 | 8.00 | | |
| 8 | −1223.4377 | 1.60 | 1.49782 | 82.57 |
| 9 | 88.74378 | 2.77 | | |
| 10 | 43.50207 | 3.70 | 1.66382 | 27.35     0.6319 |
| 11 | 56.12991 | 7.85 | | |
| 12 | −59.98159 | 1.90 | 1.49782 | 82.57 |
| 13 | 180.55889 | D13(Variable) | | |
| 14 | 72.53962 | 3.20 | 1.94594 | 17.98 |
| 15 | 224.56923 | D15(Variable) | | |
| 16 | 107.03817 | 4.70 | 1.49782 | 82.57 |
| 17 | −183.81713 | 0.10 | | |
| 18 | 54.21049 | 3.85 | 1.49782 | 82.57 |
| 19 | 173.7794 | D19(Variable) | | |
| 20 | ∞ | 3.50 | | (Aperture Stop S) |
| 21 | −89.65067 | 1.80 | 1.92286 | 20.88 |
| 22 | 53.92556 | 5.00 | 1.49782 | 82.57 |
| 23 | −180.67725 | 1.50 | | |
| 24 | 151.38095 | 1.70 | 1.85026 | 32.35 |
| 25 | 72.515 | 2.00 | | |
| 26* | 60.75581 | 7.70 | 1.59349 | 67 |
| 27 | −54.39087 | 1.70 | 1.62004 | 36.4 |
| 28 | −94.7071 | 1.30 | | |
| 29 | 58.34653 | 2.70 | 1.80100 | 34.92 |
| 30 | 116.10532 | D30(Variable) | | |
| 31 | −642.22297 | 2.00 | 1.94594 | 17.98 |
| 32 | −108.81859 | 0.80 | | |
| 33 | 1100.6245 | 1.25 | 1.71300 | 53.96 |
| 34 | 36.03135 | D34(Variable) | | |
| 35 | 70.63159 | 3.85 | 1.90265 | 35.77 |
| 36 | −359.66973 | D36(Variable) | | |
| 37* | 1093.756 | 1.90 | 1.53793 | 55.01 |
| 38 | 73.85081 | 8.76 | | |
| 39 | −68.15582 | 1.90 | 1.56384 | 60.71 |
| 40 | −183.66574 | BF | | |

[Aspherical Surface Data]

Twenty-sixth Surface x = 0.00, A4 = −1.87E−06, A6 = −4.52E−10
A8 = 3.30E−12, A10 = −9.39E−15, A12 = 1.05E−17

Thirty-seventh Surface x = 0.00, A4 = −5.10E−07, A6 = 2.18E−09
A8 = −1.11E−11, A10 = 3.84E−14, A12 = −5.02E−17

[Lens Group Data]

| Group | First surface | Focal length |
|---|---|---|
| G1 | 1 | 151.31596 |
| G2 | 6 | −40.77182 |
| G3 | 14 | 112.1271 |
| G4 | 16 | 73.19762 |
| G5 | 20 | 204.39955 |
| G6 | 31 | −85.38342 |
| G7 | 35 | 65.68378 |
| G8 | 37 | −81.7079 |

[Variable Distance Data]

| | W Infinity | M Infinity | T Infinity | W Short-distance | M Short-distance | T Short-distance |
|---|---|---|---|---|---|---|
| f | 71.48789 | 135 | 196.00001 | — | — | — |
| β | — | — | — | −0.08409 | −0.14666 | −0.20387 |
| D5 | 1.85197 | 33.16708 | 49.31235 | 1.85197 | 33.16708 | 49.31235 |
| D13 | 39.7348 | 11.81928 | 1.60349 | 39.7348 | 11.81928 | 1.60349 |
| D15 | 16.28719 | 9.45385 | 1.9819 | 16.28719 | 9.45385 | 1.9819 |
| D19 | 4.5 | 7.93374 | 9.47621 | 4.5 | 7.93374 | 9.47621 |

TABLE 4-continued

| D30 | 3.7 | 5.7618 | 4.22253 | 4.95966 | 10.39125 | 14.39741 |
| D34 | 29.10973 | 22.62707 | 26.97381 | 25.70866 | 11.51639 | 4.5890 |
| D36 | 2.5956 | 7.01646 | 4.209 | 4.73702 | 13.49769 | 16.41886 |

[Conditional expression corresponding value]

Conditional Expression(1) f3/(−fE) = 1.37
Conditional Expression(2) f1/(−fE) = 1.85
Conditional Expression(3) f2/fE = 0.50
Conditional Expression(4) f1/(−f2) = 3.71
Conditional Expression(5) f1/f3 = 1.35
Conditional Expression(6) f1/f4 = 2.07
Conditional Expression(7) (−fF1)/fF2 = 1.30
Conditional Expression(8) υdP = 27.35
Conditional Expression(9) ndP + (0.01425 × υdP) = 2.0536
Conditional Expression(10) θgFP + (0.00316 × υdP) = 0.7183
Conditional Expression(11) 2ωw = 33.63°
Conditional Expression(12) 2ωt = 12.27°
Conditional Expression(13) BFw/fw = 0.456

Figure 8C:
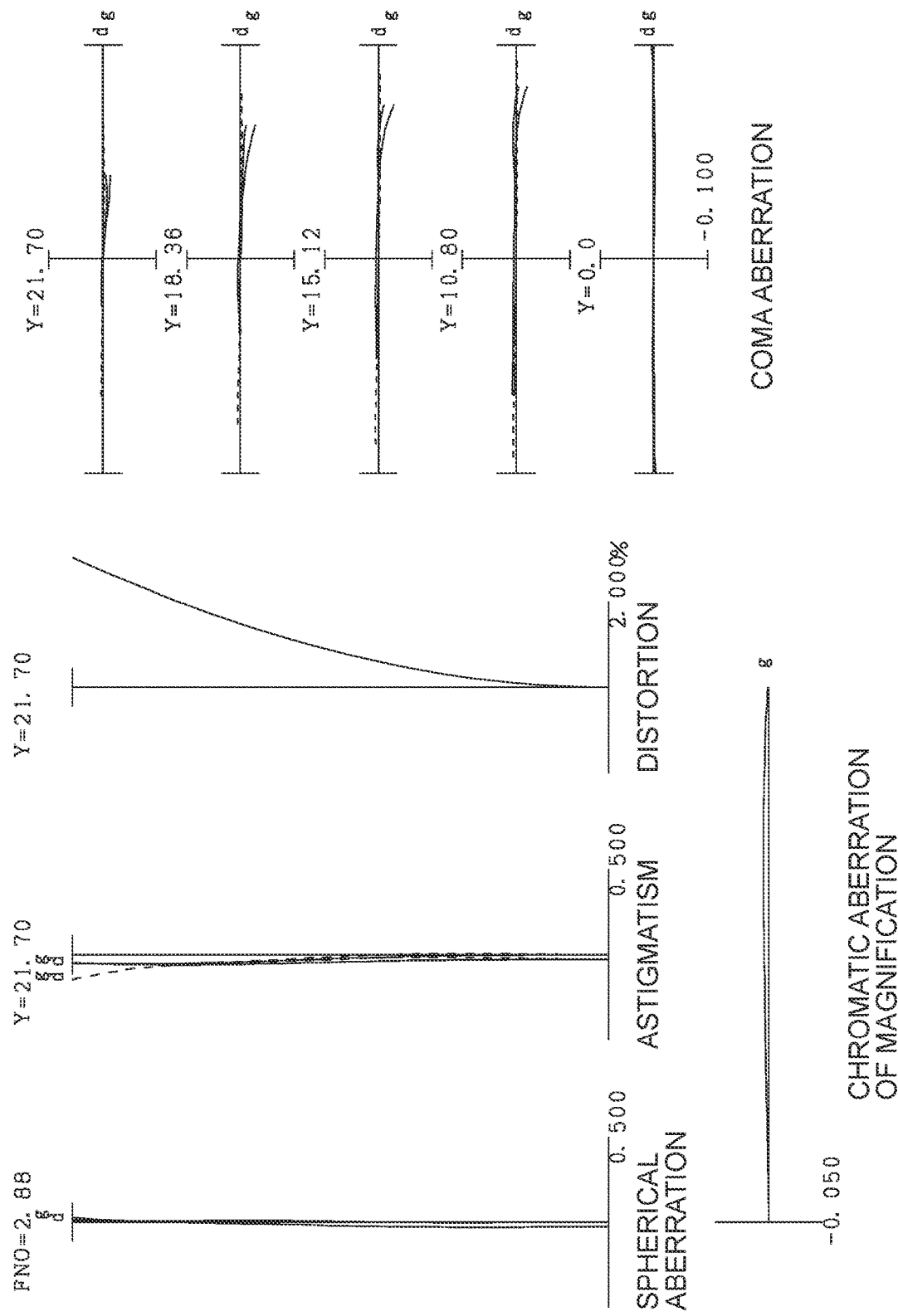

FIGS. 8A, 8B, and 8C are various aberration graphs of the zoom optical system according to the fourth example in the wide angle end state, the intermediate focal length state, and the telephoto end state, respectively. From each of the various aberration graphs, it can be seen that the zoom optical system according to the fourth example excellently corrects various aberrations and has excellent image-forming performance.

Fifth Example

Figure 9:
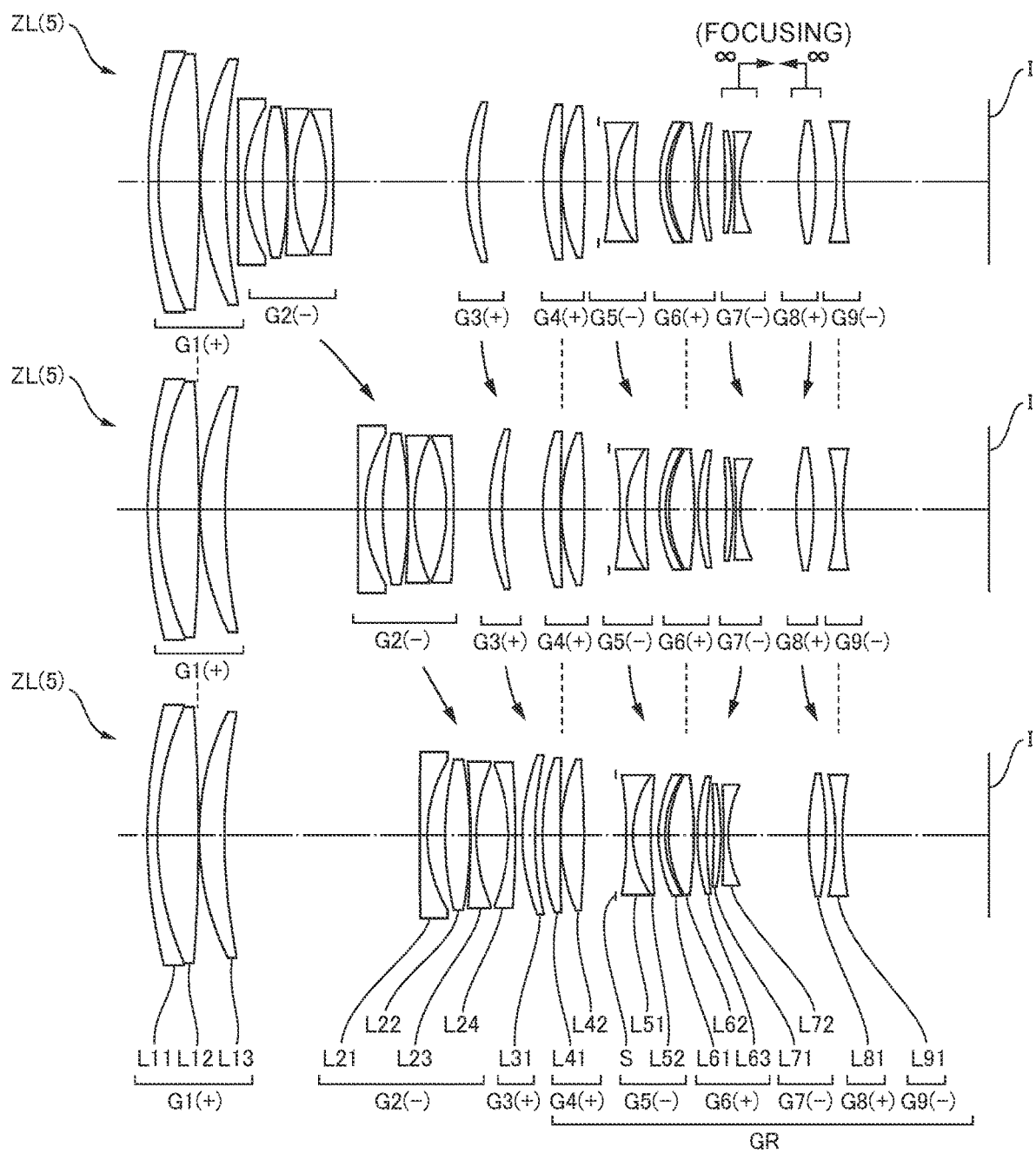
FIG. 9 is a diagram showing the movement of lenses when a zoom optical system according to a fifth example changes from a wide angle end state to a telephoto end state.

A fifth example will be described with reference to FIGS. 9 to 10 and Table 5. FIG. 9 is a diagram showing the movement of lenses when a zoom optical system according to the fifth example changes from the wide angle end state to the telephoto end state. The zoom optical system ZL(5) according to the fifth example comprises a first lens group G1 having a positive refractive power, a second lens group G2 having a negative refractive power, a third lens group G3 having a positive refractive power, a fourth lens group G4 having a positive refractive power, a fifth lens group G5 having a negative refractive power, a sixth lens group G6 having a positive refractive power, a seventh lens group G7 having a negative refractive power, an eighth lens group G8 having a positive refractive power, and a ninth lens group G9 having a negative refractive power, which are arranged in order from the object side. During zooming from the wide angle end state to the telephoto end state, the second lens group G2, the third lens group G3, the fifth lens group G5, the seventh lens group G7, and the eighth lens group G8 move separately from one another in directions indicated by arrows of FIG. 9, and the distances between adjacent lens groups change. Note that the first lens group G1, the fourth lens group G4, the sixth lens group G6 and the ninth lens group G9 are fixed with respect to the image surface I during zooming. A lens group consisting of the fourth lens group G4, the fifth lens group G5, the sixth lens group G6, the seventh lens group G7, the eighth lens group G8 and the ninth lens group G9 corresponds to the succeeding lens group GR.

The first lens group G1 comprises a cemented lens including a negative meniscus lens L11 having a convex surface facing the object and a positive lens L12 having a biconvex shape, and a positive meniscus lens L13 having a convex surface facing the object, which are arranged in order from the object side.

The second lens group G2 comprises a negative meniscus lens L21 having a convex surface facing the object, a positive lens L22 having a biconvex shape, a negative lens L23 having a biconcave shape, and a negative meniscus lens L24 having a concave surface facing the object, which are arranged in order from the object side.

The third lens group G3 comprises a positive meniscus lens L31 having a convex surface facing the object.

The fourth lens group G4 comprises a positive meniscus lens L41 having a convex surface facing the object, and a positive lens L42 having a biconvex shape, which are arranged in order from the object side.

The fifth lens group G5 comprises a cemented lens including a negative lens L51 having a biconcave shape and a positive meniscus lens L52 having a convex surface facing the object. An aperture stop S is arranged to be nearest to the object in the fifth lens group G5, and moves together with the fifth lens group G5 during zooming.

The sixth lens group G6 comprises a negative meniscus lens L61 having a convex surface facing the object, a positive lens L62 having a biconvex shape, and a positive meniscus lens L63 having a convex surface facing the object, which are arranged in order from the object side. The positive lens L62 has an aspherical lens surface on the image side.

The seventh lens group G7 comprises a positive meniscus lens L71 having a concave surface facing the object, and a negative lens L72 having a biconcave shape, which are arranged in order from the object.

The eighth lens group G8 comprises a positive lens L81 having a biconvex shape.

The ninth lens group G9 comprises a negative lens L91 having a biconcave shape. The image surface I is arranged on the image side of the ninth lens group G9. In other words, the ninth lens group G9 corresponds to the last lens group.

In the present embodiment, the seventh lens group G7 is moved toward the image surface I, and the eighth lens group G8 is moved toward the object side, thereby performing focusing from a long-distance object to a short-distance object (from an infinite distant object to a finite distant object). In other words, the seventh lens group G7 corresponds to the first focusing lens group, and the eighth lens group G8 corresponds to the second focusing lens group.

Table 5 below lists data values of the zoom optical system according to the fifth example.

TABLE 5

[General Data]

Zooming ratio 2.74
θgFP = 0.625146

|  | W | M | T |
|---|---|---|---|
| FNO | 2.79867 | 2.84973 | 2.88046 |
| 2ω | 33.269 | 17.64798 | 12.20244 |
| Y | 21.70 | 21.70 | 21.70 |
| TL | 194.00000 | 194.00000 | 194.00000 |
| BF | 32.56419 | 32.56419 | 32.56419 |

[Lens Data]

| Surface Number | R | D | nd | υd | θgF |
|---|---|---|---|---|---|
| 1 | 142.398 | 2.80 | 1.85000 | 27.03 | |
| 2 | 89.22539 | 11.50 | 1.49782 | 82.57 | |
| 3 | −475.12414 | 0.20 | | | |
| 4 | 78.29293 | 7.00 | 1.43385 | 95.23 | |
| 5 | 169.60505 | D5(Variable) | | | |
| 6 | 2649.01093 | 2.00 | 1.55705 | 45.85 | |
| 7 | 40.96873 | 5.00 | | | |
| 8 | 91.52844 | 7.00 | 1.80809 | 22.74 | |
| 9 | −108.37528 | 0.10 | | | |
| 10 | −300.55351 | 1.60 | 1.49782 | 82.57 | |
| 11 | 49.61316 | 9.00 | | | |
| 12 | −50.05975 | 2.00 | 1.66046 | 27.57 | 0.625146 |
| 13 | −282.49474 | D13(Variable) | | | |
| 14 | 62.00807 | 3.50 | 1.92286 | 20.88 | |
| 15 | 104.61485 | D15(Variable) | | | |
| 16 | 71.46374 | 5.00 | 1.49782 | 82.57 | |
| 17 | 705.70649 | 0.10 | | | |
| 18 | 54.57663 | 6.50 | 1.60300 | 65.44 | |
| 19 | −278.60199 | D19(Variable) | | | |
| 20 | ∞ | 3.00 | | | (Aperture Stop S) |
| 21 | −104.70389 | 1.80 | 1.90499 | 26.68 | |
| 22 | 30.2441 | 5.00 | 1.51188 | 68.34 | |
| 23 | 130.63306 | D23(Variable) | | | |
| 24 | 39.55621 | 1.80 | 1.79124 | 28.25 | |
| 25 | 31.45913 | 1.00 | | | |
| 26 | 35.35387 | 7.00 | 1.55332 | 71.68 | |
| 27* | −111.74355 | 1.00 | | | |
| 28 | 58.49751 | 2.50 | 1.81057 | 40.15 | |
| 29 | 105.99178 | D29(Variable) | | | |
| 30 | −286.5457 | 2.00 | 1.94594 | 17.98 | |
| 31 | −84.48026 | 0.80 | | | |
| 32 | −270.24499 | 1.25 | 1.59349 | 67 | |
| 33 | 32.39702 | D33(Variable) | | | |
| 34 | 77.85755 | 4.80 | 1.80100 | 34.92 | |
| 35 | −88.13641 | D35(Variable) | | | |
| 36 | −75.46523 | 2.00 | 1.72200 | 34.56 | |
| 37 | 104.96677 | BF | | | |

[Aspherical Surface Data]

Twenty-seventh Surface x = 0.00, A4 = 2.11E−06, A6 = −1.20E−09
A8 = −2.82E−13, A10 = −3.58E−15, A12 = 0.00E + 00

[Lens Group Data]

| Group | First surface | Focal length |
|---|---|---|
| G1 | 1 | 164.12723 |
| G2 | 6 | −47.62588 |
| G3 | 14 | 158.7209 |
| G4 | 16 | 52.56296 |
| G5 | 20 | −38.49179 |

TABLE 5-continued

| | | |
|---|---|---|
| G6 | 24 | 46.69749 |
| G7 | 30 | −80.39666 |
| G8 | 34 | 52.28209 |
| G9 | 36 | −60.52463 |

[Variable Distance Data]

| | W Infinity | M Infinity | T Infinity | W Short-distance | M Short-distance | T Short-distance |
|---|---|---|---|---|---|---|
| f | 71.5 | 135 | 196 | — | — | — |
| β | — | — | — | −0.0839 | −0.14665 | −0.20273 |
| D5 | 3.50002 | 37.12414 | 54.5663 | 3.50002 | 37.12414 | 54.5663 |
| D13 | 37.00636 | 10.01061 | 2 | 37.00636 | 10.01061 | 2 |
| D15 | 18.05993 | 11.43157 | 2 | 18.05993 | 11.43157 | 2 |
| D19 | 3.82591 | 6.93485 | 8.82776 | 3.82591 | 6.93485 | 8.82776 |
| D23 | 7.16459 | 4.05564 | 2.16276 | 7.16459 | 4.05564 | 2.16276 |
| D29 | 4.89453 | 5.25712 | 2.03164 | 6.68467 | 11.36918 | 13.66092 |
| D33 | 16.59265 | 15.71825 | 22.606 | 13.60117 | 5.68565 | 3 |
| D35 | 5.706 | 6.21782 | 2.55555 | 6.90733 | 10.13836 | 10.53228 |

[Conditional expression corresponding value]

Conditional Expression(1) f3/(−fE) = 2.62
Conditional Expression(2) f1/(−fE) = 2.71
Conditional Expression(3) f2/fE = 0.79
Conditional Expression(4) f1/(−f2) = 3.45
Conditional Expression(5) f1/f3 = 1.03
Conditional Expression(6) f1/f4 = 3.12
Conditional Expression(7) (−fF1)/fF2 = 1.54
Conditional Expression(8) υdP = 27.57
Conditional Expression(9) ndP + (0.01425 × υdP) = 2.0533
Conditional Expression(10) θgFP + (0.00316 × υdP) = 0.7123
Conditional Expression(11) 2ωw = 33.27°
Conditional Expression(12) 2ωt = 12.20°
Conditional Expression(13) BFw/fw = 0.46

Figure 10A:
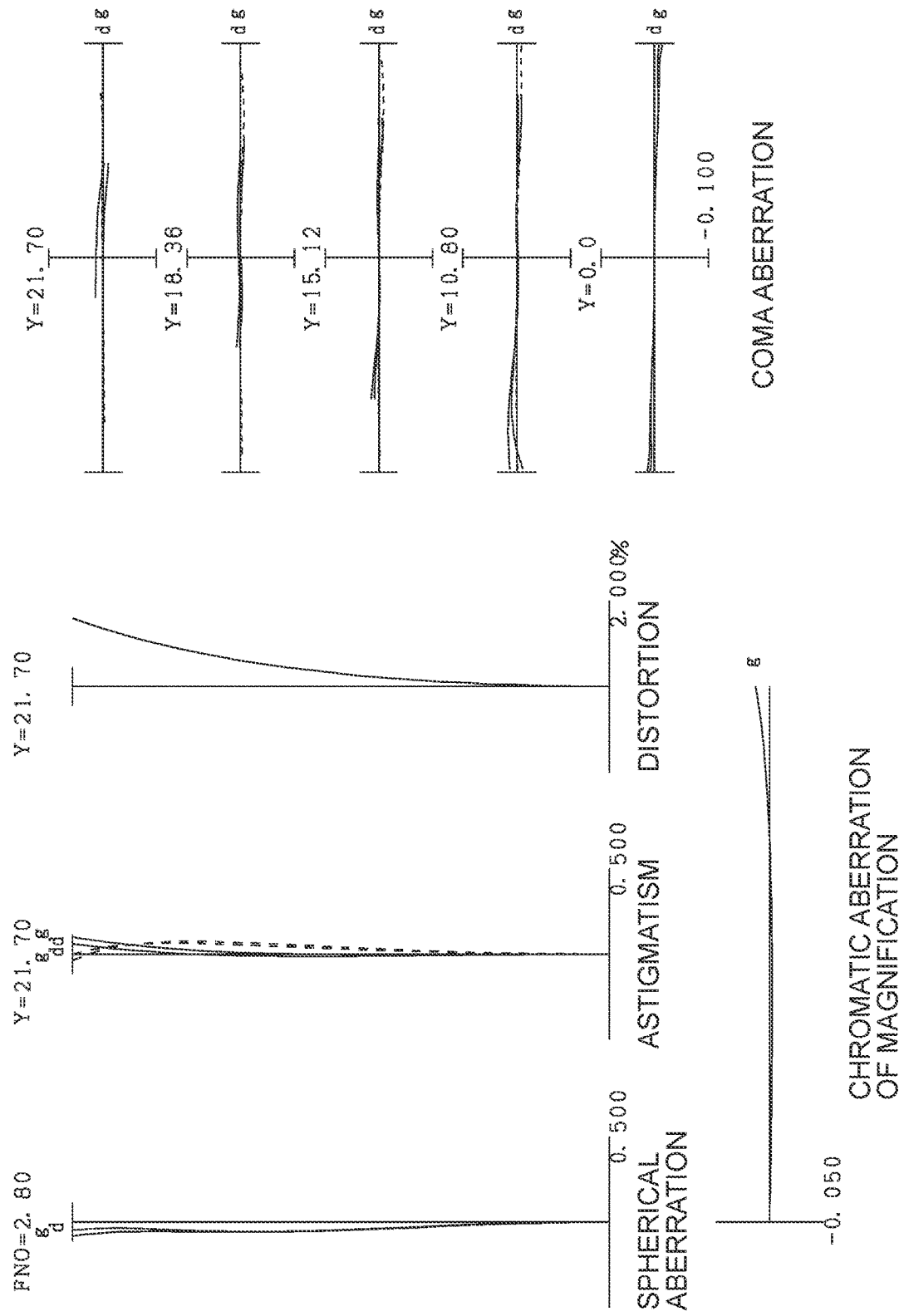

FIGS. 10A, 10B, and 10C are various aberration graphs of the zoom optical system according to the fifth example in the wide angle end state, the intermediate focal length state, and the telephoto end state, respectively. From each of the various aberration graphs, it can be seen that the zoom optical system according to the fifth example excellently corrects various aberrations and has excellent image-forming performance.

Sixth Example

Figure 11:
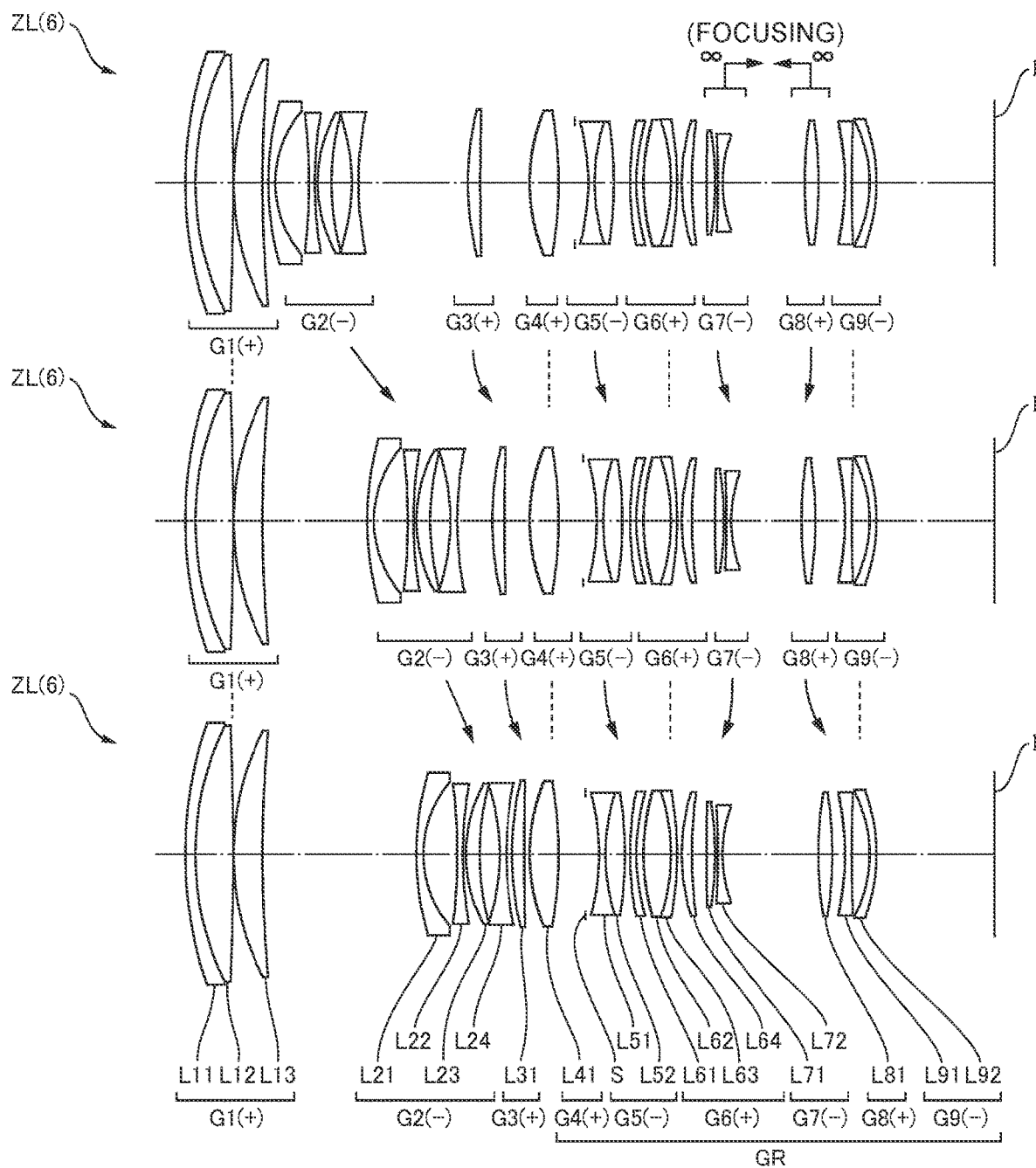
FIG. 11 is a diagram showing the movement of lenses when a zoom optical system according to a sixth example changes from a wide angle end state to a telephoto end state.

A sixth example will be described with reference to FIGS. 11 to 12 and Table 6. FIG. 11 is a diagram showing the movement of lenses when a zoom optical system according to the sixth example changes from the wide angle end state to the telephoto end state. The zoom optical system ZL(6) according to the sixth example comprises a first lens group G1 having a positive refractive power, a second lens group G2 having a negative refractive power, a third lens group G3 having a positive refractive power, a fourth lens group G4 having a positive refractive power, a fifth lens group G5 having a negative refractive power, a sixth lens group G6 having a positive refractive power, a seventh lens group G7 having a negative refractive power, an eighth lens group G8 having a positive refractive power, and a ninth lens group G9 having a negative refractive power, which are arranged in order from the object side. During zooming from the wide angle end state to the telephoto end state, the second lens group G2, the third lens group G3, the fifth lens group G5, the seventh lens group G7, and the eighth lens group G8 move separately from one another in directions indicated by arrows of FIG. 11, and the distances between adjacent lens groups change. Note that the first lens group G1, the fourth lens group G4, the sixth lens group G6 and the ninth lens group G9 are fixed with respect to the image surface I during zooming. A lens group consisting of the fourth lens group G4, the fifth lens group G5, the sixth lens group G6, the seventh lens group G7, the eighth lens group G8 and the ninth lens group G9 corresponds to the succeeding lens group GR.

The first lens group G1 comprises a cemented lens including a negative meniscus lens L11 having a convex surface facing the object and a positive lens L12 having a biconvex shape, and a positive meniscus lens L13 having a convex surface facing the object, which are arranged in order from the object side.

The second lens group G2 comprises a negative meniscus lens L21 having a convex surface facing the object, a negative lens L22 having a biconcave shape, a positive meniscus lens L23 having a convex surface facing the object, and a negative lens L24 having a biconcave shape, which are arranged in order from the object side.

The third lens group G3 comprises a positive meniscus lens L31 having a convex surface facing the object.

The fourth lens group G4 comprises a positive lens L41 having a biconvex shape. The positive lens L41 has an aspherical lens surface on the object side.

The fifth lens group G5 comprises a cemented lens including a negative lens L51 having a biconcave shape and a positive lens L52 having a biconvex shape. An aperture stop S is arranged to be nearest to the object in the fifth lens group G5, and moves together with the fifth lens group G5 during zooming.

The sixth lens group G6 comprises a negative meniscus lens L61 having a convex surface facing the object, a cemented lens including a positive lens L62 having a biconvex shape and a negative meniscus lens L63 having a concave surface facing the object, and a positive meniscus lens L64 having a convex surface facing the object, which are arranged in order from the object side. The positive lens L62 has an aspherical lens surface on the object side.

The seventh lens group G7 comprises a positive lens L71 having a biconvex shape, and a negative lens L72 having a biconcave shape, which are arranged in order from the object.

The eighth lens group G8 comprises a positive lens L81 having a biconvex shape.

The ninth lens group G9 comprises a negative lens L91 having a biconcave shape, and a negative meniscus lens L92 having a concave surface facing the object, which are arranged in order from the object side. The negative lens L91 has an aspherical lens surface on the object side. The image surface I is arranged on the image side of the ninth lens group G9. In other words, the ninth lens group G9 corresponds to the last lens group.

In the present embodiment, the seventh lens group G7 is moved toward the image surface I, and the eighth lens group G8 is moved toward the object side, thereby performing focusing from a long-distance object to a short-distance object (from an infinite distant object to a finite distant object). In other words, the seventh lens group G7 corresponds to the first focusing lens group, and the eighth lens group G8 corresponds to the second focusing lens group.

Table 6 below lists data values of the zoom optical system according to the sixth example.

TABLE 6

[General Data]

Zooming ratio 2.74
θgFP = 0.6319

|  | W | M | T |
|---|---|---|---|
| FNO | 2.83129 | 2.85335 | 2.87996 |
| 2ω | 33.76242 | 17.81528 | 12.26938 |
| Y | 21.70 | 21.70 | 21.70 |
| TL | 191.79997 | 191.79997 | 191.79997 |
| BF | 32.65404 | 32.65404 | 32.65404 |

[Lens Data]

| Surface Number | R | D | nd | υd | θgF |
|---|---|---|---|---|---|
| 1 | 113.29192 | 2.8 | 2.001 | 29.12 | |
| 2 | 81.40925 | 10.5 | 1.49782 | 82.57 | |
| 3 | −795.64249 | 0.1 | | | |
| 4 | 74.88525 | 8.2 | 1.433848 | 95.23 | |
| 5 | 376.798 | D5(Variable) | | | |
| 6 | 82.73428 | 1.9 | 1.59349 | 67 | |
| 7 | 31.04017 | 9.35 | | | |
| 8 | −168.77759 | 1.6 | 1.49782 | 82.57 | |
| 9 | 115.02437 | 0.8 | | | |
| 10 | 41.14809 | 3.8 | 1.663819 | 27.35 | 0.6319 |
| 11 | 73.00001 | 5.6 | | | |
| 12 | −61.06953 | 1.9 | 1.49782 | 82.57 | |
| 13 | 98.51376 | D13(Variable) | | | |
| 14 | 86.14679 | 3.4 | 1.94595 | 17.98 | |
| 15 | 694.90071 | D15 (Variable) | | | |
| 16* | 52.81421 | 8 | 1.553319 | 71.68 | |
| 17 | −117.98245 | D17(Variable) | | | |
| 18 | ∞ | 3.7 | | | (Aperture Stop S) |
| 19 | −65.12937 | 1.8 | 1.92286 | 20.88 | |
| 20 | 57.80344 | 5.30 | 1.49782 | 82.57 | |
| 21 | −111.65652 | D21(Variable) | | | |
| 22 | 92.32113 | 1.7 | 1.935421 | 18.16 | |
| 23 | 60.00966 | 2 | | | |
| 24* | 58.92406 | 7.60 | 1.59201 | 66.89 | |
| 25 | −55 | 1.7 | 1.62004 | 36.4 | |
| 26 | −91.54022 | 1.3 | | | |
| 27 | 59.23711 | 2.8 | 1.746869 | 23.4 | |
| 28 | 126.70086 | D28(Variable) | | | |
| 29 | 448.34721 | 2.4 | 1.94595 | 17.98 | |
| 30 | −94.32707 | 0.8 | | | |
| 31 | −205.67313 | 1.25 | 1.794772 | 36.19 | |
| 32 | 38.13601 | D32(Variable) | | | |
| 33 | 112.2489 | 3.85 | 1.90265 | 35.72 | |
| 34 | −112.24891 | D34(Variable) | | | |

TABLE 6-continued

| | | | | |
|---|---|---|---|---|
| 35* | −72.74439 | 1.9 | 1.49782 | 82.57 |
| 36 | 498.35011 | 4.9 | | |
| 37 | −37.82283 | 1.90 | 1.716676 | 52.08 |
| 38 | −51.98812 | BF | | |

[Aspherical Surface Data]

Sixteenth Surface x = 0.00, A4 = 2.07E−07, A6 = 1.58E−10
A8 = −2.50E−13, A10 = 2.86E−16, A12 = 0.00E + 00

Twenty-fourth Surface x = 0.00, A4 = −1.36E−06, A6 = 6.98E−10
A8 = −4.57E−12, A10 = 1.66E−14, A12 = −2.22E−17

Thirty-fifth Surface x = 0.00, A4 = 1.84E−07, A6 = 3.48E−09
A8 = −1.61E−11, A10 = 6.41E−14, A12 = −9.19E−17

[Lens Group Data]

| Group | First surface | Focal length |
|---|---|---|
| G1 | 1 | 126.73821 |
| G2 | 6 | −35.76434 |
| G3 | 14 | 103.67509 |
| G4 | 16 | 67.05334 |
| G5 | 18 | −59.65998 |
| G6 | 22 | 57.09316 |
| G7 | 29 | −82.17953 |
| G8 | 33 | 62.68745 |
| G9 | 35 | −77.91319 |

[Variable Distance Data]

| | W Infinity | M Infinity | T Infinity | W Short-distance | M Short-distance | T Short-distance |
|---|---|---|---|---|---|---|
| f | 71.49323 | 135 | 196 | — | — | — |
| β | — | — | — | −0.08339 | −0.14602 | −0.1994 |
| D5 | 1.6 | 28.92133 | 42.60181 | 1.6 | 28.92133 | 42.60181 |
| D13 | 30.28784 | 9.66169 | 1.59632 | 30.28784 | 9.66169 | 1.59632 |
| D15 | 13.82513 | 7.12995 | 1.51484 | 13.82513 | 7.12995 | 1.51484 |
| D17 | 4.5 | 6.8522 | 7.51331 | 4.50 | 6.85 | 7.51 |
| D21 | 4.51511 | 2.16291 | 1.5018 | 4.51511 | 2.16291 | 1.5018 |
| D28 | 4.04215 | 6.41537 | 4.00083 | 5.37286 | 11.89757 | 14.49678 |
| D32 | 22.88318 | 19.60826 | 26.72334 | 19.55641 | 8.36976 | 4.68183 |
| D34 | 7.29656 | 8.19826 | 3.49773 | 9.29262 | 13.95456 | 15.04328 |

[Conditional expression corresponding value]

Conditional Expression(1) f3/(−fE) = 1.33
Conditional Expression(2) f1/(−fE) = 1.63
Conditional Expression(3) f2/fE = 0.46
Conditional Expression(4) f1/(−f2) = 3.54
Conditional Expression(5) f1/f3 = 1.22
Conditional Expression(6) f1/f4 = 1.89
Conditional Expression(7) (−fF1)/fF2 = 1.31
Conditional Expression(8) υdP = 27.35
Conditional Expression(9) ndP + (0.01425 × υdP) = 2.0536
Conditional Expression(10) θgFP + (0.00316 × υdP) = 0.7183
Conditional Expression(11) 2ωw = 33.76°
Conditional Expression(12) 2ωt = 12.27°
Conditional Expression(13) BFw/fw = 0.46

Figure 12A:
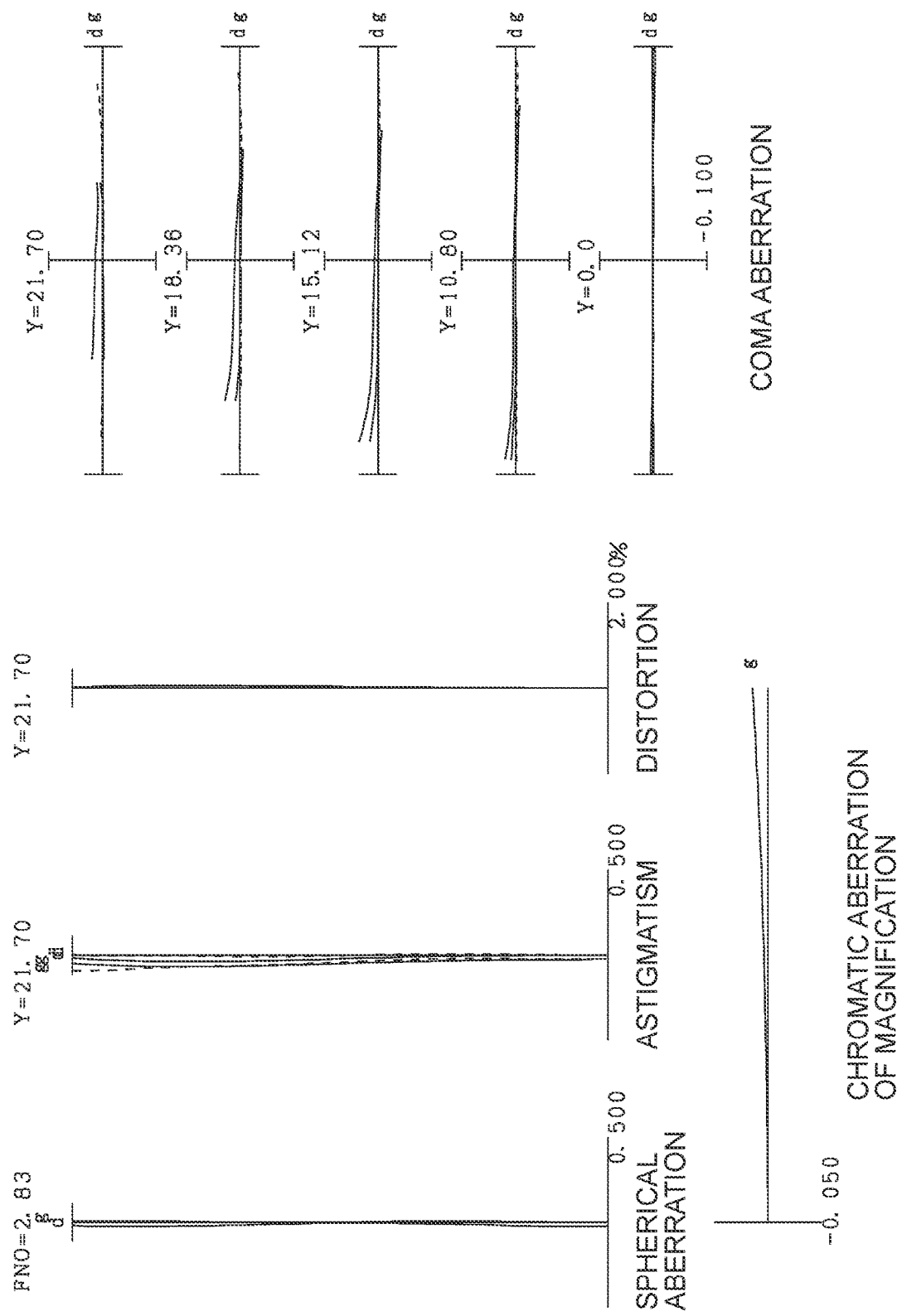

FIGS. 12A, 12B, and 12C are various aberration graphs of the zoom optical system according to the sixth example in the wide angle end state, the intermediate focal length state, and the telephoto end state, respectively. From each of the various aberration graphs, it can be seen that the zoom optical system according to the sixth example excellently corrects various aberrations and has excellent image-forming performance.

Seventh Example

Figure 13:
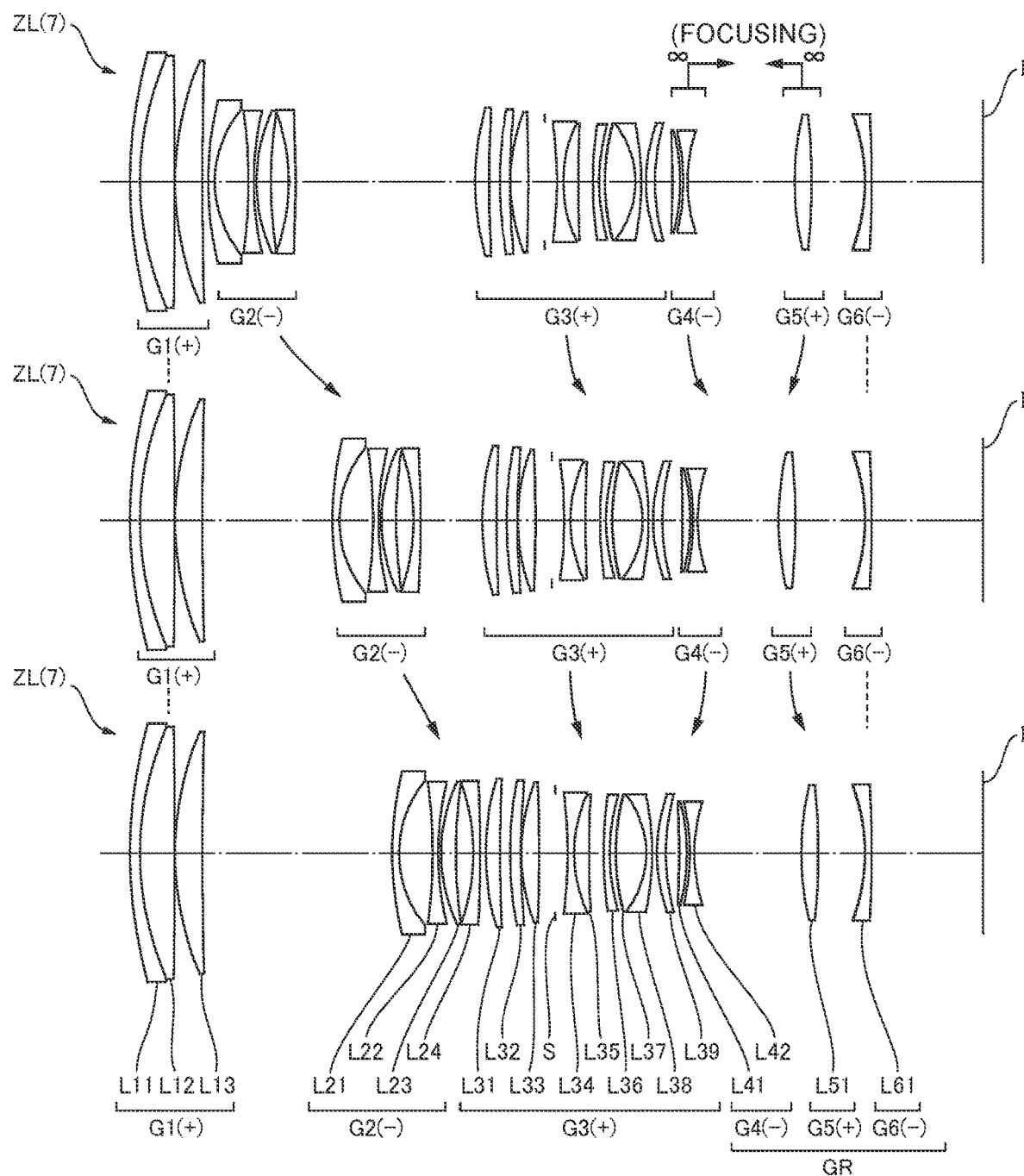
FIG. 13 is a diagram showing the movement of lenses when a zoom optical system according to a seventh example changes from a wide angle end state to a telephoto end state.

A seventh example will be described with reference to FIGS. 13 to 14 and Table 7. FIG. 13 is a diagram showing the movement of lenses when a zoom optical system according to the seventh example changes from the wide angle end state to the telephoto end state. The zoom optical system ZL(7) according to the seventh example comprises a first lens group G1 having a positive refractive power, a second lens group G2 having a negative refractive power, a third lens group G3 having a positive refractive power, a fourth lens group G4 having a negative refractive power, a fifth lens group G5 having a positive refractive power, and a sixth lens group G6 having a negative refractive power, which are arranged in order from the object side. During zooming from the wide angle end state to the telephoto end state, the second lens group G2, the third lens group G3, the fourth lens group G4 and the fifth lens group G5 move separately from one another in directions indicated by arrows of FIG. 13, and the distances between adjacent lens groups change. Note that the first lens group G1 and the sixth lens group G6 are fixed with respect to the image surface I during zooming. A lens group consisting of the fourth lens group G4, the fifth lens group G5, and the sixth lens group G6 corresponds to the succeeding lens group GR.

The first lens group G1 comprises a cemented lens including a negative meniscus lens L11 having a convex surface facing the object and a positive lens L12 having a biconvex shape, and a positive meniscus lens L13 having a convex surface facing the object, which are arranged in order from the object side.

The second lens group G2 comprises a negative meniscus lens L21 having a convex surface facing the object, a negative lens L22 having a biconcave shape, a positive meniscus lens L23 having a convex surface facing the object, and a negative meniscus lens L24 having a concave surface facing the object, which are arranged in order from the object side.

The third lens group G3 comprises a positive meniscus lens L31 having a convex surface facing the object, a positive meniscus lens L32 having a convex surface facing the object, a positive lens L33 having a biconvex shape, a cemented lens including a negative lens L34 having a biconcave shape and a positive meniscus lens L35 with a convex surface facing the object, a negative meniscus lens L36 having a convex surface facing the object, a cemented lens including a positive lens L37 having a biconvex shape and a negative meniscus lens L38 having a concave surface facing the object, and a positive meniscus lens L39 having a convex surface facing the object, which are arranged in order from the object. An aperture stop S is arranged between the positive lens L33 and the negative lens L34 in the third lens group G3, and moves together with the third lens group G3 during zooming. The positive lens L37 has an aspherical lens surface on the object side.

The fourth lens group G4 comprises a positive meniscus lens L41 having a concave surface facing the object, and a negative lens L42 having a biconcave shape.

The fifth lens group G5 comprises a positive lens L51 having a biconvex shape.

The sixth lens group G6 comprises a negative meniscus lens L61 having a concave surface facing the object. The negative meniscus lens L61 has an aspherical lens surface on the object side. The image surface I is arranged on the image side of the sixth lens group G6. In other words, the sixth lens group G6 corresponds to the last lens group.

In the present example, the fourth lens group G4 is moved toward the image surface I, and the fifth lens group G5 is moved toward the object side, thereby performing focusing from a long-distance object to a short-distance object (from an infinite distant object to a finite distant object). In other words, the fourth lens group G4 corresponds to the first focusing lens group, and the fifth lens group G5 corresponds to the second focusing lens group.

Table 7 below lists data values of the zoom optical system according to the seventh example.

TABLE 7

| [General Data] | | | |
|---|---|---|---|
| Zooming ratio 2.74 $\theta gFP = 0.6319$ | | | |
| | W | M | T |
| FNO | 2.91966 | 2.90716 | 2.86166 |
| 2ω | 34.08866 | 17.93464 | 12.307 |
| Y | 21.70 | 21.70 | 21.70 |
| TL | 208.41341 | 208.41341 | 208.41341 |
| BF | 31.14475 | 31.14475 | 31.14475 |

| [Lens Data] | | | | | |
|---|---|---|---|---|---|
| Surface Number | R | D | nd | νd | θgF |
| 1 | 135.3501 | 2.8 | 1.911144 | 31.13 | |
| 2 | 88.2984 | 9.7 | 1.49782 | 82.57 | |
| 3 | −2014.0365 | 0.1 | | | |
| 4 | 87.0008 | 7.7 | 1.433848 | 95.23 | |
| 5 | 1270.4367 | D5(Variable) | | | |
| 6 | 96.7322 | 1.9 | 1.580538 | 67.89 | |
| 7 | 32.0715 | 9.4 | | | |

TABLE 7-continued

| | | | | | |
|---|---|---|---|---|---|
| 8 | −149.5985 | 1.6 | 1.49782 | 82.57 | |
| 9 | 84.947 | 0.8 | | | |
| 10 | 47.7033 | 4.1051 | 1.663819 | 27.35 | 0.6319 |
| 11 | 132.9068 | 4.917 | | | |
| 12 | −59.1191 | 1.9 | 1.49782 | 82.57 | |
| 13 | −410.9838 | D13(Variable) | | | |
| 14 | 75.2493 | 4.0117 | 1.919756 | 30.42 | |
| 15 | 406.1688 | 3 | | | |
| 16 | 110.8456 | 3 | 1.643929 | 59.34 | |
| 17 | 221.1361 | 0.1 | | | |
| 18 | 55.6433 | 5 | 1.510139 | 69.79 | |
| 19 | −452.609 | 4.5 | | | |
| 20 | ∞ | 3.5 | | | (Aperture Stop S) |
| 21 | −128.1374 | 1.8 | 1.924139 | 29.82 | |
| 22 | 38.7647 | 4.2 | 1.513006 | 67.44 | |
| 23 | 324.5195 | 4.1 | | | |
| 24 | 111.4412 | 1.7 | 1.77151 | 22.51 | |
| 25 | 58.0313 | 1.7 | | | |
| 26* | 61.5731 | 8.5 | 1.593493 | 67 | |
| 27 | −26.7185 | 1.7 | 1.627041 | 46.96 | |
| 28 | −76.4024 | 1.3 | | | |
| 29 | 47.8194 | 2.5 | 1.772125 | 44.63 | |
| 30 | 60.849 | D30(Variable) | | | |
| 31 | −289.2655 | 2.2 | 1.945944 | 17.98 | |
| 32 | −56.7163 | 0.8 | | | |
| 33 | −62.5979 | 1.25 | 1.631431 | 31.71 | |
| 34 | 46.593 | D34(Variable) | | | |
| 35 | 84.1615 | 4.75 | 1.764819 | 48.75 | |
| 36 | −185.6155 | D36(Variable) | | | |
| 37* | −52.3045 | 1.9 | 1.49782 | 82.57 | |
| 38 | −319.0332 | BF | | | |

[Aspherical Surface Data]

Twenty-sixth Surface x = 0.00, A4 = −1.61284E−06, A6 = 4.35900E−10
A8 = −1.44229E−12, A10 = 4.99341E−15, A12 = −5.72670E−18

Thirty-seventh Surface x = 0.00, A4 = 7.70231E−07, A6 = 2.20982E−09
A8 = −9.92801E−12, A10 = 2.79429E−14, A12 = −2.96640E−17

[Lens Group Data]

| Group | First surface | Focal length |
|---|---|---|
| G1 | 1 | 145.20607 |
| G2 | 6 | −47.94048 |
| G3 | 14 | 59.76284 |
| G4 | 31 | −100.34191 |
| G5 | 35 | 76.29409 |
| G6 | 37 | −125.96848 |

[Variable Distance Data]

| | W Infinity | M Infinity | T Infinity | W Short-distance | M Short-distance | T Short-distance |
|---|---|---|---|---|---|---|
| f | 71.47903 | 135 | 196.00001 | — | — | — |
| β | — | — | — | −0.07596 | −0.13523 | −0.18897 |
| D5 | 1.6 | 36.65047 | 53.37203 | 1.6 | 36.65047 | 53.37203 |
| D13 | 50.34136 | 17.30611 | 1.5894 | 50.34136 | 17.30611 | 1.5894 |
| D30 | 4.89104 | 5.69832 | 3.75297 | 5.82603 | 9.72514 | 12.39738 |
| D34 | 30.18447 | 22.82939 | 30.17853 | 25.97701 | 9.1382 | 2.51645 |
| D36 | 14.96274 | 19.49533 | 13.08668 | 18.23522 | 29.1597 | 32.10436 |

[Conditional expression corresponding value]

Conditional Expression(1) f3/(−fE) = 0.47
Conditional Expression(2) f1/(−fE) = 1.15
Conditional Expression(3) f2/fE = 0.38
Conditional Expression(4) f1/(−f2) = 3.03
Conditional Expression(5) f1/f3 = 2.43
Conditional Expression(6) f1/f4 = −1.45
Conditional Expression(7) (−fF1)/fF2 = 1.32
Conditional Expression(8) υdP = 27.35
Conditional Expression(9) ndP + (0.01425 × υdP) = 2.0536
Conditional Expression(10) θgFP + (0.00316 × υdP) = 0.7183

TABLE 7-continued

Conditional Expression(11) 2ωw = 34.09°
Conditional Expression(12) 2ωt = 12.31°
Conditional Expression(13) BFw/fw = 0.44

Figure 14A:
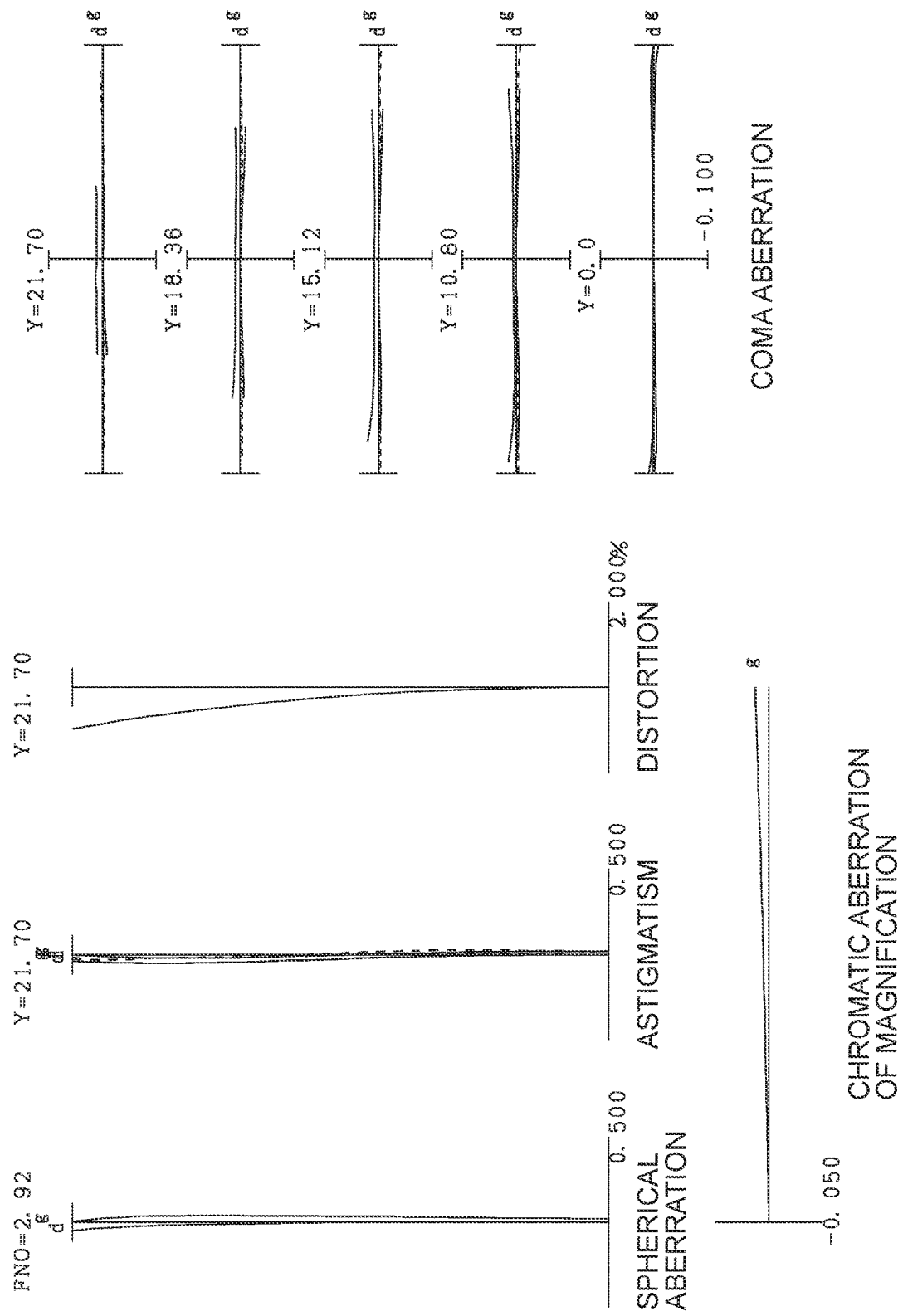

FIGS. 14A, 14B, and 14C are various aberration graphs of the zoom optical system according to the seventh example in the wide angle end state, the intermediate focal length state, and the telephoto end state, respectively. From each of the various aberration graphs, it can be seen that the zoom optical system according to the seventh example excellently corrects various aberrations and has excellent image-forming performance.

According to each example, it is possible to implement a zoom optical system in which various aberrations such as spherical aberration are excellently corrected.

Here, each of the above examples shows a specific example of the present invention, and the present invention is not limited to these examples.

Note that the following contents can be appropriately adopted as long as the optical performance of the zoom optical system according to the present embodiment is not impaired.

Although zoom optical systems having 6-group, 7-group, 8-group, 9-group, and 10-group configurations are shown as numerical examples of the zoom optical system, the present application is not limited to these configurations, and zoom optical systems having other group configurations (for example, 5-group, 11-group and the like) may be configured. Specifically, it is possible to adopt a configuration in which a lens or a lens group is added to be nearest to the object or the image surface in the zoom optical system. Note that the lens groups represent portions each including at least one lens, which are separated from one another via air gaps changing during zooming.

The lens surface may be formed of a spherical surface or a flat surface, or may be formed of an aspherical surface. When the lens surface is a spherical surface or a flat surface, this is preferable because lens processing and assembly adjustment are facilitated, and deterioration of optical performance caused by errors of processing and assembly adjustment can be prevented. Further, this is preferable because drawing performance is less deteriorated even if the image surface is deviated.

When the lens surface is an aspherical surface, the aspherical surface may be any of an aspherical surface formed by grinding, a glass mold aspherical surface obtained by forming glass into an aspherical shape with a mold, and a composite type aspherical surface obtained by forming resin on the surface of glass in an aspherical shape. Further, the lens surface may be a diffraction surface, and the lens may be a gradient index lens (GRIN lens) or a plastic lens.

An antireflection film having a high transmittance in a wide wavelength region may be applied to each lens surface in order to reduce flare and ghost and achieve high contrast optical performance. As a result, flare and ghost can be reduced, and high optical performance with high contrast can be achieved.

| EXPLANATION OF NUMERALS AND CHARACTERS | |
|---|---|
| G1 first lens group | G2 second lens group |
| G3 third lens group | GR succeeding lens group |
| I image surface | S aperture stop |

The invention claimed is:

1. A zoom optical system comprising a first lens group having a positive refractive power, a second lens group having a negative refractive power, a third lens group having a positive refractive power, a fourth lens group having a positive refractive power, a fifth lens group having a negative refractive power, a sixth lens group having a positive refractive power, and a seventh lens group having a negative refractive power, which are arranged in order from an object side, wherein the first lens group consists of a cemented lens and a positive lens;

the third lens group consists of one positive lens;

during zooming, distances between adjacent lens groups change, and the first lens group is fixed with respect to an image surface;

a position of the third lens group at a telephoto end state is closer to the image surface than a position of the third lens group at a wide angle end state; and the following conditional expression is satisfied:

$$-10.00 < f3/(-fE) < 3.50,$$

where f3 represents a focal length of the third lens group, and fE represents a focal length of the seventh lens group in the zoom optical system.

2. The zoom optical system according to claim 1, wherein the following conditional expression is satisfied:

$$-10.00 < f1/(-fE) < 3.50,$$

where f1 represents a focal distance of the first lens group.

3. The zoom optical system according to claim 1, wherein the following conditional expression is satisfied:

$$-10.00 < f2/fE < 1.50,$$

where f2 represents a focal length of the second lens group.

4. The zoom optical system according to claim 1, wherein the following conditional expression is satisfied:

$$1.50 < f1/(-f2) < 5.00,$$

where f1 represents a focal length of the first lens group, and f2 represents a focal length of the second lens group.

5. The zoom optical system according to claim 1, wherein the following conditional expression is satisfied:

$$0.80 < f1/f3 < 2.50,$$

where f1 represents a focal length of the first lens group.

6. The zoom optical system according to claim 1, wherein the following conditional expression is satisfied:

$$-2.00 < f1/f4 < 4.00,$$

where f1 represents a focal length of the first lens group, and f4 represents a focal length of the fourth lens group.

7. The zoom optical system according to claim 1, wherein the seventh lens group is fixed with respect to the image surface during zooming.

8. The zoom optical system according to claim 1, wherein during zooming, at least one lens group out of the lens groups arranged to be nearer to the image surface than the third lens group is fixed with respect to the image surface.

9. The zoom optical system according to claim 1, wherein the fifth lens group constitutes a first focusing lens group and the sixth lens group constitutes a second focusing lens group arranged in order from the object side, the first focusing lens group moving during focusing, and the second focusing lens group moving during focusing, and the following conditional expression is satisfied:

$$0.80<(-fF1)/fF2<5.00,$$

where fF1 represents a focal length of the first focusing lens group, and fF2 represents a focal length of the second focusing lens group.

10. The zoom optical system according to claim 1, wherein the second lens group comprises a positive lens satisfying the following conditional expressions:

$$18.0<vdP<35.0$$

$$1.83<ndP+(0.01425 \times vdP)<2.12$$

$$0.702<\theta gFP+(0.00316 \times vdP),$$

where vdP represents Abbe number based on d-line of the positive lens, ndP represents a refractive index of the positive lens for the d-line, and θgFP represents a partial dispersion ratio of the positive lens which is defined by the following expression:

$$\theta gFP=(ngP-nFP)/(nFP-nCP),$$

where a refractive index of the positive lens for g-line is represented by ngP, a refractive index of the positive lens for F-line is represented by nFP, and a refractive index of the positive lens for C-line is represented by nCP.

11. The zoom optical system according to claim 1, wherein the following conditional expression is satisfied:

$$25.00°<2\omega w<50.00°,$$

where 2ωw represents a full angle of view of the zoom optical system in the wide angle end state.

12. The zoom optical system according to claim 1, wherein the following conditional expression is satisfied:

$$5.00°<2\omega t<20.00°,$$

where 2ωt represents a full angle of view of the zoom optical system in the telephoto end state.

13. The zoom optical system according to claim 1, wherein the following conditional expression is satisfied:

$$0.20<BFw/fw<0.85,$$

where BFw represents a back focus of the zoom optical system in the wide angle end state, and fw represents a focal length of the zoom optical system in the wide angle end state.

14. An optical device comprising the zoom optical system according to claim 1 and a body in which the zoom optical system is installed.

15. The zoom optical system according to claim 1, wherein the third lens group consists of one positive single lens.

16. A method of manufacturing a zoom optical system comprising:

arranging, in a lens barrel, a first lens group having a positive refractive power, a second lens group having a negative refractive power, a third lens group having a positive refractive power, a fourth lens group having a positive refractive power, a fifth lens group having a negative refractive power, a sixth lens group having a positive refractive power, and a seventh lens group having a negative refractive power, which are arranged in order from an object side;

arranging such that:

the first lens group consists of a cemented lens and a positive lens;

the third lens group consists of one positive lens;

during zooming, distances between adjacent lens groups change, and the first lens group is fixed with respect to an image surface;

a position of the third lens group at a telephoto end state is closer to the image surface than a position of the third lens group at a wide angle end state; and the following conditional expression is satisfied:

$$-10.00<f3/(-fE)<3.50,$$

where f3 represents a focal length of the third lens group, and fE represents a focal length of the seventh lens group in the zoom optical system.

* * * * *